United States Patent
Albed Alhnan

(10) Patent No.: US 12,465,571 B2
(45) Date of Patent: Nov. 11, 2025

(54) SOLID DOSAGE FORM

(71) Applicant: University of Lancashire, Preston (GB)

(72) Inventor: Mohamed Albed Alhnan, Preston (GB)

(73) Assignee: University of Lancashire, Preston (GB)

( * ) Notice: Subject to any disclaimer, the term of this patent is extended or adjusted under 35 U.S.C. 154(b) by 0 days.

(21) Appl. No.: 18/397,827

(22) Filed: Dec. 27, 2023

(65) Prior Publication Data

US 2024/0293328 A1 Sep. 5, 2024

Related U.S. Application Data

(63) Continuation of application No. 16/097,112, filed as application No. PCT/GB2017/051203 on Apr. 28, 2017, now abandoned.

(30) Foreign Application Priority Data

Apr. 29, 2016 (GB) ...................................... 1607548

(51) Int. Cl.
*A61K 9/28* (2006.01)
*A61K 9/48* (2006.01)

(52) U.S. Cl.
CPC .............. *A61K 9/282* (2013.01); *A61K 9/286* (2013.01); *A61K 9/2866* (2013.01); *A61K 9/2886* (2013.01); *A61K 9/4891* (2013.01)

(58) Field of Classification Search
None
See application file for complete search history.

(56) References Cited

U.S. PATENT DOCUMENTS 3,438,797 A 4/1969 Bristol
3,558,768 A 1/1971 Klippel
(Continued)

FOREIGN PATENT DOCUMENTS

CN 105007949 A 10/2015
CN 105998026 A 10/2016
(Continued)

OTHER PUBLICATIONS

International Search Report and Written Opinion of PCT/GB2017/051203, dated Jun. 19, 2017, 14 Pages.
(Continued)

*Primary Examiner* — Lakshmi S Channavajjala
(74) *Attorney, Agent, or Firm* — Linda B. Huber; Nixon Peabody LLP

(57) ABSTRACT

The present invention relates to solid dosage forms comprising coatings based on natural ingredients, such as naturally-occuring esterified and non-esterified polyuronic acids, optionally in combination with stabilising lipophilic component(s) (e.g. surfactant(s)) and/or other stabilising components. The inventors have made the surprising discovery that polysaccharide-based coatings can be stabilised, and often imparted with gastric resistant properties, through the inclusion of particular additives and/or additional layers. In particular, polyuronic acid-containing coatings may be stabilised and rendered more robust through the inclusion of a lipophilic component (e.g. surfactant), an esterified polyuronic acid, and/or the deployment of an additional coating layer containing stabilising agents that affect the disintegration and/or dissolution of the polyuronic acid. The polyuronic acid-containing coatings of the invention can exhibit retarded disintegration at gastric pH whilst remaining readily disintegratable at higher pHs. As such, the coatings of the
(Continued)

invention provide inter alia promising candidates for enteric coatings.

20 Claims, 24 Drawing Sheets

(56) References Cited

U.S. PATENT DOCUMENTS

| | | | |
|---|---|---|---|
| 4,661,162 | A | 4/1987 | Kurihara et al. |
| 5,882,715 | A | 3/1999 | Nielsen et al. |
| 5,891,476 | A | 4/1999 | Reo et al. |
| 6,245,384 | B1 | 6/2001 | Lott |
| 6,274,162 | B1 | 8/2001 | Steffenino et al. |
| 6,468,561 | B1 | 10/2002 | Grillo et al. |
| 7,709,025 | B2 | 5/2010 | Fegely et al. |
| 2022/0331255 | A1 | 10/2022 | Albed Alhnan |

FOREIGN PATENT DOCUMENTS

| | | | |
|---|---|---|---|
| EP | 0039879 | A1 | 11/1981 |
| EP | 0452268 | A2 | 10/1991 |
| EP | 0477135 | A1 | 3/1992 |
| JP | 2001-122788 | A1 | 5/2001 |
| WO | 00/74655 | A2 | 12/2000 |
| WO | 2001/013890 | A1 | 3/2001 |
| WO | 2004/056336 | A2 | 7/2004 |
| WO | 2006/048895 | A1 | 5/2006 |
| WO | 2006/102964 | A2 | 10/2006 |
| WO | 2009/036565 | A1 | 3/2009 |
| WO | 2009/113703 | A2 | 9/2009 |
| WO | 2010/035245 | A1 | 11/2010 |
| WO | 2013/128253 | A1 | 9/2013 |
| WO | 2015/084594 | A1 | 6/2015 |
| WO | 2017/187194 | A1 | 11/2017 |

OTHER PUBLICATIONS

Search Report of GB1607548.3, dated Jan. 31, 2017, 5 Pages.
Shimizu et al., Formulation Study for Lansoprazole Fast-disintegrating Tablet. III. Design of Rapidly Disintegrating Tablets, Chem. Pharm. Bull., 2003, vol. 51(8), pp. 942-947.

(a)       (b)

(a)       (b)

(a)

(b)

(a)

(b)

(a) (b)

SOLID DOSAGE FORM

CROSS-REFERENCE TO RELATED APPLICATIONS

This application is a continuation of U.S. patent application Ser. No. 16/097,112 filed Oct. 26, 2018, now abandoned, which is a National Phase of International Application No. PCT/GB2017/051203 filed Apr. 28, 2017, which designated the U.S. and that International Application was published under PCT Article 21 (2) in English. This application also includes a claim of priority under 35 U.S.C. § 119 (a) and § 365 (b) to British patent application No. GB 1607548.3 filed Apr. 29, 2016, the entirety of which is hereby incorporated by reference.

INTRODUCTION

The present invention relates to a solid dosage form, in particular a solid dosage form (especially a nutraceutical or dietary supplement) comprising a coating, in particular an enteric coating. The present invention also relates to a coating and coating composition, to particular coating layer(s) and corresponding coating layer composition(s), to package(s) of the aforementioned, and to methods of preparing all of the aforementioned.

BACKGROUND

Enteric coatings derived from natural materials offer significant advantages over conventional synthetic polymeric coatings since, unlike synthetic polymers they are biodegradable, relatively abundant, and have no daily intake limits or restrictions on use for dietary and nutraceutical products. However, at present little information is available regarding the dissolution properties of such natural enteric coatings under various gastrointestinal conditions.

Existing naturally-derived enteric coatings include GRAS (Generally Recognized As Safe)-based polymers such as: Shellac and shellac-based systems (e.g. Protect™ by Sensient Colors Inc—see WO2011/100643); sodium alginate/plasticizer-systems (e.g. Ideal Cures Pvt. Ltd.—see US2008/0312345); sodium alginate/ethylcellulose-based systems (e.g. Bpsi Holdings Inc—see U.S. Pat. No. 7,709,025); and non-synthetic enteric with ethylcellulose (Nutrateric™ II by Colorcon).

In their recent review article (Alhnan et al, "Gastro-Resistant Characteristics of GRAS-Grade Enteric Coatings for Pharmaceutical and Nutraceutical products", *Int J Pharm*, Volume 486, Issues 1-2, 30 May 2015, Pages 167-174), the inventor(s) evalutated the gastric resistance properties of three commercially available GRAS-based coating technologies: ethyl cellulose+ carboxymethyl cellulose (EC-CMC), ethyl cellulose+ sodium alginate (EC-Alg) and shellac+ sodium alginate (Sh-Alg) combinations. The work involved first establishing minimum coating levels to meet USP pharmacopoeial criteria for delayed release formulations (<10% release after 2 h in pH 1.2 followed by >80% release after 45 min of pH change), before performing various duodenal/small intestine simulation experiments upon 150 mg Theophylline tablets which were duly coated with 6.5%, 7%, and 2.75% coating levels of formulations EC-CMC, EC-Alg and Sh-Alg, respectively. In vitro dissolution tests revealed a fast release at pH 6.8 for ethyl cellulose based coatings: t80% values of 65 and 45 min were observed for EC-CMC and EC-Alg coatings respectively. In contrast, a prolonged drug release was observed for Sh-Alg coatings in both pH 6.8 and 7.4 phosphate buffers. However, when more biologically relevant bicarbonate buffers were used, all coatings showed slower drug release. Disintegration tests, carried out in both simulated gastric and intestinal fluid, confirmed good mechanical resistance of EC-CMC and EC-Alg coating, and revealed poor durability of the thinner Sh-Alg. Under elevated gastric pH conditions (pH 2, 3 and 4), EC-CMC and EC-Alg coatings were broken after 70, 30, 55 min and after 30, 15, 15 min, respectively, while Sh-Alg coated tablets demonstrated gastric resistance at all pH values. The inventor(s) thus concluded that none of the GRAS-grade coatings fully complied with the different biological demands of delayed release coating systems.

As such, an object of the present invention is to provide an alternative natural coating, suitably an enteric coating. Another object of the invention is to provide a natural coating which solves at least one of the problems inherit by prior art coatings.

Another object of the invention is to provide a natural coating which inherits one or more of the following advantages:

Predominantly comprises natural materials;
Biodegradable;
Good Coatability;
Exhibits gastric resistance, suitably with a relatively high dissolution threshold (i.e. withstands higher pHs before dissolving);
Good delayed release properties (i.e. gastric resistance but relatively fast release within the intestine);
Suitability for use in pharmaceuticals, nutraceuticals, and food products;
No daily intake limit;
No plasticizers;
Aesthetically pleasing;
Transparency;
Long-term stability;
Consistency, especially over time;
Disintegratability.

SUMMARY OF THE INVENTION

According to a first aspect of the present invention there is provided a solid dosage form comprising a core coated with a coating; wherein the coating comprises a polysaccharide-based layer and/or a stabilising layer.

According to a further aspect of the present invention there is provided a solid dosage form comprising a core coated with a coating (suitably an enteric coating, suitably a coating which may itself comprise one or more layers); wherein the coating comprises a polysaccharide and a lipophilic component (e.g. surfactant).

According to a further aspect of the present invention there is provided a solid dosage form comprising a core coated with a coating (suitably an enteric coating, suitably a coating which may itself comprise one or more layers); wherein the coating comprises at least one polysaccharide and a lipophilic component (e.g. surfactant); wherein the at least one polysaccharide comprises a polyuronic acid (or a salt thereof) and/or an esterified derivative of a polyuronic acid (or a salt thereof).

According to a further aspect of the present invention there is provided a solid dosage form comprising a core coated with a coating (suitably an enteric coating, suitably a coating which may itself comprise one or more layers); wherein the coating comprises two or more polysaccharides and optionally a lipophilic component (e.g. surfactant);

wherein the two or more polysaccharides comprise a polyuronic acid (or a salt thereof) and an esterified polyuronic acid (or a salt thereof).

According to a further aspect of the present invention there is provided a solid dosage form comprising a core coated with a coating (suitably an enteric coating, suitably a coating which may itself comprise one or more layers); wherein the coating comprises two or more polysaccharides, a lipophilic component (e.g. surfactant), and optionally a stabilising component (where the stabilising component suitable resides in a stabilising layer which may or may not contain a polysaccharide, such as a polyuronic acid and/or esterified derivative thereof); wherein the two or more polysaccharides comprise a polyuronic acid (or a salt thereof) and an esterified polyuronic acid (or a salt thereof).

According to a further aspect of the present invention there is provided a solid dosage form comprising a core coated with a coating; wherein the coating comprises a polysaccharide-based layer, which polysaccharide-based layer comprises a non-esterified polyuronic acid (or a salt thereof) and optionally an esterified polyuronic acid (or a salt thereof).

According to a further aspect of the present invention there is provided a solid dosage form comprising a core coated with a coating; wherein the coating comprises a stabilising layer, which stabilising layer comprises a stabilising component (e.g. acid component) and an esterified polyuronic acid (or a salt thereof).

According to a further aspect of the present invention there is provided a solid dosage form comprising a core coated with a coating; wherein the coating comprises a wax.

According to a further aspect of the present invention there is provided a solid dosage form comprising a core coated with a coating; wherein the coating comprises a wax and at least one additional pharmaceutically acceptable excipient, carrier, or diluent.

According to a further aspect of the present invention there is provided a solid dosage form comprising a core coated with a coating; wherein the coating comprises a wax and a polysaccharide, most suitably a non-esterified polyuronic acid (e.g. alginic acid and/or a salt thereof).

According to a further aspect of the present invention there is provided a solid dosage form comprising a core coated with a coating; wherein the coating comprises a wax and a surfactant.

The term "core" may refer to any suitable "core". The "core" may be a single core of a given solid dosage form (e.g. tablet) or one of a plurality of cores present within a dosage form (e.g. granules, microparticles). In some embodiments of the invention, the term "core" may refer to a single bulk core, for instance a single core within a solid dosage form (e.g. a form suitable for oral administration/ingestion), for example a tablet. However, in other embodiments, a given core may be one of a plurality of cores (e.g. individual particles) which may themselves be a constituent part of a solid dosage form, for example granules or microparticles within a capsule—in such circumstances the granules or microparticles could be individually coated as per the invention.

According to a further aspect of the present invention, there is provided a solid dosage form comprising a core with a coating; wherein the coating comprises a plurality of coating layers, wherein the coating layers comprise:
  a lipophilic (e.g. wax-containing) coating layer comprising (suitably consisting essentially of or consisting of) a lipophilic component or mixture of lipophilic components (e.g. wax(es)); and
  at least one protective coating layer which provides protection (e.g. during formation, storage, processing, administration, consumption, digestion) for either or both the lipophilic coating layer (e.g. wax-containing layer) and/or the core.

According to a further aspect of the present invention there is provided a coating layer composition (or a kit of parts comprising one or more coating layer composition(s), suitably for producing a coating, the coating layer composition(s) comprising one or more of, suitably two or more of, suitably all three of:
  a polyuronic acid (or a salt thereof);
  an esterified derivative of a polyuronic acid (or a salt thereof); and
  a lipophilic component (e.g. surfactant);
where in the coating layer composition, or a further coating composition as part of a kit of parts, optionally comprises a stabilising component.

According to a further aspect of the present invention there is provided a coating composition (or a kit of parts comprising one or more coating layer composition(s), suitably for producing an enteric coating) comprising a polysaccharide-based coating composition and/or a stabilising coating composition.

According to a further aspect of the present invention there is provided a polysaccharide coating layer composition (or a coating composition) comprising a non-esterified polyuronic acid (or a salt thereof) and an esterified polyuronic acid (or a salt thereof).

According to a further aspect of the present invention there is provided a stabilising coating layer composition, comprising a stabilising component and optionally an esterified polyuronic acid (or a salt thereof).

According to a further aspect of the present invention there is provided a solid dosage form coating layer composition comprising a wax.

According to a further aspect of the present invention there is provided a solid dosage form coating layer composition comprising a wax and at least one additional pharmaceutically acceptable excipient, carrier, or diluent.

According to a further aspect of the present invention there is provided a solid dosage form coating layer composition comprising a wax and a polysaccharide, most suitably a non-esterified polyuronic acid (e.g. alginic acid and/or a salt thereof).

According to a further aspect of the present invention there is provided a solid dosage form coating layer composition comprising a wax and a surfactant.

Solid dosage form coating layer compositions defined herein may be in a liquid form (e.g. solution, emulsion, dispersion, suspension). Alternatively a solid dosage form coating layer composition may be provided as a solid (e.g. without a diluent or solvent(s) system). Such solid-based compositions may be produced by removing solvents from pre-prepared liquid-based compositions. Suitably such a solid-based coating layer composition is intended to be fluidised or liquidised prior to its application in the formation of solid dosage forms of the invention. However, solid-based coating layer compositions may in some circumstances be a more appropriate form in which to store the relevant compositions (e.g. for stability reasons). As such, the present invention provides a solid dosage form coating layer composition as defined anywhere herein, wherein the composition is in the form of a solid.

According to a further aspect of the present invention there is provided a method of preparing a solid dosage form which comprises a core coated with a coating, the method comprising: providing the core; coating the core with a coating composition (or with one or more coating layer composition(s), as defined herein, to produce the solid dosage form; and optionally drying, curing, and/or further processing the solid dosage form.

According to a further aspect of the present invention there is provided a solid dosage form obtainable by, obtained by, or directly obtained by a method of preparing a solid dosage form as defined herein.

According to a further aspect of the present invention there is provided a method of preparing a coating composition (or a coating layer composition), the method comprising dissolving and/or dispersing the ingredients, described herein in relation to a coating composition and/or coating layer composition(s), within a solvent system.

According to a further aspect of the present invention there is provided a method of treating a medical condition in a patient in need of such treatment, the method comprising administering to said patient a therapeutically effective amount of a solid dosage form as defined herein.

According to a further aspect of the present invention there is provided a solid dosage form for use in therapy, wherein the solid dosage form is as defined herein.

According to a further aspect of the present invention there is provided a solid dosage form for use in the manufacture of a medicament, wherein the solid dosage form is as defined herein.

According to a further aspect of the present invention there is provided a nutraceutical comprising a solid dosage form as defined herein.

According to a further aspect of the present invention there is provided a dietary supplement comprising a solid dosage form as defined herein.

According to a further aspect of the present invention there is provided a package (suitably a sealed package) comprising one or more solid dosage form(s) as defined herein.

Any features, including optional, suitable, and preferred features, described in relation to any particular aspect of the invention may also be features, including optional, suitable and preferred features, of any other aspect of the present invention.

BRIEF DESCRIPTION OF THE DRAWINGS

For a better understanding of the invention, and to show how embodiments of the same are put into effect, reference is now made, by way of example, to the following diagrammatic drawings, in which.

DETAILED DESCRIPTION OF THE INVENTION

Definitions

Figure 1:
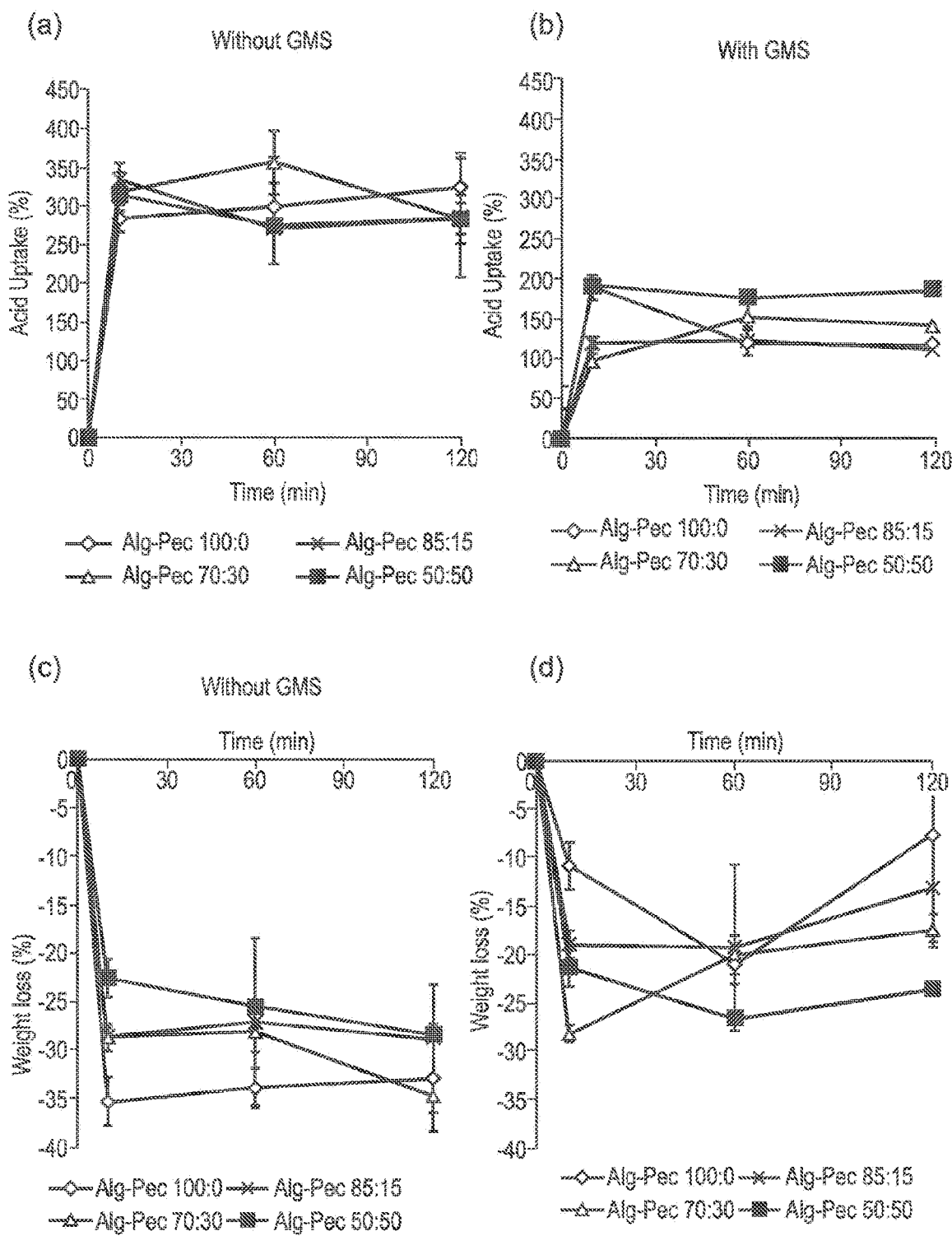
FIG. 1 shows acid uptake tests performed using casted films containing the stipulated ratio of Alg-Pec both: a) without any glycerol monostearate (GMS) surfactant, and b) with a glycerol monostearate (GMS) surfactant; and also shows time-course weight loss tests again upon casted films containing the stipulated ratio of Alg-Pec both: c) without any glycerol monostearate (GMS) surfactant, and d) with a glycerol monostearate (GMS) surfactant.

Unless otherwise stated, the following terms used in the specification and claims have the following meanings set out below.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

For the avoidance of doubt, it is hereby stated that the information disclosed earlier in this specification under the heading "Background" is relevant to the invention and is to be read as part of the disclosure of the invention.

Unless stated otherwise, any reference herein to an "average" value is intended to relate to the mean value.

Where a composition is said to comprise a plurality of stipulated ingredients (optionally in stipulated amounts of concentrations), said composition may optionally include additional ingredients other than those stipulated. However, in certain embodiments, a composition said to comprise a plurality of stipulated ingredients may in fact consist essentially of or consist of all the stipulated ingredients.

Herein, where a composition is said to "consists essentially of" a particular component, said composition suitably comprises at least 70 wt % of said component, suitably at least 90 wt % thereof, suitably at least 95 wt % thereof, most suitably at least 99 wt % thereof. Suitably, a composition said to "consist essentially of" a particular component consists of said component save for one or more trace impurities.

Where the quantity or concentration of a particular component of a given composition is specified as a weight percentage (wt % or % w/w), said weight percentage refers to the percentage of said component by weight relative to the total weight of the composition as a whole. It will be understood by those skilled in the art that the sum of weight percentages of all components of a composition will total 100 wt %. However, where not all components are listed (e.g. where compositions are said to "comprise" one or more particular components), the weight percentage balance may optionally be made up to 100 wt % by unspecified ingredients (e.g. a diluent, such as water, or other non-essentially but suitable additives).

Herein, unless stated otherwise, the term "parts" (e.g. parts by weight, pbw) when used in relation to multiple ingredients/components, refers to relative ratios between said multiple ingredients/components. Expressing molar or weight ratios of two, three or more components gives rise to the same effect (e.g. a molar ratio of x, y, and z is $x_1:y_1:z_1$ respectively, or a range $x_1-x_2:y_1-y_2:z_1-z_2$). Though in many embodiments the amounts of individual components within a composition may be given as a "wt %" value, in alternative embodiments any or all such wt % values may be converted to parts by weight (or relative ratios) to define a multi-component composition. This is so because the relative ratios between components is often more important than the absolute concentrations thereof in the liquid pharmaceutical compositions of the invention. Where a composition comprising multiple ingredients is described in terms of parts by weight alone (i.e. to indicate only relative ratios of ingredients), it is not necessary to stipulate the absolute amounts or concentrations of said ingredients (whether in toto or individually) because the advantages of the invention can stem from the relative ratios of the respective ingredients rather than their absolute quantities or concentrations. However, in certain embodiments, such compositions consist essentially of or consist of the stipulated ingredients and diluent(s) (e.g. water).

The term "mole percent" (i.e. mol %) is well understood by those skilled in the art, and the mol % of a particular constituent means the amount of the particular constituent (expressed in moles) divided by the total amount of all constituents (including the particular constiuent) converted into a percentage (i.e. by multiplying by 100). The concept of mol % is directly related to mole fraction.

The term "substantially free", when used in relation to a given component of a composition (e.g. "a liquid pharmaceutical composition substantially free of compound X"), refers to a composition to which essentially none of said component has been added. When a composition is "substantially free" of a given component, said composition suitably comprises no more than 0.001 wt % of said component, suitably no more than 0.0001 wt % of said component, suitably no more than 0.00001 wt %, suitably no more than 0.000001 wt %, suitably no more than 0.0000001 wt % thereof, most suitably no more than 0.0001 parts per billion (by weight).

The term "entirely free", when used in relation to a given component of a composition (e.g. "a liquid pharmaceutical composition entirely free of compound X"), refers to a composition containing none of said component.

Herein, in the context of the present specification, a "strong acid" is suitably one having a $pK_a$ of −1.0 or less, whereas a "weak acid" is suitably one having a $pK_a$ of 2.0 or more. Herein, in the context of the present specification, a "strong base" is suitably one whose conjugate acid has a $pK_a$ of 12 or higher (suitably 14 or higher), whereas a "weak base" is suitably one whose conjugate acid has a $pK_a$ of 10 or less.

Unless stated otherwise, references herein to a "pKa" should be construed as a pKa value in water at standard ambient temperature and pressure (SATP), suitably of the conjugate acid of the relevant species.

Suitably, unless stated otherwise, where reference is made to a parameter (e.g. pH, pKa, etc.) or state of a material (e.g. liquid, gas, etc.) which may depend on pressure and/or temperature, suitably in the absence of further clarification such a reference refers to said parameter at standard ambient temperature and pressure (SATP). SATP is a temperature of 298.15 K (25° C., 77° F.) and an absolute pressure of 100 kPa (14.504 psi, 0.987 atm).

References herein to "solubility" suitably refer to thermodynamic and/or kinetic solubilities. Unqualified references to solubilities are suitably thermodynamic solubilities, whereas solubilities qualified by a rate (e.g. slowly soluble) suitably refers to kinetic solubility.

References herein to solubilities at particular pHs or within particular pH ranges are suitably in water (either acidified or basified as appropriate), suitably at SATP, though something declared to be soluble may be soluble at higher temperatures, such as 40° C., or 60° C., and less soluble at SATP, and as such solubilisation may typically take place (during any manufacturing process) at elevated temperatures. Solubilities cited at acidic pHs may suitably refer to solubilities in an aqueous HCl solution (whether buffered or not, whether adjusted with base or not, suitably a basic salt of a monovalent cation, e.g. NaOH), whilst solubilities cited at basic pHs may suitably refer to solubilities in an aqueous NaOH solution (whether buffered or not, whether adjusted with acid or not). Suitably any solubility tests exclude the presence of any cations other than $H^+$ or $Na^+$, or at least exclude any multivalent cations.

A "therapeutically effective amount" means the amount of a compound or compounds that, when administered to a mammal for treating a disease, is sufficient to effect such treatment for the disease. The "therapeutically effective amount" will vary depending on the compound, the disease and its severity and the age, weight, etc., of the mammal to be treated.

In the context of the invention, routes of administration are suitably oral routes.

Herein, unless stated otherwise, all chemical nomenclature may be defined in accordance with IUPAC definitions.

Herein, the term "hydrocarbon" is well understood in the art, and refers to compounds containing carbon and hydrogen only. The term "hydrocarbyl" general refers any aliphatic, acyclic, or cyclic (including aryl) hydrocarbon group, suitably with no heteroatoms. Such compounds include, inter alia, alkanes, alkenes, alkynes, arenes, and cyclic versions thereof. The term "hydrocarbon" anthracene, naphthalene, benzene, and/or derivatives thereof (e.g. toluene).

Herein, the term "carbocyclyl", "carbocycle" or "carbocyclic" refers to a radical of a non-aromatic cyclic hydrocarbon group, generally having from 3 to 10 ring carbon atoms (i.e. (3-10° C.) carbocyclyl) and zero heteroatoms in the non-aromatic ring system. Suitably, carbocyclyl groups include (3-nC)cycloalkyl and (3-nC)cycloalkenyl. Exemplary embodiments include: cyclobutyl, cyclobutenyl, cyclopentyl, cyclopentenyl, cyclohexyl, cyclohexenyl, cyclohexadienyl, cycloheptyl, cycloheptenyl, cycloheptadienyl, cycloheptatrienyl, cyclooctyl, cyclooctenyl, bicyclo[2.2.1]heptanyl, bicyclo[2.2.2]octanyl, and the like.

Herein, the term "macrocyclyl", "macrocycle" or "macrocyclic" refers to macrocyclic rings, which are well known in the art. Such macrocylcic rings are suitably cyclic macromolecules or macromolecular cyclic portion(s) of a molecule. Suitably a macrocyclic ring has nine or more atoms within the ring. Suitably a macrocyclic ring has three or more internal electron-pair donating atoms. A macrocyclic ring is suitably a cyclic molecule able to co-ordinate to a central metal species (e.g. $Mg^{2+}$). Examples include porphyrins.

Herein, the term "carbohydrate" is well understood in the art, and refers to compounds containing carbon, hydrogen, and oxygen only. Such compounds include esters, ketones, aldehydes, sugars, etc.

In this specification, the term "alkyl" includes both straight and branched chain alkyl groups. References to individual alkyl groups such as "propyl" are specific for the straight chain version only and references to individual branched chain alkyl groups such as "isopropyl" are specific for the branched chain version only. For example, "(1-6C) alkyl" includes (1-4C) alkyl, (1-3C) alkyl, propyl, isopropyl and t-butyl. A similar convention applies to other radicals, for example, "phenyl (1-6C) alkyl" includes phenyl (1-4C) alkyl, benzyl, 1-phenylethyl and 2-phenylethyl.

The term "(m-nC)" or "(m-nC) group" used alone or as a prefix, refers to any group having m to n carbon atoms.

An "alkylene," "alkenylene," or "alkynylene" group is an alkyl, alkenyl, or alkynyl group that is positioned between and serves to connect two other chemical groups. Thus, "(1-6C)alkylene" means a linear saturated divalent hydrocarbon radical of one to six carbon atoms or a branched saturated divalent hydrocarbon radical of three to six carbon atoms, for example, methylene, ethylene, propylene, 2-methylpropylene, pentylene, and the like.

"(2-6C)alkenylene" means a linear divalent hydrocarbon radical of two to six carbon atoms or a branched divalent hydrocarbon radical of three to six carbon atoms, containing at least one double bond, for example, as in ethenylene, 2,4-pentadienylene, and the like.

"(2-6C) alkynylene" means a linear divalent hydrocarbon radical of two to six carbon atoms or a branched divalent hydrocarbon radical of three to six carbon atoms, containing at least one triple bond, for example, as in ethynylene, propynylene, and butynylene and the like.

"(3-8C)cycloalkyl" means a hydrocarbon ring containing from 3 to 8 carbon atoms, for example, cyclopropyl, cyclobutyl, cyclopentyl, cyclohexyl, cycloheptyl or bicyclo[2.2.1]heptyl.

"(3-8C) cycloalkenyl" means a hydrocarbon ring containing at least one double bond, for example, cyclobutenyl, cyclopentenyl, cyclohexenyl or cycloheptenyl, such as 3-cyclohexen-1-yl, or cyclooctenyl.

"(3-8C) cycloalkyl-(1-6C)alkylene" means a (3-8C)cycloalkyl group covalently attached to a (1-6C)alkylene group, both of which are defined herein.

The term "halo" refers to fluoro, chloro, bromo and iodo.

The term "heterocyclyl", "heterocyclic" or "heterocycle" means a non-aromatic saturated or partially saturated monocyclic, fused, bridged, or spiro bicyclic heterocyclic ring system(s). The term heterocyclyl includes both monovalent species and divalent species. Monocyclic heterocyclic rings contain from about 3 to 12 (suitably from 3 to 7) ring atoms, with from 1 to 5 (suitably 1, 2 or 3) heteroatoms selected from nitrogen, oxygen or sulfur in the ring. Bicyclic heterocycles contain from 7 to 17 member atoms, suitably 7 to 12 member atoms, in the ring. Bicyclic heterocycles contain from about 7 to about 17 ring atoms, suitably from 7 to 12 ring atoms. Bicyclic heterocyclic(s) rings may be fused, spiro, or bridged ring systems. Examples of heterocyclic groups include cyclic ethers such as oxiranyl, oxetanyl, tetrahydrofuranyl, dioxanyl, and substituted cyclic ethers. Heterocycles containing nitrogen include, for example, azetidinyl, pyrrolidinyl, piperidinyl, piperazinyl, tetrahydrotriazinyl, tetrahydropyrazolyl, and the like. Typical sulfur containing heterocycles include tetrahydrothienyl, dihydro-1,3-dithiol, tetrahydro-2H-thiopyran, and hexahydrothiepine. Other heterocycles include dihydro-oxathiolyl, tetrahydro-oxazolyl, tetrahydro-oxadiazolyl, tetrahydrodioxazolyl, tetrahydro-oxathiazolyl, hexahydro-triazinyl, tetrahydro-oxazinyl, morpholinyl, thiomorpholinyl, tetrahydropyrimidinyl, dioxolinyl, octahydrobenzofuranyl, octahydrobenzimidazolyl, and octahydrobenzothiazolyl. For heterocycles containing sulfur, the oxidized sulfur heterocycles containing SO or SO2 groups are also included. Examples include the sulfoxide and sulfone forms of tetrahydrothienyl and thiomorpholinyl such as tetrahydrothiene 1,1-dioxide and thiomorpholinyl 1,1-dioxide. A suitable value for a heterocyclyl group which bears 1 or 2 oxo (=O) or thioxo (=S) substituents is, for example, 2-oxopyrrolidinyl, 2-thioxopyrrolidinyl, 2-oxoimidazolidinyl, 2-thioxoimidazolidinyl, 2-oxopiperidinyl, 2,5-dioxopyrrolidinyl, 2,5-dioxoimidazolidinyl or 2,6-dioxopiperidinyl. Particular heterocyclyl groups are saturated monocyclic 3 to 7 membered heterocyclyls containing 1, 2 or 3 heteroatoms selected from nitrogen, oxygen or sulfur, for example azetidinyl, tetrahydrofuranyl, tetrahydropyranyl, pyrrolidinyl, morpholinyl, tetrahydrothienyl, tetrahydrothienyl 1,1-dioxide, thiomorpholinyl, thiomorpholinyl 1,1-dioxide, piperidinyl, homopiperidinyl, piperazinyl or homopiperazinyl. As the skilled person would appreciate, any heterocycle may be linked to another group via any suitable atom, such as via a carbon or nitrogen atom. However, reference herein to piperidino or morpholino refers to a piperidin-1-yl or morpholin-4-yl ring that is linked via the ring nitrogen.

By "bridged ring systems" is meant ring systems in which two rings share more than two atoms, see for example Advanced Organic Chemistry, by Jerry March, 4th Edition, Wiley Interscience, pages 131-133, 1992. Examples of bridged heterocyclyl ring systems include, aza-bicyclo

[2.2.1]heptane, 2-oxa-5-azabicyclo[2.2.1]heptane, aza-bicyclo[2.2.2]octane, aza-bicyclo[3.2.1]octane and quinuclidine.

"Heterocyclyl(1-6C)alkyl" means a heterocyclyl group covalently attached to a (1-6C)alkylene group, both of which are defined herein.

The term "heteroaryl" or "heteroaromatic" means an aromatic mono-, bi-, or polycyclic ring incorporating one or more (for example 1-4, particularly 1, 2 or 3) heteroatoms selected from nitrogen, oxygen or sulfur. The term heteroaryl includes both monovalent species and divalent species. Examples of heteroaryl groups are monocyclic and bicyclic groups containing from five to twelve ring members, and more usually from five to ten ring members. The heteroaryl group can be, for example, a 5- or 6-membered monocyclic ring or a 9- or 10-membered bicyclic ring, for example a bicyclic structure formed from fused five and six membered rings or two fused six membered rings. Each ring may contain up to about four heteroatoms typically selected from nitrogen, sulfur and oxygen. Typically the heteroaryl ring will contain up to 3 heteroatoms, more usually up to 2, for example a single heteroatom. In one embodiment, the heteroaryl ring contains at least one ring nitrogen atom. The nitrogen atoms in the heteroaryl rings can be basic, as in the case of an imidazole or pyridine, or essentially non-basic as in the case of an indole or pyrrole nitrogen. In general, the number of basic nitrogen atoms present in the heteroaryl group, including any amino group substituents of the ring, will be less than five.

Examples of heteroaryl include furyl, pyrrolyl, thienyl, oxazolyl, isoxazolyl, imidazolyl, pyrazolyl, thiazolyl, isothiazolyl, oxadiazolyl, thiadiazolyl, triazolyl, tetrazolyl, pyridyl, pyridazinyl, pyrimidinyl, pyrazinyl, 1,3,5-triazenyl, benzofuranyl, indolyl, isoindolyl, benzothienyl, benzoxazolyl, benzimidazolyl, benzothiazolyl, benzothiazolyl, indazolyl, purinyl, benzofurazanyl, quinolyl, isoquinolyl, quinazolinyl, quinoxalinyl, cinnolinyl, pteridinyl, naphthyridinyl, carbazolyl, phenazinyl, benzisoquinolinyl, pyridopyrazinyl, thieno[2,3-b]furanyl, 2H-furo[3,2-b]-pyranyl, 5H-pyrido[2,3-d]-o-oxazinyl, 1H-pyrazolo[4,3-d]-oxazolyl, 4H-imidazo[4,5-d]thiazolyl, pyrazino[2,3-d]pyridazinyl, imidazo[2,1-b]thiazolyl, imidazo[1,2-b][1,2,4]triazinyl. "Heteroaryl" also covers partially aromatic bi- or polycyclic ring systems wherein at least one ring is an aromatic ring and one or more of the other ring(s) is a non-aromatic, saturated or partially saturated ring, provided at least one ring contains one or more heteroatoms selected from nitrogen, oxygen or sulfur. Examples of partially aromatic heteroaryl groups include for example, tetrahydroisoquinolinyl, tetrahydroquinolinyl, 2-oxo-1,2,3,4-tetrahydroquinolinyl, dihydrobenzthienyl, dihydrobenzfuranyl, 2,3-dihydro-benzo[1,4]dioxinyl, benzo[1,3]dioxolyl, 2,2-dioxo-1,3-dihydro-2-benzothienyl, 4,5,6,7-tetrahydrobenzofuranyl, indolinyl, 1,2,3,4-tetrahydro-1,8-naphthyridinyl, 1,2,3,4-tetrahydropyrido[2,3-b]pyrazinyl and 3,4-dihydro-2H-pyrido[3,2-b][1,4]oxazinyl Examples of five membered heteroaryl groups include but are not limited to pyrrolyl, furanyl, thienyl, imidazolyl, furazanyl, oxazolyl, oxadiazolyl, oxatriazolyl, isoxazolyl, thiazolyl, isothiazolyl, pyrazolyl, triazolyl and tetrazolyl groups.

Examples of six membered heteroaryl groups include but are not limited to pyridyl, pyrazinyl, pyridazinyl, pyrimidinyl and triazinyl.

A bicyclic heteroaryl group may be, for example, a group selected from:

a) a benzene ring fused to a 5- or 6-membered ring containing 1, 2 or 3 ring heteroatoms;

b) a pyridine ring fused to a 5- or 6-membered ring containing 1, 2 or 3 ring heteroatoms;

c) a pyrimidine ring fused to a 5- or 6-membered ring containing 1 or 2 ring heteroatoms;

d) a pyrrole ring fused to a 5- or 6-membered ring containing 1, 2 or 3 ring heteroatoms;

e) a pyrazole ring fused to a 5- or 6-membered ring containing 1 or 2 ring heteroatoms;

f) a pyrazine ring fused to a 5- or 6-membered ring containing 1 or 2 ring heteroatoms;

g) an imidazole ring fused to a 5- or 6-membered ring containing 1 or 2 ring heteroatoms;

h) an oxazole ring fused to a 5- or 6-membered ring containing 1 or 2 ring heteroatoms;

i) an isoxazole ring fused to a 5- or 6-membered ring containing 1 or 2 ring heteroatoms;

j) a thiazole ring fused to a 5- or 6-membered ring containing 1 or 2 ring heteroatoms;

k) an isothiazole ring fused to a 5- or 6-membered ring containing 1 or 2 ring heteroatoms;

l) a thiophene ring fused to a 5- or 6-membered ring containing 1, 2 or 3 ring heteroatoms;

m) a furan ring fused to a 5- or 6-membered ring containing 1, 2 or 3 ring heteroatoms;

n) a cyclohexyl ring fused to a 5- or 6-membered heteroaromatic ring containing 1, 2 or 3 ring heteroatoms; and o) a cyclopentyl ring fused to a 5- or 6-membered heteroaromatic ring containing 1, 2 or 3 ring heteroatoms.

Particular examples of bicyclic heteroaryl groups containing a six membered ring fused to a five membered ring include but are not limited to benzfuranyl, benzthiophenyl, benzimidazolyl, benzoxazolyl, benzisoxazolyl, benzthiazolyl, benzisothiazolyl, isobenzofuranyl, indolyl, isoindolyl, indolizinyl, indolinyl, isoindolinyl, purinyl (e.g., adeninyl, guaninyl), indazolyl, benzodioxolyl and pyrazolopyridinyl groups.

Particular examples of bicyclic heteroaryl groups containing two fused six membered rings include but are not limited to quinolinyl, isoquinolinyl, chromanyl, thiochromanyl, chromenyl, isochromenyl, chromanyl, isochromanyl, benzodioxanyl, quinolizinyl, benzoxazinyl, benzodiazinyl, pyridopyridinyl, quinoxalinyl, quinazolinyl, cinnolinyl, phthalazinyl, naphthyridinyl and pteridinyl groups.

"Heteroaryl(1-6C)alkyl" means a heteroaryl group covalently attached to a (1-6C)alkylene group, both of which are defined herein. Examples of heteroaralkyl groups include pyridin-3-ylmethyl, 3-(benzofuran-2-yl)propyl, and the like.

The term "aryl" means a cyclic or polycyclic aromatic ring having from 5 to 12 carbon atoms. The term aryl includes both monovalent species and divalent species. Examples of aryl groups include, but are not limited to, phenyl, biphenyl, naphthyl and the like. In particular embodiment, an aryl is phenyl.

The term "aryl (1-6C) alkyl" means an aryl group covalently attached to a (1-6C)alkylene group, both of which are defined herein. Examples of aryl-(1-6C)alkyl groups include benzyl, phenylethyl, and the like This specification also makes use of several composite terms to describe groups comprising more than one functionality. Such terms will be understood by a person skilled in the art. For example heterocyclyl (m-nC)alkyl comprises (m-nC)alkyl substituted by heterocyclyl.

Wherever groups with large carbon chains are disclosed (e.g. (1-12C)alkyl, (1-8C)alkenyl, etc.), such groups may optionally be shortened, for instance containing a between 1 and 5 carbons (e.g. (1-5C)alkyl or (1-5C)alkenyl), or contain between 1 and 3 carbons (e.g. (1-3C)alkyl or (1-3C)alkenyl instead of (1-12C)alkyl or (1-8C)alkenyl).

The term "optionally substituted" refers to either groups, structures, or molecules that are substituted and those that are not substituted.

Where optional substituents are chosen from "one or more" groups it is to be understood that this definition includes all substituents being chosen from one of the specified groups or the substituents being chosen from two or more of the specified groups.

The phrase "compound of the invention" means those compounds which are disclosed herein, both generically and specifically.

A suitable pharmaceutically acceptable salt of a compound of the invention is, for example, an acid-addition salt of a compound of the invention which is sufficiently basic, for example, an acid-addition salt with, for example, an inorganic or organic acid, for example hydrochloric, hydrobromic, sulfuric, phosphoric, trifluoroacetic, formic, citric or maleic acid. In addition a suitable pharmaceutically acceptable salt of a compound of the invention which is sufficiently acidic is an alkali metal salt, for example a sodium or potassium salt, an alkaline earth metal salt, for example a calcium or magnesium salt, an ammonium salt or a salt with an organic base which affords a physiologically-acceptable cation, for example a salt with methylamine, dimethylamine, trimethylamine, piperidine, morpholine or tris-(2-hydroxyethyl)amine.

Compounds of formula I in which Z is $N^+$–Q in particular are cationic and will be associated with one or more counter anions. The compound of formula I possesses a +1 charge. The anion may carry a −1 charge, in which case the molar ratio of anion:cation is 1:1, or, alternatively, the anion may carry a −2 or −3 charge, in which case the molar ratio of anion:cation is will be 1:2 or 1:3, respectively.

In one embodiment, the anion is independently derived from one or more of the following acids: hydrochloric, hydrobromic, hydroiodic, sulfuric, sulfurous, nitric, nitrous, phosphoric, phosphorous acetic, propionic, succinic, gycolic, stearic, lactic, malic, tartaric, citric, ascorbic, maleic, hydroxymaleic, phenylacetic, glutamic, benzoic, salicylic, sulfanilic, 2-acetoxybenzoic, fumaric, toluenesulfonic, methanesulfonic, ethanesulfonic, ethane disulfonic, oxalic, isethionic, and valeric.

Compounds that have the same molecular formula but differ in the nature or sequence of bonding of their atoms or the arrangement of their atoms in space are termed "isomers". Isomers that differ in the arrangement of their atoms in space are termed "stereoisomers". Stereoisomers that are not mirror images of one another are termed "diastereomers" and those that are non-superimposable mirror images of each other are termed "enantiomers". When a compound has an asymmetric center, for example, it is bonded to four different groups, a pair of enantiomers is possible. An enantiomer can be characterized by the absolute configuration of its asymmetric center and is described by the R- and S-sequencing rules of Cahn and Prelog, or by the manner in which the molecule rotates the plane of polarized light and designated as dextrorotatory or levorotatory (i.e., as (+) or (−)-isomers respectively). A chiral compound can exist as either individual enantiomer or as a mixture thereof. A mixture containing equal proportions of the enantiomers is called a "racemic mixture".

The compounds of this invention may possess one or more asymmetric centers; such compounds can therefore be produced as individual (R)- or (S)-stereoisomers or as mixtures thereof. Unless indicated otherwise, the description or naming of a particular compound in the specification and claims is intended to include both individual enantiomers and mixtures, racemic or otherwise, thereof. The methods for the determination of stereochemistry and the separation of stereoisomers are well-known in the art (see discussion in Chapter 4 of "Advanced Organic Chemistry", 4th edition J. March, John Wiley and Sons, New York, 2001), for example by synthesis from optically active starting materials or by resolution of a racemic form. Some of the compounds of the invention may have geometric isomeric centres (E- and Z-isomers). It is to be understood that the present invention encompasses all optical, diastereoisomers and geometric isomers and mixtures thereof that possess telomerase inhibitory activity.

The present invention also encompasses compounds of the invention as defined herein which comprise one or more isotopic substitutions. For example, H may be in any isotopic form, including $^1H$, $^2H(D)$, and $^3H$ (T); C may be in any isotopic form, including $^{12}C$, $^{13}C$, and $^{14}C$; and O may be in any isotopic form, including $^{16}O$ and $^{18}O$; and the like.

It is also to be understood that certain compounds of the formula I may exhibit polymorphism, and that the invention encompasses all such forms.

Compounds may exist in a number of different tautomeric forms and references to compounds include all such forms. For the avoidance of doubt, where a compound can exist in one of several tautomeric forms, and only one is specifically described or shown, all others are nevertheless embraced by the definition of the compound. Examples of tautomeric forms include keto-, enol-, and enolate-forms, as in, for example, the following tautomeric pairs: keto/enol (illustrated below), imine/enamine, amide/imino alcohol, amidine/amidine, nitroso/oxime, thioketone/enethiol, and nitro/aci-nitro.

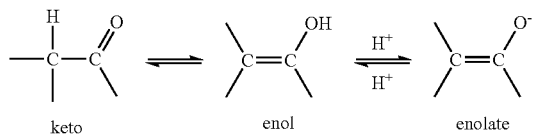

keto     enol     enolate

Compounds of the formula I containing an amine function may also form N-oxides. A reference herein to a compound of the formula I that contains an amine function also includes the N-oxide. Where a compound contains several amine functions, one or more than one nitrogen atom may be oxidised to form an N-oxide. Particular examples of N-oxides are the N-oxides of a tertiary amine or a nitrogen atom of a nitrogen-containing heterocycle. N-Oxides can be formed by treatment of the corresponding amine with an oxidizing agent such as hydrogen peroxide or a per-acid (e.g. a peroxycarboxylic acid), see for example Advanced Organic Chemistry, by Jerry March, 4th Edition, Wiley Interscience, pages. More particularly, N-oxides can be made by the procedure of L. W. Deady (Syn. Comm. 1977, 7, 509-514) in which the amine compound is reacted with m-chloroperoxybenzoic acid (MCPBA), for example, in an inert solvent such as dichloromethane.

The compounds of formula I may be administered in the form of a pro-drug which is broken down in the human or animal body to release a compound of the invention. A pro-drug may be used to alter the physical properties and/or the pharmacokinetic properties of a compound of the invention. A pro-drug can be formed when the compound of the invention contains a suitable group or substituent to which a property-modifying group can be attached. Examples of pro-drugs include in vivo cleavable ester derivatives that may be formed at a carboxy group or a hydroxy group in a compound of the formula I and in-vivo cleavable amide derivatives that may be formed at a carboxy group or an amino group in a compound of the formula I.

Accordingly, the present invention includes those compounds of the formula I as defined hereinbefore when made available by organic synthesis and when made available within the human or animal body by way of cleavage of a pro-drug thereof. Accordingly, the present invention includes those compounds of the formula I that are produced by organic synthetic means and also such compounds that are produced in the human or animal body by way of metabolism of a precursor compound, that is a compound of the formula I may be a synthetically-produced compound or a metabolically-produced compound.

A suitable pharmaceutically acceptable pro-drug of a compound of the formula I is one that is based on reasonable medical judgement as being suitable for administration to the human or animal body without undesirable pharmacological activities and without undue toxicity.

Herein, the term "carbohydrate" is well understood in the art, and refers to compounds containing carbon, hydrogen, and oxygen only. Such compounds include esters, ketones, aldehydes, sugars, etc.

Herein, the term "saccharide" is well understood in the art, and suitably includes carbohydrates such as sugars and derivatives thereof such as sugar alcohols and sugar acids (e.g. uronic acids). Saccharides include monosaccharides, disaccharides, oligosaccharides, and polysaccharides.

Herein, the term "polysaccharide" is well understood in the art, and suitably includes polymers (or compounds with a polymeric backbone) comprising or consisting of repeat monosaccharide and/or disaccharide units, or their derivatives, held together by glycosidic bonds. Polysaccharides include esterified polyuronic acids (or a salt thereof) and/or non-esterified polyuronic acids (or a salt thereof).

Polyuronic acids suitably have a polyuronic acid backbone comprising uronic acid repeating units (e.g. hexuronic acid repeating units). This backbone may be linear or branched. Polyuronic acids may be optionally substituted and/or branched (typically via one or more hydroxyl moieties), and may have one or more modified acid groups (e.g. esters and/or amides).

Uronic acids are sugar acids with both carbonyl and carboxylic acid groups, the carboxylic acid group being an oxidised form of a terminal or primary hydroxyl group of the parent sugar compound. An esterified uronic acid (or uronic acid ester) is a uronic acid whose carboxyl moiety is a carboxylate ester moiety rather than a carboxylic acid moiety.

Esterified polyuronic acids are polyuronic acids with at least some of the carboxylic acid moieties replaced by carboxylate ester moieties (i.e. esterified carboxylic acid moieties, e.g. (1-6C) alkylester, especially methyl esters). An esterified polyuronic acid is suitably characterised by being at least 10% esterified (i.e. wherein at least 10% of the carboxyl moieties are carboxylate ester moieties).

Non-esterified polyuronic acids are polyuronic acids with substantially no carboxylate ester groups, or with substantially no carboxylate ester groups within the polyuronic acid backbone. A non-esterified polyuronic acid is suitably characterised as being less than 10% esterified, suitably less than 5% esterified, more suitably less than 2% esterified, more suitably less than 1% esterified, suitably less than 0.1% esterified (i.e. wherein less than 0.1% of the carboxyl moieties are carboxylate ester moieties).

References herein to uronic acids and/or polyuronic acids suitably include, unless otherwise specified, acceptable (e.g. pharmaceutically acceptable, nutraceutically acceptable, and/or dietary supplementally acceptable) salts, partial salts, and/or complex salts thereof, though the pH of the local environment will typically determine whether or not relevant carboxylic acids are in their free-acid form or salt form(s).

References herein to a polysaccharide-based layer may alternatively refer to any further coating layer for use in combination with a stabilising coating layer of the invention.

References herein to a "wax" would be understood by those skilled in the art. A "wax" is a hydrophobic organic compound (or mixture of such compounds), and is suitably a solid at SATP. Waxes suitably have a melting point above 30° C., but more suitably above 40° C. Waxes typically melt to form a free-flowing liquid. A wax is water-insoluble. A wax is not a surfactant and, though a wax compound may comprise a functional group (e.g. an ester linkage), hydrophobic groups (e.g. long alkyl chains) predominante to prevent surface activity. Animal and plant waxes generally comprise esters of carboxylic acids (suitably fatty acids) and fatty alcohols, though plant waxes generally additionally comprise non-esterified hydrocarbons in high concentrations (sometimes exceeding the esterified derivatives). Plant and animal-based waxes may occur naturally, or may be formed through selective chemical modification or naturally-occurring plant and animal waxes or oils (e.g. vegetable oils can be converted to waxes). Though parafin waxes (hydrocarbons obtained from petroleum) and synthetic waxes (e.g. formed by cracking polyethylene) may be suitable for use with the invention, most suitably the invention does not include any such waxes. Most suitably the present invention employs naturally occurring wax e.g. an animal wax, a plant/vegetable wax, and/or a mineral wax.

Animal waxes suitable for use with the present invention include beeswax, Chinese wax, Lanolin, and Spermaceti.

Plant/vegetable waxes suitable for use with the present invention include bayberry wax, candelilla wax, carnauba wax, castor wax, esparto wax, Japan wax, Ouricury wax, rice bran wax, soy wax, tallow tree wax.

Mineral waxes suitable for use with the present invention include ceresin wax, montan wax, ozocerite wax, peat wax.

The term "(m-nC)" or "(m-nC) group" used alone or as a prefix, refers to any group having m to n carbon atoms.

The term "optionally substituted" refers to either groups, structures, or molecules that are substituted and those that are not substituted.

Where optional substituents are chosen from "one or more" groups it is to be understood that this definition includes all substituents being chosen from one of the specified groups or the substituents being chosen from two or more of the specified groups.

Herein, the term "particle size" or "pore size" refers respectively to the length of the longest dimension of a given particle or pore. Particle and pore sizes may be measured using methods well known in the art, including a laser particle size analyser and/or electron microscopes (e.g. transmission electron microscope, TEM, or scanning electron microscope, SEM).

The invention provides formulations (e.g. solid dosage forms) suitably comprising an active formulated for pharmaceutical, nutraceutical, or dietary supplemental use and optionally further comprising a pharmaceutically, nutraceutically, or dietary supplementally acceptable diluent, excipient and/or carrier.

The invention therefore includes pharmaceutical formulations which may include, in addition to active ingredient, a pharmaceutically acceptable diluent, excipient and/or carrier. Such formulations may be used in the methods of the disclosure. Additionally or alternatively, pharmaceutical formulations may include a buffer, stabiliser and/or other material well known to those skilled in the art. Such materials are suitably non-toxic (and/or Generally Recognized As Safe) and suitably should not interfere with the efficacy of the active ingredient.

Compositions are provided that include one or more of the actives that are disclosed herein in a carrier. The compositions can be prepared in unit dosage form for administration to a subject. The amount and timing of administration are at the discretion of the treating physician to achieve the desired purposes. The active may be formulated for systemic or local administration.

Amounts effective for therapeutic use, which may be a prophylactic use, will depend upon the severity of the disease/condition and the general state of the patient's health. A therapeutically effective amount of the active is that which provides either subjective relief of a symptom(s) or an objectively identifiable improvement as noted by the clinician or other qualified observer.

An active of the disclosure may be administered in conjunction with another active agent, whether simultaneously, separately or sequentially. The other active agent may be a second active agent of the invention or an active agent falling outside the invention.

Single or multiple administrations of the formulations of the disclosure are administered depending on the dosage and frequency as required and tolerated by the patient. In any event, the composition should provide a sufficient quantity of at least one of the actives disclosed herein to effectively treat the patient, bearing in mind though that it may not be possible to achieve effective treatment in every instance. The dosage can be administered once but may be applied periodically until either a therapeutic result is achieved or until side effects warrant discontinuation of treatment. The dose may be sufficient to treat or ameliorate symptoms or signs of disease/condition without producing unacceptable toxicity to the patient.

The solid dosage forms of the invention are suitably administered orally. An active may be administered orally in a liquid dosage form or a solid dosage form. Examples of cores for use in solid dosage forms of the invention include tablets, capsules, granules, powders, beads and microcapsules. An active agent of the disclosure, with or without at least one additional agents, that is administered in a solid dosage may be formulated with or without those carriers customarily used in the compounding of solid dosage forms such as tablets and capsules. A given core may be designed to release the active portion of the formulation at the point in the gastrointestinal tract where bioavailability is maximized and pre-systemic degradation is minimized. At least one additional agent may be included to facilitate absorption of an active of the disclosure and/or any additional agents. In such cores, the active compound is typically mixed with at least one inert, pharmaceutically acceptable excipient or carrier such as lactose, sodium citrate or dicalcium phosphate and/or one or more: a) fillers or extenders for example starches, lactose, sucrose, glucose, mannitol and silicic acid; b) binders for example carboxymethylcellulose, alginates, gelatin, polyvinylpyrrolidone, sucrose and acacia; c) humectants for example glycerol; d) disintegrating agents for example agar-agar, calcium carbonate, potato or tapioca starch, alginic acid, certain silicates and sodium carbonate; e) solution retarding agents for example paraffin; f) absorption accelerators for example quaternary ammonium compounds; g) wetting agents for example cetyl alcohol and glycerol monostearate; h) absorbents for example kaolin and bentonite clay and i) lubricants for example talc, calcium stearate, magnesium stearate, solid polyethylene glycols, sodium lauryl sulfate and mixtures thereof. Solid compositions of a similar type may also be employed as fillers in soft and hard-filled gelatin capsules using such excipients as lactose or high molecular weight polyethylene glycol, for example.

References herein to pH-dependent gelling properties suitably pertain to a particular substance's (or combination of substances') ability to form gels at a stipulated pH or within a stipulated pH range. Though such gelling properties may, in some cases, additionally depend on other factors (e.g. temperature, concentration of solids, presence of certain cations, etc.), unless stated otherwise the skilled person will appreciate that a substance's capacity to form gels at certain stipulated pHs will be suitably manifested (i.e. under experimental conditions) following judicious selection of other factors/conditions which would be a routine matter for those skilled in the art. For example, HM pectins may require a certain concentration (in solution) (e.g. >20% by weight, suitably >40%, suitably >60%) before significant gellation can occur.

Herein, the term "natural" when used in reference to a particular ingredient suitably means an ingredient that is obtainable from natural sources (albeit optionally after a degree of processing, e.g. extraction).

General Principles and Advantages

The present invention provides a novel set of coatings (principally enteric coatings) which can be incorporated into solid dosage forms (for instance as a single layer or multiple different coating layers which singly or collectively form the coating), such as orally-administered pharmaceuticals, nutraceuticals, and/or dietary supplements, to facilitate the delivery and release of relevant active ingredient(s) to/within the (small) intestine.

The present invention also enables the use of natural ingredients in the formation of enteric coatings, including GRAS-approved (i.e. Generally Recognized As Safe) natural ingredients, which significantly reduces the regulatory and toxicity burdens which apply to synthetic enteric coatings used, for instance, in the pharmaceutical industry. The natural coatings of the invention potentially "unlock" a variety of nutraceuticals and/or dietary supplements which would otherwise have been unviable for human consumption (e.g. from a bioavailability, regulatory, and/or toxicity standpoint) owing to factors such as: inadequate gastric resistance in the absence of implausibly high levels of enteric coating; poor intestinal release of relevant actives owing to inadequate release profiles exhibited by existing natural coatings; and inconsistent release profiles which may, for instance, dependent on storage conditions and storage times. The use of such natural ingredients also contributes towards greater biodegradability and environmental sustainability.

The coatings of the invention also exhibit excellent dissolution and disintegration pH thresholds for delayed release applications, thereby facilitating reliable transit of corresponding solid dosage forms through a variety of gastric environments (at a variety of pHs) whilst still enabling rapid release within the small intestine. Moreover, the coatings of the invention are, in contrast to existing natural coatings, highly stable upon prolonged storage and/or stressed conditions, meaning that delayed release properties are more reliable and consistent. Moreover, coatings with aesthetically-pleasing (e.g. transparent) properties can be generated using coatings of the invention. These benefits may be achieved without necessarily using plasticizers, which can have adverse properties or otherwise impose dosage limitations.

Coating compositions and/or coating layer compositions of the invention which may be used to produce the coatings of the invention also exhibit excellent stability, thereby prolonging their shelf-life and improving the consistency and reliability of the ultimate solid dosage forms produced therefrom. Such coating compositions also exhibit excellent coatability properties.

The coatings of the invention in most respects outperform existing natural coatings.

Solid Dosage Form

The present invention provides a solid dosage form, especially an enterically-coated solid dosage form. The solid dosage form suitably comprises a core, which core suitably has a solid outer surface available for coating. The core is suitably coated with a coating (suitably an enteric coating). The coating may include one or more coating layers, and suitably comprises a polysaccharide-based layer and/or a stabilising layer.

The coating suitably substantially protects the core and/or any active ingredient(s) thereof from exposure (or contact) with gastric juices in the stomach during transit through the gastrointestinal (GI) tract. As such, the coating is suitably substantially insoluble (or sparingly soluble) and/or exhibits a slow rate of dissolution and/or disintegration in gastric juices (or simulated gastric juice). However, the coating is suitably substantially soluble (or substantially more soluble than in gastric juice) and/or exhibits a high rate of dissolution and/or distintegration (or a higher rate compared to that within gastric juice) within the small intestine (or simulated small intestine conditions).

The solid dosage form is suitably an oral dosage form. The solid dosage form may suitably be an enterically-coated form of a tablet, capsule (whether a liquid-containing or solid-containing capsule), or lozenge.

The solid dosage form is suitably a delayed-release dosage form.

In a particular embodiment, the solid dosage form is a pharmaceutical dosage form.

In a particular embodiment, the solid dosage form is a nutraceutical dosage form.

In a particular embodiment, the solid dosage form is a dietary supplement dosage form.

The present invention also provides a method of preparing the solid dosage. The method suitably comprises providing a core. The method suitably involves coating the core with a coating composition (or with one or more coating layer composition(s))) to produce the solid dosage form. The method may comprise drying, curing, and/or further processing the solid dosage form. Though such drying, curing, and/or further processing may be suitably performed after the solid dosage form has been formed, such steps may be performed during formation of the solid dosage form, for instance, after one coating layer has been applied but before another coating layer is applied.

Core

The core itself is suitably a solid dosage form. The core is suitably a tablet, capsule (whether a liquid-containing or solid-containing capsule), or lozenge without a coating of the invention, though in principle the core may comprise a coating, potentially an enteric coating outside the scope of the invention. In some embodiments, the core may comprise beads, pellets, granules, and/or microparticles.

The core suitably comprises an active ingredient, or one or more active ingredients.

The active ingredient(s) is suitably a pharmaceutical active (i.e. drug compound), a neutraceutical active, and/or an active dietary supplement. The active ingredient(s) are suitably present in therapeutically, nutraceutically, and/or dietarily effective amounts. The core may comprise a plurality of active ingredients, which may include a mixture of any, some or all of a pharmaceutical active(s), a neutraceutical active(s), and/or a dietary supplement(s).

The core may suitably comprise one or more excipient(s) and/or carrier(s). Excipients and carriers in the fields of pharmaceuticals, nutraceuticals, and dietary supplements are well known in the art, and may be judiciously selected by the skilled formulation scientist according to requirements.

One or more of the active ingredient(s) and/or excipient(s)/carrier(s) may be soluble in aqueous environments (i.e. aqueous solutions) exhibiting a pH of less than or equal to pH 5, suitably a pH of less than or equal to pH 4, suitably a pH of less than or equal to pH 3, suitably a pH of less than or equal to pH 2, suitably at pH 1. The predominant active ingredient of the core (i.e. by weight) may be soluble in aqueous environments (i.e. aqueous solutions) exhibiting a pH of less than or equal to pH 5, suitably a pH of less than or equal to pH 4, suitably a pH of less than or equal to pH 3, suitably a pH of less than or equal to pH 2, suitably at pH 1.

One or more of the active ingredient(s) and/or excipient(s)/carrier(s) may degrade (e.g. at least 1 wt % degradation per hour, suitably at least 5 wt % degradation per hour, suitably with at least 10 wt % degradation per hour—in aqueous environments (i.e. aqueous solutions) exhibiting a pH of less than or equal to pH 5, suitably a pH of less than or equal to pH 4, suitably a pH of less than or equal to pH 3, suitably a pH of less than or equal to pH 2, suitably at pH 1. An active ingredient of the core may degrade (e.g. at least 1 wt % degradation per hour, suitably at least 5 wt % degradation per hour, suitably with at least 10 wt % degradation per hour—in aqueous environments (i.e. aqueous solutions) exhibiting a pH of less than or equal to pH 5, suitably a pH of less than or equal to pH 4, suitably a pH of less than or equal to pH 3, suitably a pH of less than or equal to pH 2, suitably at pH 1.

One or more of the active ingredient(s) and/or excipient(s)/carrier(s) may be a gastric irritant, and/or may exhibit an unpleasant taste and/or odour. An active ingredient of the core may be a gastric irritant, and/or may exhibit an unpleasant taste and/or odour.

Suitably the core (i.e. without any coating of the invention) is an immediate release dosage form, or suitably the core is an immediate release dosage form within the small intestine (i.e. at physiological pH within the intestine—i.e. between pH 6 and pH 7.4).

In some embodiments, the core comprises a sub-coat. The sub-coat is suitably a coating layer at the outer surface of the core. Suitably the sub-coat is applied to the core, for instance as a sub-coating layer composition which may be dried to form a sub-coat, following initial manufacture of a core without the sub-coat.

The sub-coat is suitably applied to the core prior to any application of a coating. As such, the coating suitably contacts the sub-coat directly in the final solid dosage form.

Such a sub-coat may afford further protection for the core, and the active therein.

In a particular embodiment, the sub-coat (and/or sub-coating composition) comprises hydroxypropylmethyl cellulose (HPMC).

Coating and Coating Composition(s)

A solid dosage form of the invention suitably comprises a core coated with a coating (suitably upon an outer surface of said core, though the coating need not necessarily be in direct contact with the core, for instance, where another intervening coating layer is present). The coating suitably comprises a polysaccharide-based layer and/or a stabilising layer. The coating is suitably an enteric coating.

The coating is suitably provided by coating the core with a coating composition (or one or more coating layer compositions, especially for multilayered coatings) and optionally thereafter drying the coating (NB. when producing a multi-layered coating, to avoid interlayer mixing each coating layer may need to be dried and/or cured before any subsequent layer(s) are applied thereto). The or each layer of a coating is suitably applied to the core via spray coating, such as fluidised bed coating.

As such, the present invention provides a coating composition. The coating composition suitably comprises (or is formed by mixing together) a polysaccharide-based coating composition and/or a stabilising coating composition. The present invention also provides a kit of parts, comprising two or more coating layer compositions. One of the coating layer compositions may be a polysaccharide-based coating composition. One of the coating layer compositions may be a stabilising coating composition. Coating compositions of the invention may be prepared by dissolving and/or dispersing ingredients, described herein in relation to a coating composition and/or coating layer composition(s), within a solvent system. The solvent system is suitably a solvent system which dissolves some or all of the ingredients. Suitably the solvent system consists essentially of one or more solvents, each of which has a boiling point at 1 Bar pressure of less than or equal to 170° C., suitably less than or equal to 150° C., suitably less than or equal to 120° C., suitably less than or equal to 105° C. The solvent system suitably comprises one or more protic solvents, most suitably selected from the group consisting of water and (1-3C) alcohols. Suitably, the solvent system comprises water and/or ethanol.

The coating may suitably comprise a polysaccharide-based layer. Such a polysaccharide-based layer is suitably provided by coating the core with a coating layer composition, suitably a polysaccharide-based coating composition and optionally thereafter drying the coating layer. The polysaccharide-based coating composition, and indeed a corresponding polysaccharide-based layer formed therefrom, suitably comprises a polysaccharide. The polysaccharide-based coating composition, and the corresponding polysaccharide-based layer, suitably comprises a non-esterified polyuronic acid and an esterified polyuronic acid.

The coating may suitably comprise a stabilising layer. Such a stabilising layer is suitably provided by coating the core with a coating layer composition, suitably a stabilising coating composition and optionally thereafter drying the coating layer. The stabilising coating composition, and indeed a corresponding stabilising layer formed therefrom, suitably comprises a stabilising component (e.g. acid component). The stabilising coating composition, and indeed a corresponding stabilising layer formed therefrom, suitably comprises a stabilising component (e.g. acid component) and an esterified polyuronic acid.

In an embodiment, the coating comprises both a polysaccharide-based layer and a stabilising layer. The two layers may be separate and distinct (e.g. in multilayered coatings), or may suitably be mixed together (e.g. in single layered coatings).

Such a multi-layered coating may be produced by:
i) coating the core with a first coating layer composition (suitably selected from either a polysaccharide-based coating composition and a stabilising coating composition, though most preferably the stabilising coating composition) to form a first coating layer (suitably selected from either a polysaccharide-based layer and a stabilising layer, though most preferably the stabilising layer);
ii) coating the (partially-coated core and) first coating layer (preferably after the first coating layer is substantially dry or otherwise set) with a second coating layer composition (suitably selected from the other of either a polysaccharide-based coating composition and a stabilising coating composition, though most preferably the polysaccharide-based coating composition) to form a second coating layer (suitably selected from the other of either a polysaccharide-based layer and a stabilising layer, though most preferably the polysaccharide-based layer); and
iii) optionally drying, curing, cooling/congealing and/or further processing the solid dosage form.

In a particular embodiment, where the coating comprises both the polysaccharide-based layer and the stabilising layer, the stabilising layer constitutes an inner layer of the coating and the polysaccharide-based layer constitutes an outer layer of the coating. As such, the inner stabilising layer is suitably located between the core and outer polysaccharide-based layer. Most suitably the inner stabilising layer and outer polysaccharide-based layer are in contact and/or interface with one another. Such contact and/or interfacing between these layers suitably maximises the stabilising effect of the stabilising layer upon the polysaccharide-based layer. Most suitably the stabilising layer serves to stabilise either an esterified polyuronic acid and/or a non-esterified polyuronic acid residing within the polysaccharide-based layer.

In an alternative embodiment, the aforementioned coating layer structure may be reversed. As such, the stabilising layer may constitute an out layer of the coating whilst the polysaccharide-based layer constitutes an inner layer. In like fashion, said layers may be in contact or otherwise interfacing.

In another embodiment, where the coating comprises both the polysaccharide-based "layer" and the stabilising "layer", the stabilising layer and polysaccharide-based layer of the coating, rather than being distinct and separate layers, may instead be a single layer which integrates both layers, suitably as a mixture (e.g. substantially homogenous mixture, an an homogenous mixture, and/or a gradient mixture). As such, the ingredients of the stabilising layer and ingredients of the poly-saccharide layer may be co-mixed, to thereby afford a dual-functioning layer, which is suitably self-stabilising.

Suitably, where the coating comprises both the polysaccharide-based "layer" and the stabilising "layer", either the single layer (comprising both layers) or the inner layer is in contact with or otherwise interfaces with the core (optionally via another intervening sub-coating associated with the core and/or the coating).

In some embodiments of the invention, especially those that incorporate a lipophilic component (e.g. surfactant) within the same layer (and suitably the same coating composition) as one or more polysaccharides (whether the polysaccharides include a polyuronic acid and/or an esterified derivative of a polyuronic acid), the coating is (substantially) a single layer or there is a single layer comprising a lipophilic component (e.g. surfactant) alongside one or more polysaccharides. In a particular embodiment, a coating (suitably an enteric coating) or a coating composition (suitably an enteric coating composition) comprises a lipophilic component (e.g. surfactant), a polyuronic acid and optionally an esterified derivative of a polyuronic acid.

In an embodiment, the coating or coating composition comprises:
  20 parts by weight of one or more polysaccharides (suitably a mixture of a polyuronic acid, such as alginic acid/alginate and an esterified derivative of a polyuronic acid, such as pectin/pectinate); and
  0-20 parts by weight (pbw) of one or more lipophilic components (e.g. surfactants).

In an embodiment, the coating or coating composition comprises:
  20 parts by weight of one or more polysaccharides; and
  0.5-15 parts by weight (pbw) of one or more lipophilic components (e.g. surfactants).

In an embodiment, the coating or coating composition comprises:
  16 parts by weight of one or more polysaccharides; and
  1-10 parts by weight (pbw) of one or more lipophilic components (e.g. surfactants).

In an embodiment, the coating or coating composition comprises:
  16 parts by weight of one or more polysaccharides; and
  1-8 parts by weight (pbw) of one or more lipophilic components (e.g. surfactants).

Polysaccharide-Based Layer and Associated Coating Layer Composition

The polysaccharide-based coating layer and the corresponding coating layer composition (e.g. polysaccharide-based coating composition) from which said coating layer may be formed suitably comprise (substantially) the same ingredients, suitably in (substantially) the same relative weight quantities (or weight ratios), except for any ingredients (e.g. solvents) removed (whether partially or completely) during formation of the relevant coating layer and solid dosage form. For instance, after coating with a coating composition, said coating may be dried in situ (i.e. to remove solvent(s), whether partially or substantially completely) to produce the final dried coating. Such drying will inevitably change the composition of the coating, but suitably only with respect to the solvent(s) removed on drying—suitably the relative quantities/ratios of (substantially) all other ingredients (optionally with the exception of any curable components or degradable components (e.g. esters) which may, for instance, transform (e.g. ester hydrolysis) during drying and/or curing) remains the same. As such, unless stated otherwise, any description herein regarding ingredients of a coating layer (e.g. enteric coating, or specific polysaccharide-based layer) may equally apply to the corresponding coating layer composition (e.g. enteric coating composition, or specific polysaccharide-based coating composition), and vice versa.

The polysaccharide-based coating layer/composition suitably comprises at least one polysaccharide. Suitably the at least one polysaccharide comprises a polyuronic acid. Suitably the polysaccharide-based coating layer/composition comprises at least two polysaccharides, suitably at most two polysaccharides, wherein most suitably two of the least two polysaccharides are polyuronic acids, preferably different polyuronic acids (i.e. polyuronic acids whose backbones are composed of different uronic acid/sugar units).

The at least one polysaccharide may be or comprise a cellulose or cellulose derivative, for example an alpha-cellulose. The at least one polysaccharide may be or comprise lignin.

The polysaccharide-based coating layer/composition suitably comprises an esterified polyuronic acid. The polysaccharide-based coating layer/composition suitably comprises a non-esterified polyuronic acid. Most suitably, the polysaccharide-based coating layer/composition comprises both an esterified polyuronic acid and a non-esterified polyuronic acid.

The polysaccharide-based coating layer/composition suitably comprises a lipophilic component (e.g. surfactant). In a particular embodiment, the polysaccharide-based coating layer/composition comprises a non-esterified polyuronic acid, an esterified polyuronic acid, and optionally a lipophilic component (e.g. surfactant). As such, the polysaccharide-based coating layer/composition may be an coating/composition in its own right (i.e. independent of any optional other layers that may also be present), and may be utilised with or without accompanying sub-coats and/or stabilisation layer(s).

A polysaccharide-based coating composition is suitably a solution, dispersion, or emulsion, comprising a suitably solvent system, most suitably an aqueous and/or alcoholic solution, dispersion, or emulsion, most suitably an aqueous and/or alcoholic solution. The corresponding polysaccharide-based coating layer suitably comprises a lower proportion of solvent(s) (e.g. water) than the coating composition from which it has been derived. The polysaccharide-based coating layer suitably is or comprises a dried polysaccharide-based coating composition. The polysaccharide-based coating is suitably a (dried) film of polysaccharide-based coating composition.

In a particular embodiment, the polysaccharide-based coating (and/or polysaccharide-based coating composition) comprises a non-esterified polyuronic acid (e.g. alginate) and (optionally) an esterified polyuronic acid (e.g. pectin) in a respective weight ratio of 20-100:80-0, suitably 40-100:60-0, suitably 50-100:50-0, suitably 80-100:20-0, suitably 85:15 or 100:0. Suitably, the aforementioned two-component ratios are constrained to where the sum of the two respective values total 100.

In an embodiment, the polysaccharide-based coating (and/or polysaccharide-based coating composition) comprises a non-esterified polyuronic acid (e.g. alginate), (optionally) an esterified polyuronic acid (e.g. pectin), and a lipophilic component (e.g. surfactant, for example GMS) in a respective weight ratio of 20-100:80-0:1-100, suitably 40-100:60-0:2-70, suitably 50-100:50-0:3-60, suitably 80-100:20-0:3-50, suitably 85:15:5-50 or 100:0:5-50. Suitably, the aforementioned three-component ratios are constrained to where the sum of the two values pertaining to the non-esterified polyuronic acid and esterified polyuronic acid total 100.

The polysaccharide-based coating (and/or polysaccharide-based coating composition) suitably comprises an esterified polyuronic acid, a non-esterified polyuronic acid, and a lipophilic component (e.g. surfactant) in a respective weight ratio of 50-99:50-1:20-1 (i.e. 50-99 parts by weight esterified polyuronic acid, 50-1 pbw non-esterified polyuronic acid, and 20-1 pbw lipophilic component), suitably 70-95:30-5:15-2, more suitably 80-90:20-10:10-3, most suitably about 85:15:6.25.

In a particular embodiment, the polysaccharide-based coating layer/composition comprises:
- 70-95 parts by weight (pbw) non-esterified polyuronic acid;
- 5-30 pbw esterified polyuronic acid; and
- 2-100 pbw lipophilic component (e.g. surfactant).

In a particular embodiment, the polysaccharide-based coating layer/composition comprises:
- 70-95 parts by weight (pbw) non-esterified polyuronic acid;
- 5-30 pbw esterified polyuronic acid; and
- 2-15 pbw lipophilic component (e.g. surfactant).

In a particular embodiment, the polysaccharide-based coating layer/composition comprises:
- 80-90 pbw alginic acid (or alginate salt(s), such as sodium alginate);
- 10-20 pbw pectin (or pecinate salt(s));
- 2-100 pbw glycerol monostearate.

In a particular embodiment, the polysaccharide-based coating layer/composition comprises:
- 80-90 pbw alginic acid (or alginate salt(s), such as sodium alginate);
- 10-20 pbw pectin (or pecinate salt(s));
- 2-15 pbw glycerol monostearate.

Suitably the polysaccharide-based coating composition comprises any of the aforesaid combinations of ingredients, suitably in the relative ratios stipulated. Suitably the polysaccharide-based coating layer consists essentially of any of the aforesaid combinations of ingredients, suitably in the relative ratios stipulated—i.e. suitably the coating layer itself is a (substantially) dried form of corresponding coating composition.

Suitably the polysaccharide-based coating composition comprises 0.1-5 wt % (or % w/v) esterified polyuronic acid(s), more suitably 0.5-3 wt % (or % w/v), most suitably 1-2 wt % (or % w/v).

Suitably the polysaccharide-based coating composition comprises 0.01-2 wt % (or % w/v) non-esterified polyuronic acid(s), more suitably 0.05-1 wt % (or % w/v), most suitably 0.1-0.5 wt % (or % w/v).

Suitably the polysaccharide-based coating composition comprises 0.005-2 wt % (or % w/v) surfactant(s), more suitably 0.01-1 wt % (or % w/v), most suitably 0.1-0.2 wt % (or % w/v).

A particular advantage of using the combination of an esterified polyuronic acid and a non-esterified polyuronic acid is suitably the facilitated formation of stable coating layer compositions (especially stable solutions) which in turn allows higher quality film coatings to be formed. Furthermore, the combination of esterified and non-esterified polyuronic acids within coatings improves the robustness and overall performance of said coatings, afford more optimal delayed release properties, especially in comparison to most existing enteric coatings formed from natural products. The inclusion of a lipophilic component (e.g. surfactant) within such compositions can further improve the robustness of resulting coatings since, without wishing to be bound by theory, it is thought that lipophilic component (e.g. surfactant) molecules provide an improved seal within and around a polysaccharide-based coating (especially polyuronic acids which may be vulnerable to precipitation) and increase surface lipophilicity so as to further improve durability, especially in certain hostile media. Such enhanced surface-lipophilicity (e.g. whether around the dosage form or the surface of particles or granules within the dosage form) can inhibit water uptake and ultimate solubilisation/disintegration of polyuronic acids within the coating.

The polysaccharide-based coating (and/or polysaccharide-based coating composition) may suitably comprise a gum (e.g. gum rosin, locust bean gum). Suitably a gum may be used in place of pectin in any or all of the pectin-containing examples described herein, and may directly replace pectin in any of the wt % ratios or concentrations defined herein in relation to pectin. For example, the polysaccharide-based coating layer/composition may comprise:
- 80-90 pbw alginic acid (or alginate salt(s), such as sodium alginate);
- 10-20 pbw gum;
- 2-15 pbw glycerol monostearate.

The polysaccharide-based coating (and/or polysaccharide-based coating composition) may suitably comprise a wax (e.g. ceresin wax, bees wax, carnuba wax). Suitably a wax may be used in place of pectin in any or all of the pectin-containing examples described herein, and may directly replace pectin in any of the wt % ratios or concentrations defined herein in relation to pectin. For example, the polysaccharide-based coating layer/composition may comprise:
- 80-90 pbw alginic acid (or alginate salt(s), such as sodium alginate);
- 10-20 pbw wax;
- 2-15 pbw glycerol monostearate.

The wax may be considered a lipophilic component, suitably a further lipophilic component (e.g. in addition to another lipophilic component such as a non-ionic surfactant, such as glyceryl monostearate). In fact, in preferred embodiments a wax is accompanied by a surfactant that facilitates emulsification and/or solubilisation of the wax during formulation or formation of relevant coating compositions. As such, suitably the polysaccharide-based coating (and/or coating compositions thereof) comprises two or more lipophilic components, comprising at least a wax and a surfactant. However, the skilled person will appreciate that a wax may be substituted or supplemented by alternative hydrophobic compound(s) that perform a similar function. As such, the polysaccharide-based coating (and/or coating compositions thereof) may comprise a hydrophobic compound, suitably a solid hydrophobic compound (at standard atmospheric temperature and pressure—SATP) suitably with a melting point greater than or equal to 40° C. Such a hydrophobic compound may suitably be or comprise a wax, suitably a non-synthetic wax, suitably an animal- or plant-derived wax, for example, bees wax or ceresin wax.

In a particular embodiment, the polysaccharide-based coating (and/or polysaccharide-based coating composition) comprises a non-esterified polyuronic acid (e.g. alginate) and (optionally) a hydrophobic compound (e.g. wax) in a respective weight ratio of 10-100:10-60, suitably 20-80:20-40, suitably 1-10:3, suitably about 5:3.

In an embodiment, the polysaccharide-based coating (and/or polysaccharide-based coating composition) comprises a non-esterified polyuronic acid (e.g. alginate), (optionally) a hydrophobic compound (e.g. wax), and a surfactant (e.g. GMS) in a respective weight ratio of 10-100:10-60:1-20, suitably 20-80:20-40:5-15, suitably 1-10:1-6:1, suitably about 5:3:1.

In a particular embodiment, the polysaccharide-based coating layer/composition comprises:
- 30-70 parts by weight (pbw) non-esterified polyuronic acid;
- 20-40 pbw hydrophobic compound (e.g. wax); and
- 5-15 pbw surfactant (e.g. GMS).

In a particular embodiment, the polysaccharide-based coating layer/composition comprises:
- 40-60 parts by weight (pbw) non-esterified polyuronic acid;
- 25-35 pbw hydrophobic compound (e.g. wax); and
- 8-12 pbw surfactant (e.g. GMS).

In a particular embodiment, the polysaccharide-based coating layer/composition comprises:
- 40-60 parts by weight (pbw) alginic acid (and/or alginate salt(s), such as sodium alginate);
- 25-35 pbw wax; and
- 8-12 pbw surfactant (e.g. GMS).

Suitably the polysaccharide-based coating composition comprises any of the aforesaid combinations of ingredients, suitably in the relative ratios stipulated. Suitably the polysaccharide-based coating layer consists essentially of any of the aforesaid combinations of ingredients, suitably in the relative ratios stipulated—i.e. suitably the coating layer itself is a (substantially) dried form of corresponding coating composition. Suitably a coating composition includes one or more diluents, suitably diluents which solubilise and/or emulsify the other ingredients. In a particular embodiment the one or more diluents comprises water and an organic solvent, suitably an organic solvent miscible with water, suitably an alcohol such as ethanol.

Polysaccharide(s)

The one or more polysaccharide(s) incorporated within the one or more coating layers (and/or coating layer compositions) of the invention are suitably selected from the group consisting of polyuronic acid(s) and polyuronic acid derivative(s) (e.g. esterified polyuronic acids). References to polyuronic acid(s) and derivatives thereof are intended, unless stated otherwise, to encompass salts thereof, e.g. polyuronate salts thereof.

Most suitably the one or more polysaccharides comprise at least a polyuronic acid. In a particular embodiment, the polyuronic acid is alginic acid (or alginate).

Suitably the one or more polysaccharides comprise an esterified polyuronic acid. In a particular embodiment, the esterified polyuronic acid is pectin (or pectinate).

In a particular embodiment, the one or more polysaccharides comprise both a polyuronic acid and an esterified polyuronic acid. In a particular embodiment, the one or more polysaccharides comprise both alginic acid (or alginate) and pectin (or pectinate).

As will be self-evident to those skilled in the art, any given polysaccharide, such as a polyuronic acid (e.g. alginic acid), may comprise a mixture of forms thereof, including a mixture of free-acid and/or one or more ionised forms (e.g. salts). For example, a polyuronic acid may comprise a mixture of an alginate salt and alginic acid, potentially in a variety of ratios. Such mixtures of free-acid and/or ionised form(s) of polysaccharides may arise during formulation where, for example, a single form (e.g. ionised form—e.g. alginate salt) of a given polysaccharide is partially or fully transformed by virtue of pH changes (e.g. which may partially protonate some alginate salts). Alternatively such mixtures may be formed by introducing a mixture of different raw material forms of the polysaccharide at the start of a formulation process—e.g. using a mixture of alginic acid and alginate salt(s) at the outset.

Esterified Polyuronic Acid

The esterified polyuronic acid is suitably derived from a naturally-occuring polyuronic acid. The esterified polyuronic acid is suitably derived form naturally-occuring biological organisms such as plants, fruits, and/or vegetables. Suitably the esterified polyuronic acid is derived from a polyuronic acid naturally-occuring in fruits, most suitably citrus fruit, most suitably in the skin or peel thereof.

The esterified polyuronic acid may be a substantially linear polyuronic acid (i.e. with a linear polymeric backbone, optionally comprising non-uronic acid branches). Alternatively, the esterified polyuronic acid may be a branched polyuronic acid (i.e. having a polymeric backbone with uronic acid branches).

The esterified polyuronic acid suitably has a polymeric backbone comprising a plurality of hexuronic acid monomeric units, suitably a plurality of α-(1-4)-linked uronic acid monomeric units.

Suitably, the esterified polyuronic acid may comprise pendent monomeric, dimeric, and/or polymeric saccharide units (e.g. D-galactose, L-arabinose, D-xylose, D-apiose, and such like) as side chains, suitably branching off a polyuronic acid backbone.

The esterified polyuronic acid suitably has a degree of esterification (commonly known as "DE") of at least 10%, suitably at least 20%, suitably at least 50%. Suitably the DE of the esterified polyuronic acid is between 15 and 45%, between 55 and 80%, or above 80%. Suitably the DE of the esterified polyuronic acid is between 55 and 80% or is greater than 80%, suitably greater than 85%. The DE is the proportion of all carboxyl groups in a molecule (or set of molecules) constituted by carboxylate ester moieties, i.e. as opposed to other types of carboxyl groups, such as carboxylic acid or amide groups. In the context of polyuronic acids, the DE may be considered as the percentage of esterified uronic acid units of all uronic acid units in the molecule.

Suitably, uronic acid ester units of an esterified polyuronic acid comprise a (1-8C) alkyl ester moiety, suitably a (1-4C) alkyl ester moiety, a (1-2C)alkyl ester moiety, most suitably a methyl ester moiety.

The esterified polyuronic acid is preferably substantially non-amidated. Suitably, the esterified polyuronic acid has a degree of amidation less than 30%, suitably less than 20%, suitably less than 10%, suitably less than 5% (i.e. less than 5% of the uronic acid units of the polyuronic acid compound are carboxylic acid-amides, i.e. —$C(O)NH_2$). However, in some embodiments the esterified polyuronic acid comprises a degree of amidation (i.e. at least some carboxyl moieties are acid-amide moieties, such as —$C(O)NH_2$ moieties).

The polymeric backbone of the esterified polyuronic acid may be substantially a homopolysaccharide, and suitably comprises predominantly one type of sugar/uronic acid repeating unit. Suitably, at least 50% of the repeating units of the polymeric backbone are derived from the same sugar/uronic acid monomer unit, suitably at least 70%, more suitably at least 80%, more suitably at least 90%, most suitably at least 95%. The polymeric backbone suitably excludes any branches or side chains that may themselves comprise one or more saccharide units.

The esterified polyuronic acid is suitably soluble in (pure) water, and is suitably soluble in water at a pH less than or equal to pH 4.0, suitably at a pH less than or equal to pH 3.0, suitably at a pH less than or equal to pH 2.0, suitably at a pH 1.0, suitably notwithstanding any decomposition producing insoluble compounds (e.g. following ester hydrolysis to a non-esterified polyuronic acid). That said, the esterified polyuronic acid is suitably either substantially insoluble, sparingly soluble, or exhibits slow dissolution kinetics when in situ within coatings of the invention.

Though any suitable esterified polyuronic acid may be used in the context of the invention, most suitably the esterified polyuronic acid exhibits pH-dependent gelling properties and/or is suitably a gelling agent and/or a thickener. As such, the esterified polyuronic acid may contain sufficient free carboxylic acid/carboxylate groups to exhibit such pH-dependent behaviour. The esterified polyuronic acid is suitably capable of forming gels (e.g. from aqueous solutions thereof, especially where said esterified polyuronic acid is present at sufficient wt % solids [e.g. >60 wt % solids], and/or especially at an appropriate temperature for gelling to occur—such factors can be routinely deduced either theoretically or experimentally by those skilled in the art) at certain pHs below pH 4.0, suitably at certain pHs below pH 3.4, suitably at certain pHs between pH 2.0 and 4.0, suitably at certain pHs between pH 2.8 and 3.6. Suitably, the pH at which the esterified polyuronic acid forms the strongest gels (i.e. gels of highest viscosity, as measurable by standard techniques known in the art) is between pH2.0 and pH 4.0, suitably between pH 2.8 and pH 3.6. Suitably, the esterified polyuronic acid is incapable of (or has a reduced capacity for) forming gels (e.g. under conditions at which the same esterified polyuronic acid could otherwise form gels at a judiciously selected pH—as described above) at a pH greater than pH 6.0, suitably at a pH greater than pH 5.0, suitably at a pH greater than pH 4.5.

Suitably, the esterified polyuronic acid exhibits a substantially gelled form at typical gastric pHs, e.g. at a pH less than 4, or at a pH less than 3. However, a gelled form of said esterified polyuronic acid suitably becomes non-gelled at typically small-intestinal pHs (e.g. at a pH between 6 and 7.4), whether as a result of degelling and/or decomposition/degradation of the esterified polyuronic acid (e.g. whether through ester hydrolysis and/or other forms of degradation, such as glycosidic hydrolysis/cleavage). Such gelling properties are not necessarily observable from the coating layer(s) of the invention, as these gelling properties are intended to serve as a guide to the skilled person for achieving the benefits of the present invention.

The esterified polyuronic acid suitably has an average molecular weight between 60,000 and 130,000 g/mol.

Suitably the esterified polyuronic acid stabilises, prevents or inhibits solubilisation of, inhibits degradation of, and/or otherwise inhibits disintegration of a non-esterified polyuronic acid with which it is mixed (e.g. within an enteric coating). Suitably the esterified polyuronic acid exhibits different pH-dependent solubility and/or gelling properties than the non-esterified polyuronic acid. For instance, suitably the esterified polyuronic acid is more soluble in acid than the non-esterified polyuronic acid and is suitably more soluble in base than non-esterified polyuronic acid. Suitably the esterified polyuronic acid is more susceptible to decomposition and/or degradation at basic pH, for instance, through ester hydrolysis.

Suitably the esterified polyuronic acid is "generally recognised as safe" (GRAS) according to US food safety standards. Suitably the esterified polyuronic acid is registered via the International Numbering System (INS) and/or has a corresponding "E number" (in accordance with European legislation).

Suitably the esterified polyuronic acid is an esterified polygalacturonic acid, suitably a polygalacturonic acid methyl ester.

In a particular embodiment esterified polyuronic acid is a pectin compound. A pectin compound may suitably include any, suitably plant-derived, esterified polygalacturonic acid compound, and suitably includes pectins, pectinic acids, pectic acids, pectinates, protopectins, and any acceptable salts, partial salts, and/or complex salts thereof. Most suitably, the pectin compound is a pectin, a pectinate, any acceptable salts, partial salts, and/or complex salts thereof.

In a particular embodiment, the pectin compound is GRAS having an INS number 440, or an E number E440(i) or (ii). Suitably the pectin compound is non-amidated, and suitably has the E number E440(i). The pectin compound is suitably obtained from a natural source, most suitably citrus fruit, most suitably citrus fruit peel (notwithstanding any subsequent processing, such as re-esterification). The pectin compound suitably has a DE greater than 80%, suitably greater than or equal to 85%

Non-Esterified Polyuronic Acid

Though, as with the esterified polyuronic acid, any suitably compound may be used in the context of the invention, most suitably the non-esterified polyuronic acid is a naturally occurring compound, where "naturally occurring" means the relevant compound is found in nature or otherwise synthetically prepared so as to be chemically equivalent to such a compound found in nature. The non-esterified polyuronic acid is suitably derived from a naturally-occuring polyuronic acid. The non-esterified polyuronic acid is suitably derived form naturally-occuring biological organisms such as plants, fruits, and/or vegetables. Suitably the non-esterified polyuronic acid is derived from a polyuronic acid naturally-occuring in seaweed.

The non-esterified polyuronic acid may be a substantially linear polyuronic acid (i.e. with a linear polymeric backbone, optionally comprising non-uronic acid branches). Alternatively, the esterified polyuronic acid may be a branched polyuronic acid (i.e. having a polymeric backbone with uronic acid branches). Most suitably the non-esterified polyuronic acid is a substantially linear polymer. Suitably the non-esterified polyuronic acid is a co-polymer, suitably comprising homopolymeric blocks of a first uronic acid, homopolymeric blocks of a second uronic acid (which is most suitably an epimer of the first uronic acid), and/or blocks of alternating first-/second-uronic acid residues.

Suitably the polyuronic acid comprises one or more distinct types of, preferably at least two, hexuronic acid monomeric unit(s) suitably linked together via $\alpha$-(1-4)-glycosidic linkages.

The non-esterified polyuronic acid suitably has a DE less than 10%, suitably less than 5%, suitably less than 1%, suitably less than 0.1%, suitably less than 0.01%. Most suitably the non-esterified polyuronic acid is substantially free of ester moieties, or at least substantially free of ester moieties within any uronic acid units.

The non-esterified polyuronic acid is preferably substantially non-amidated. Suitably, the non-esterified polyuronic acid has a degree of amidation less than 30%, suitably less than 20%, suitably less than 10%, suitably less than 5% (i.e. less than 5% of the uronic acid units of the polyuronic acid compound are carboxylic acid-amides, i.e. —C(O)NH$_2$).

The polymeric backbone of the non-esterified polyuronic acid may be substantially a heteropolysaccharide, and suitably comprises two predominant types of sugar/uronic acid repeating units. Suitably the two predominant types of sugar/uronic acid are epimers. Suitably, at least 50% of the repeating units of the polymeric backbone are derived from the same sugar/uronic acid monomer units, suitably at least 70%, more suitably at least 80%, more suitably at least 90%, most suitably at least 95%.

The non-esterified polyuronic acid is suitably (substantially) insoluble, or at least less soluble than a corresponding esterified polyuronic acid, in water at a pH less than or equal to pH 4.0, suitably at a pH less than or equal to pH 3.0, suitably at a pH less than or equal to pH 2.0, suitably at a pH 1.0. That said, when in sit within an enteric coating, the non-esterified polyuronic acid may dissolve relatively slowly within these pH ranges, and suitably the kinetics of such solubilisation are suitably retarded by the presence of the esterified polyuronic acid. The non-esterified polyuronic acid is suitably soluble (at least partially) in water at a pH greater than or equal to pH 5.0, suitably at a pH greater than or equal to pH 6.0, suitably at a pH greater than or equal to pH 7.0.

Though any suitable non-esterified polyuronic acid may be used in the context of the invention, most suitably the non-esterified polyuronic acid exhibits pH-dependent gelling properties and/or is suitably a gelling agent and/or a thickener. As such, the non-esterified polyuronic acid may contain sufficient free carboxylic acid/carboxylate groups to exhibit such pH-dependent behaviour. The non-esterified polyuronic acid is suitably capable of forming gels (e.g. from aqueous solutions thereof, especially where said non-esterified polyuronic acid is present at sufficient wt % solids [e.g. >0.5 wt % solids], and/or especially at an appropriate temperature for gelling to occur (e.g. 25° C.)—such factors can be routinely deduced either theoretically or experimentally by those skilled in the art) at certain or all pHs below pH 4.0, suitably at certain or all pHs below pH 3.5, suitably at certain or all pHs between pH 0.5 and 4.0, suitably at certain or all pHs between pH 1.0 and 3.5. Suitably, the pH at which the non-esterified polyuronic acid forms the strongest gels (i.e. gels of highest viscosity, as measurable by standard techniques known in the art) is between pH3.0 and pH 3.5. Suitably, the non-esterified polyuronic acid is incapable of (or has a reduced capacity for) forming gels (e.g. under conditions at which the same esterified polyuronic acid could otherwise form gels at a judiciously selected pH—as described above) at a pH greater than pH 7.0, suitably at a pH greater than pH 6.0.

Suitably, the non-esterified polyuronic acid exhibits a substantially gelled form at typical gastric pHs, e.g. at a pH less than 4, or at a pH less than 3. However, a gelled form of said non-esterified polyuronic acid suitably becomes substantially non-gelled (or at least less gelled, suitably to the extent of permitting disintegration) at typical small-intestinal pHs (e.g. at a pH between 6 and 7.4), whether as a result of degelling and/or decomposition/degradation of the non-esterified polyuronic acid. Such gelling properties are not necessarily observable from the coating layer(s) of the invention, as these gelling properties are intended to serve as a guide to the skilled person for achieving the benefits of the present invention.

The non-esterified polyuronic acid suitably has an average molecular weight between 10,000 and 600,000 g/mol, more suitably 32,000 and 400,000 g/mol. Suitably the non-esterified polyuronic acid yields a viscosity of 5-50 centipoise (cps) (as measure using the ASTM standard for measuring dynamic viscosity) when in a concentration of 1 wt % in water, more suitably 10-40 cps, most suitably 15-20. In a particular embodiment, the non-esterified polyuronic acid (e.g. sodium alginate) yields a viscosity of 15-25 centipoise when present at 1 wt % in water. However, in alternative embodiment the viscosity of the non-esterified polyuronic acid (especially in its most soluble form—e.g. sodium alginate) is greater than 50 centipoise, suitably between 50 and 100 centipoise. As such, the viscosity may be between 5 and 200 centipoise at a concentration of 1 wt % in water. The inventors have even produced tablets using much higher viscosities of alginate, including greater than or equal to 2000 centipoise at a concentration of 2 wt % in water.

Suitably the non-esterified polyuronic acid stabilises, prevents or inhibits solubilisation of, inhibits degradation of, and/or otherwise inhibits disintegration of an esterified polyuronic acid with which it is mixed (e.g. within an enteric coating).

Suitably the non-esterified polyuronic acid is "generally recognised as safe" (GRAS) according to US food safety standards. Suitably the non-esterified polyuronic acid is registered via the International Numbering System (INS) and/or has a corresponding "E number" (in accordance with European legislation).

Suitably the non-esterified polyuronic acid is a co-polymer of mannuronate and its epimer guluronate.

Suitably, the non-esterified polyuronic acid is an aliginate compound.

The alginate compound is suitably a linear copolymer of (1-4)-linked β-D-mannuronate (M) and α-L-guluronate (G) residues (whether protonated or ionised, or both). The relevant uronic acid units may each be incorporated within successive homopolymeric blocks of a single uronic acid type and/or heteropolymeric blocks of alternating residues of each uronic acid type.

An aliginate compound is, most suitably, alginic acid and/or any acceptable salts, partial salts, and/or complex salts thereof. Most suitably, any salt thereof is a salt of a monovalent cation, e.g. a sodium salt, such as sodium alginate. Alternatively, other alginate salts may be used, such as ammonium alginate(s). Alternatively alginic acid may be used alongside solubilising components, for example ammonium hydroxide.

In a particular embodiment, the alginate compound is GRAS. The alginate compound suitably has an E number selected from E400, E401, E402, E403, E404, and E405. Most preferably, the alginate compound has has an E number of E400, E401, or E402, most suitably E401 (i.e. sodium alginate).

Suitably the alginate compound in question yields a viscosity of 5-50 centipoise (cps) (as measure using the ASTM standard for measuring dynamic viscosity) when in a concentration of 1 wt % in water, more suitably 10-40 cps, most suitably 15-20.

Surfactant (or Lipophilic Component)

A surfactant has been shown to improve the robustness of coatings of the invention. Without wishing to be bound by theory, it is thought that surfactant molecules can form a seal or protective layer around either the dosage form as a whole or around particles or granules therein. Such a seal or protective layer may effectively "seal in" otherwise more readily dissolvable or disintegratable components (e.g. polyuronic acids and salts thereof, such as alginates), or else may repel and thereby inhibit the ingress of hostile media that would cause such dissolution and/or disintegration. For instance, it is thought that surfactant molecules can increase surface lipophilicity (whether of the dosage form or particles/granules therein) to thereby repel hydropohilic media (especially at particular pHs). As such, in the compositions and coatings of the invention, a surfactant facilitates gastric resistance.

In view of the foregoing role of the surfactant(s), the inventors envisage that other amphiphilic or lipophilic compounds/compositions (e.g. possibly non-surfactants) would also provide improved sealing and/or lipophilic properties so as to enhance coating and solid-form durability. Preferably any such compounds and/or compositions would be (substantially) miscible with a/the relevant polyuronic acid (or salt thereof) to facilitate film formation therewith. Thus, it is believed that a broader range of compounds and compositions, potentially extending beyond surfactants per se, would be appropriate for inclusion in compositions and coatings of the invention, whether in addition to or instead of the otherwise specified "surfactant". As such, unless specified to the contrary or incompatible therewith, references herein to a "surfactant" in the context of compositions and coatings of the invention may be replaced by the broader term "lipophilic component". The lipophilic component is suitably a compound or composition comprising a hydrophobic molecule or hydrophobic moiety. The lipophilic component may comprise an amphiphilic molecule (i.e. with a hydrophilic portion and a hydrophobic portion) or a mixture of hydrophobic and hydrophilic molecules. The lipophilic component may comprise an amphiphilic compound mixed together with a purely hydrophobic compound.

Suitably a coating (or coating composition) of the invention comprises two lipophilic components. Suitably one of the two lipophilic components is a hydrophobic compound and the other of the two is an amphiphilic compound. In a particular embodiment, a coating (or coating composition) of the invention comprises a lipophilic component that is a hydrophobic compound and a lipophilic component that is a surfactant. The hydrophobic compound is suitably a wax. The wax may be a wax described elsewhere herein. The surfactant is suitably a non-ionic surfactant, such as a glycerol ester, suitably mono or di-ester thereof (e.g. GMS).

The lipophilic component suitably has a distribution coefficient ("log D") greater than 0, wherein the distribution coefficient is defined herein as the ratio of the sum of the concentrations of all forms of a given compound (ionized and unionized) at pH 7.4 in each of two partitioned phases: n-octanol/water. The distribution coefficient may be expressed as:

$$\log D_{oct/wat} = \log\left(\frac{[\text{solute}]_{octanol}^{ionized} + [\text{solute}]_{octanol}^{un\text{-}ionized}}{[\text{solute}]_{water}^{ionized} + [\text{solute}]_{water}^{un\text{-}ionized}}\right)$$

Suitably the distribution coefficient as pH 7.4 is greater than or equal to 1.

The lipophilic component is suitably non-ionizable and has a partition constant (log P) with respect to the same partition solvents (n-octane/water) greater 0, suitably greater than or equal to 1.

The lipophilic component, especially where it is amphiphilic (especially non-ionic amphiphilic compounds, such as non-ionic surfactants), suitably has a hydrophilic-lipophilic balance (HLB) value less than or equal to 18, suitably less than or equal to 15, suitably less than or equal to 10, suitably less than 5, suitably less than 4 where said HLB value may be calculated according to Griffin's method wherein $$HLB = 20 * \frac{M_h}{M}$$

where $M_h$ is the molecular mass of the hydrophilic portion of the molecule, and M is the molecular mass of the whole molecule. The HLB value is suitably greater than or equal to 2, suitably greater than or equal to 3.

The polysaccharide-based coating layer/composition suitably comprises a lipophilic component, which may suitably be a surfactant. The lipophilic component (e.g. surfactant) may facilitate dispersion or dissolution of the non-esterified polyuronic acid and/or esterified polyuronic acid in the respective coating layer composition (e.g. through ameliorating aggregation). The lipophilic component (e.g. surfactant) may improve coatability (e.g. spreadability) properties in relation to the respective coating composition. The lipophilic component (e.g. surfactant) may also facilitate dissolution and/or distintegration of the coating at a desired pH (e.g. small-intestinal pHs). Most suitably the lipophilic component (e.g. surfactant) contributes to enteric properties of the coating or coating composition. Suitably the lipophilic component (e.g. surfactant) functions to seal the polysaccharide(s) (e.g. polyuronic acid such as alginate) with a resulting coating so as to inhibit precipitation thereof in acidic media. For example, it is envisaged that a hydrophilic part/end of a surfactant can orientate so as to be associated with otherwise surface-borne hydrophilic polyuronic acids (e.g. alginate) such that the hydrophobic parts/end of the surfactant can form a defensive external boundary at the surface. This may facilitate gastric resistance.

The lipophilic component (e.g. surfactant) may be any suitable pharmaceutically, nutraceutically, or dietary supplementarily acceptable lipophilic component (e.g. surfactant), suitably one (or more) that is compatible with other components of the polysaccharide layer, coating, and/or solid dosage form as a whole, especially from the point of stability (be chemical or physical stability of coating layer compositions or the ultimate coating or solid dosage form).

The lipophilic component may be or comprise a fatty acid, and/or a salt thereof, and/or an ester thereof. For instance, the lipophilic component may comprise stearic acid, but may alternatively or additionally comprise glyceryl monostearate, glyceryl distearate, and/or glyceryl tristearate, and may alternatively or additionally comprise stearate salts such as sodium stearate. The lipophilic component may be or comprise palmitic acid, palmitate salt(s), and/or palmitate ester(s). The lipophilic component may be or comprise caprylic acid, caprylate salt(s), and/or caprylate ester(s)—e.g. glyceryl caprylate.

In a particular embodiment, the lipophilic component (e.g. surfactant) is a non-ionic surfactant. In a particular embodiment the surfactant comprises one or more hydrogen bonding moieties (e.g. hydroxy groups) and one or more hydrophobic groups (e.g. alkyl chains).

In a particular embodiment, the surfactant is a compound defined by the Formula I:

wherein X is a hydrophilic portion, Y is a hydrophobic portion, and L is absent or is a linker between the hydrophilic and hydrophobic portion of the surfactant.

In a particular embodiment, X is $R_x$ as defined herein.
In a particular embodiment, Y is $R_y$ as defined herein.
In a particular embodiment, L is $L_{xy}$ as defined herein.
In a particular embodiment, X is $R_x$ as defined herein, Y is $R_y$ as defined herein, and L is $L_{xy}$ as defined herein.

Herein, a group $R_x$ may have any one of the following definitions:

(1) a group comprising one or more hydrogen bonding moieties (suitably selected from an $R_{H\text{-}bond}$ group as defined herein), suitably wherein at least one of the hydrogen bonding moieties is a hydrogen-bond donor (e.g. hydroxyl);

(2) a moiety selected from the group consisting of (1-8C) alkyl, (2-8C)alkenyl, (2-8C)alkynyl, (1-6C)alkoxy, (2-6C)alkenyloxy, (2-6C)alkynyloxy, (1-6C)alkylthio, (1-6C)alkylamino, di-[(1-6C)alkyl]amino, (2-6C)alkanoyl, (2-6C)alkanoyloxy, (2-6C)alkanoylamino;

wherein at least one CH, CH$_2$, CH$_3$ group of R$_x$ is substituted by a hydrogen bonding moiety (suitably selected from an R$_{H\text{-}bond}$ group as defined herein), suitably wherein at least one of the hydrogen bonding moieties is a hydrogen-bond donor (e.g. hydroxyl);

(3) a moiety which (optionally when taken together with L) is or comprises a polyalkyleneglycol moiety;

(4) R$_x$ is a (1-4C)alkyl wherein at least one CH, CH$_2$, CH$_3$ group of R$_x$ is substituted by a hydrogen bonding moiety (suitably selected from an R$_{H\text{-}bond}$ group as defined herein), suitably wherein at least one of the hydrogen bonding moieties is a hydrogen-bond donor (e.g. hydroxyl);

(5) R$_x$ is CH$_2$CH$_2$(OH) or CH$_2$CH(OH)CH$_2$(OH), wherein at least one hydroxyl group is a free hydroxyl, especially where L is —O—;

(6) R$_x$ is CH$_2$CH(OH)CH$_2$(OH), wherein at least one (preferably both) hydroxyl group(s) is a free hydroxyl;

wherein any one or more groups within the R$_x$ group may be optionally substituted by one or more R$_{opt}$ groups as defined herein or an -L-Y moiety Herein, a group R$_y$ may have any one of the following definitions:

(1) a moiety selected from the group consisting of (1-36C)alkyl, (2-36C)alkenyl, (2-36C)alkynyl, (1-36C)alkoxy, (2-36C)alkenyloxy, (2-36C)alkynyloxy, (1-36C)alkylthio, (1-36C)alkylsulphinyl, (1-36C)alkylsulphonyl, (1-36C)alkylamino, di-[(1-36C)alkyl]amino, (1-36C)alkoxycarbonyl, (2-36C)alkanoyl, (3-36C)alkenoyl, (2-36C)alkanoyloxy, N-(1-36C)alkylcarbamoyl, N,N-di-[(1-36C)alkyl]carbamoyl, (2-36C)alkanoylamino, N-(1-6C)alkyl-(2-36C)alkanoylamino, N-(1-36C)alkylureido, N'-(1-36C)alkylureido, N',N'-di-[(1-36C)alkyl]ureido, N,N'-di-[(1-36C)alkyl]ureido, N,N',N'-tri-[(1-36C)alkyl]ureido, N-(1-36C)alkylsulphamoyl, N,N-di-[(1-36C)alkyl]sulphamoyl, (1-36C)alkanesulphonylamino;

(2) a moiety selected from the group consisting of (6-24C)alkyl, (6-24C)alkenyl, (6-24C)alkynyl, (6-24C)alkoxy, (6-36C)alkenyloxy, (6-24C)alkynyloxy, (6-24C)alkylthio, (6-24C)alkylsulphinyl, (6-24C)alkylsulphonyl, (6-24C)alkylamino, di-[(6-24C)alkyl]amino, (6-24C)alkoxycarbonyl, (6-24C)alkanoyl, (6-24C)alkenoyl, (6-24C)alkanoyloxy, N-(6-24C)alkylcarbamoyl, N,N-di-[(6-24C)alkyl]carbamoyl, (6-24C)alkanoylamino, N-(1-6C)alkyl-(6-24C)alkanoylamino, N-(6-24C)alkylureido, N'-(6-24C)alkylureido, N',N'-di-[(6-24C)alkyl]ureido, N,N'-di-[(6-24C)alkyl]ureido, N,N',N'-tri-[(6-24C)alkyl]ureido, N-(6-24C)alkylsulphamoyl, N,N-di-[(6-24C)alkyl]sulphamoyl, (6-24C)alkanesulphonylamino;

(3) a moiety selected from the group consisting of (6-24C)alkyl, (6-24C)alkenyl, (6-24C)alkynyl, (6-24C)alkylsulphinyl, (6-24C)alkylsulphonyl, (6-24C)alkoxycarbonyl, (6-24C)alkanoyl, (6-24C)alkenoyl, N-(6-24C)alkylcarbamoyl, N,N-di-[(6-24C)alkyl]carbamoyl, N-(6-24C)alkylsulphamoyl, N,N-di-[(6-24C)alkyl]sulphamoyl;

(4) a moiety selected from the group consisting of (6-24C)alkyl (6-24C)alkanoyl, and (6-24C)alkenoyl;

(5) (6-36C)alkanoyl, (6-36C)alkenoyl, (6-24C)alkanoyl, or (6-24C)alkenoyl;

(6) (12-24C)alkanoyl;

(7) a moiety selected from the group consisting of stearoyl, Capryloyl, Caproyl, Lauroyl, Myristoyl, Palmitoyl, Arachidoyl, Behenoyl, Lignoceroyl, Cerotoyl, Myristoleoyl, Palmitoleoyl, Sapienoyl, Oleoyl, Elaidoyl, Vaccenoyl, Linoleoyl, Linoelaidoyl, α-Linolenoyl, Arachidonoyl, Eicosapentaenoyl, Erucoyl, Docosahexaenoyl;

(8) Stearoyl;

wherein any one or more groups within the R$_y$ group may be optionally substituted by one or more R$_{opt}$ groups as defined herein.

Herein, a group L$_{xy}$ may have any one of the following definitions:

(1) a direct bond or a divalent moiety selected from O, S, SO, SO$_2$, N(R$_L$), CO, CH(OR$_L$), CON(R$_L$), N(R$_L$)CO, N(R$_L$)CON(R$_L$), SO$_2$N(R$_L$), N(R$^6$)SO$_2$, C(R$_L$)$_2$O, C(R$_L$)$_2$S, C(R$_L$)$_2$N(R$_L$), or C(R$_L$)$_2$ wherein each R$_L$ is independently hydrogen or (1-8C)alkyl;

(2) a divalent moiety selected from O, S, N(R$_L$), or C(R$_L$)$_2$ wherein each R$_L$ is independently hydrogen or (1-4C)alkyl;

(3) O (i.e. oxy).

Herein, a group R$_{opt}$ may have any one of the following definitions:

(1) a moiety selected from the group consisting of halogeno, trifluoromethyl, cyano, nitro, hydroxy, amino, carboxy, carbamoyl, ureido, (1-8C)alkyl, (2-8C)alkenyl, (2-8C)alkynyl, (1-6C)alkoxy, (2-6C)alkenyloxy, (2-6C)alkynyloxy, (1-6C)alkylthio, (1-6C)alkylsulphinyl, (1-6C)alkylsulphonyl, (1-6C)alkylamino, di-[(1-6C)alkyl]amino, (1-6C)alkoxycarbonyl, (2-6C)alkanoyl, (2-6C)alkanoyloxy, N-(1-6C)alkylcarbamoyl, N,N-di-[(1-6C)alkyl]carbamoyl, (2-6C)alkanoylamino, N-(1-6C)alkyl-(2-6C)alkanoylamino, N-(1-6C)alkylureido, N'-(1-6C)alkylureido, N',N'-di-[(1-6C)alkyl]ureido, N,N'-di-[(1-6C)alkyl]ureido, N,N',N'-tri-[(1-6C)alkyl]ureido, N-(1-6C)alkylsulphamoyl, N,N-di-[(1-6C)alkyl]sulphamoyl, (1-6C)alkanesulphonylamino and N-(1-6C)alkyl-(1-6C)alkanesulphonylamino, or from a group of the formula:

$$L_{opt}\text{—}Q_{opt}$$

wherein:

L$_{opt}$ is a direct bond or is selected from O, S, SO, SO$_2$, N(R$_L$), CO, CH(OR$_L$), CON(R$_L$), N(R$_L$)CO, N(R$_L$)CON(R$_L$), SO$_2$N(R$_L$), N(R$^6$)SO$_2$, C(R$_L$)$_2$O, C(R$_L$)$_2$S and C(R$_L$)$_2$N(R$_L$), wherein each R$_L$ is independently hydrogen or (1-8C)alkyl, and Q$_{opt}$ is aryl, aryl-(1-6C)alkyl, (3-8C)cycloalkyl, (3-8C)cycloalkyl-(1-6C)alkyl, (3-8C)cycloalkenyl, (3-8C)cycloalkenyl-(1-6C)alkyl, heteroaryl, heteroaryl-(1-6C)alkyl, heterocyclyl or heterocyclyl-(1-6C)alkyl, wherein one or more groups within the R$_{opt}$ group may independently be optionally substituted by one or more further of the aforedescribed R$_{opt}$ groups (i.e. first generation nested R$_{opt}$ group(s)), and further such nested R$_{opt}$ groups may be present (e.g. second and third generation nested R$_{opt}$ group(s)), though suitably any such nestings are restricted to at most second generation nested R$_{opt}$ groups, suitably only first generation;

(2) a moiety selected from the group consisting of halogeno, trifluoromethyl, cyano, nitro, hydroxy, amino, carboxy, carbamoyl, ureido, (1-3C)alkyl, or from a group of the formula:

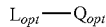

wherein:
$L_{opt}$ is a direct bond or is selected from O, S, SO, $SO_2$, $N(R_L)$, CO, $CH(OR_L)$, $CON(R_L)$, $N(R_L)CO$, $N(R_L)CON(R_L)$, wherein each $R_L$ is independently hydrogen or (1-3C)alkyl, and
$Q_{opt}$ is aryl, or aryl-(1-6C) alkyl;
(3) a moiety selected from the group consisting of halogeno, trifluoromethyl, cyano, nitro, hydroxy, amino, carboxy, carbamoyl, ureido, and (1-3C)alkyl;
wherein any one or more groups within the $R_{opt}$ group may independently be optionally substituted by one or more further $R_{opt}$ groups as defined herein (i.e. first generation nested $R_{opt}$ group(s)), and further such nested $R_{opt}$ groups may be present (e.g. second and third generation nested $R_{opt}$ group(s)), though suitably any such nestings are restricted to at most second generation nested $R_{opt}$ groups, suitably only first generation.

Herein, a group $R_{H-bond}$ may have any one of the following definitions:
(1) a moiety selected from the group consisting of hydroxyl, amino, (1-12C)alkylamino, mercapto, carboxyl (e.g. a carboxylic acid), sulfonyl (e.g. a sulfonic acid), sulfinyl (e.g. a sulfinic acid), phosphoryl (e.g. a phosphoric acid), phosphonyl (a phosphonic acid);
(2) a moiety selected from the group consisting of hydroxyl, amino, and (1-12C)alkylamino;
(3) hydroxyl.

In a more particular embodiment, Y is $C(O)R_{y1}$ such that the surfactant is a compound defined by the Formula $I_{y1}$:

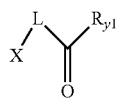

wherein X and L are as defined anywhere herein, and $R_{y1}$ is (5-35C)alkyl or (5-35C)alkenyl, suitably (10-26C)alkyl or (10-26C)alkenyl;
wherein any one or more groups within the $R_{y1}$ group may be optionally substituted by one or more $R_{opt}$ groups as defined herein.

In a more particular embodiment, X is $CH_2[C(OR_w)]_nR_{x1}$ such that the surfactant is a compound defined by the Formula $I_{x1}$:

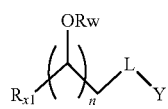

wherein L and Y are as defined anywhere herein, and n is an integer between 1 and 12,
$R_{x1}$ is hydrogen or is selected from the group consisting of (1-6C)alkyl, (2-6C)alkenyl, (1-6C)alkoxy, (2-6C)alkenyloxy, (2-6C)alkynyloxy, (1-6C)alkylthio, (1-6C)alkylamino, di-[(1-6C)alkyl]amino,
each $R_w$ is independently hydrogen or is select from the group consisting of $R_{opt}$ or -L-Y;
wherein at least one, preferably at least two, hydroxy moieties of the X group are free hydroxy moieties (i.e. at least one $R_w$ is suitably hydrogen).

Suitably n is 1, 2, or 3. More suitably n is 1 or 2, most suitably 2 (especially where $R_{x1}$ is hydrogen). Most suitably $R_{x1}$ is hydrogen. Most suitably $R_w$ is hydrogen.

In a more particular embodiment, X is $CH_2[C(OR_w)]_nH$ such that the surfactant is a compound defined by the Formula Ix:

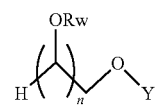

wherein Y are as defined anywhere herein, and
n is an integer between 1 and 6 (most suitably 1, 2, or 3),
each $R_w$ is independently hydrogen or is another Y group;
wherein at least one $R_w$ group is hydrogen.

In a more particular embodiment, X is $CH_2[C(OR_w)]_nH$, L is O, and Y is $C(O)R_{y1}$ such that and the surfactant is a compound defined by the Formula $I_{xy}$:

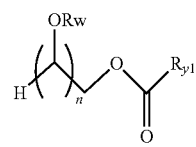

wherein:
n is an integer between 1 and 3 (most suitably 2),
each $R_w$ is independently hydrogen or is another Y group (most suitably all $R_w$ groups are hydrogen);
at least one $R_w$ group is hydrogen;
$R_{y1}$ is (5-35C)alkyl or (5-35C)alkenyl, suitably (10-26C)alkyl or (10-26C)alkenyl.

In a particular embodiment, the non-ionic surfactant is a fatty acid ester of a polyol, suitably of glycerol.

In a particular embodiment, the non-ionic surfactant is a fatty acid ester compound, most suitably glyceryl monostearate (GMS).

It will be understood by those skilled in the art that the lipophilic component (or surfactant) may comprise or be otherwise provided amongst a bundle of compounds. For instance, natural oils may comprise a plurality of various glycerides, one or more of which may be as defined herein. In an embodiment, the lipophilic component (or surfactant) as defined herein is (substantially) a single compound as defined herein, whether or not said single compound is one of many compounds of a mixture. In other embodiments, the lipophilic component (or surfactant) as defined herein is one or more compounds as defined herein, whether said one or more compounds are provided separately or as a mixture.

Hydrophobic Compound and Waxes

A coating or coating composition of the invention (which may be any coating or coating composition as defined herein) suitably comprises a hydrophobic compound. Suitably the hydrophobic compound is a wax. The hydrophobic component (or wax) may constitute a lipophilic component, or indeed a further lipophilic component (where others are present as well), as set forth herein. However, in accordance with an aspect of the present invention there is provided a solid dosage form coating or solid dosage form coating composition comprising a wax. In accordance with an alternative aspect of the invention, there is provided a medical device coating (e.g. a coating for an implant) or medical device coating composition comprising a wax. Any coatings defined herein for a solid dosage form may also be coatings for a medical device, such as an implant, or other such device that may be surgically introduced to a subject in need thereof.

The hydrophobic component or wax suitably increases the lipophilicty of a coating and thus reduces water and/or acid uptake of a solid dosage form or medical device to protect the coated item (e.g. tablet core or medical device). In this manner, a wax may be used as an additive in any solid dosage form or medical device coating composition, including existing products which may benefit from a coating with increased lipophilicity.

A hydrophobic component or wax is suitably incorporated into coatings and coating compositions alongside a suitable surfactant or emulsifier. Such a surfactant or emulsifier suitably facilitates emulsification of the hydrophobic component or wax, for instance when forming (and stabilising) relevant coating compositions, and thus facilitates the coating process and improves distribution (e.g. homogeneity) of the wax with the final coating. Suitably the surfactant or emulsifier additionally serves to increase acid protection of the relevant coated article (e.g. dosage form or medical device). The surfactant or emulsifier may be any one of the suitable surfactants or emulsifiers described herein, for instance, in the context of lipophilic components. In a particular embodiment the surfactant or emulsifier is a non-ionic surfactant, suitable GMS.

The weight ratio of hydrophobic component (or wax) to surfactant/emulsifier is suitably 10-60:1-20, suitably 20-40:5-15, suitably about 3:1.

The hydrophobic component is suitably a wax. The wax is suitably a solid at SATP, suitably a malleable solid. The wax suitably has a melting point above 30° C., more suitably above 40° C., and suitably the wax melts to form a free-flowing hydrophobic liquid. The wax is suitably insoluble in water. The wax is suitably soluble in hydrophobic solvents, such as heptane.

The wax is suitably not a surfactant or emulsifier in its own right.

The wax is suitably selected from the group consisting of an animal wax, a plant/vegetable wax, a mineral wax, or any combination thereof.

Suitably the wax is selected from the group consisting of animal waxes: beeswax, Chinese wax, Lanolin, Shellac, and/or Spermaceti; plant/vegetable waxes: bayberry wax, candelilla wax, carnauba wax, castor wax, esparto wax, Japan wax, Ouricury wax, rice bran wax, soy wax, and/or tallow tree wax; and mineral waxes: ceresin wax, montan wax, ozocerite wax, and/or peat wax; or any combination thereof.

In a particular embodiment the wax is selected from the group consisting of beeswax (e.g. white, unbleached, or yellow), ceresin wax, carnauba wax, lanolin. In a particular embodiment, the wax is selected from the group consisting of beeswax and ceresin wax.

The hydrophobic component may comprise one or more compounds that are "wax-like" (e.g. compounds identical or similar to compounds present in waxes). The hydrophobic component is suitably selected from the group including a carboxylate ester, a carbonate ester, an ortho-ester, a boronate ester, a phosphate ester, a phosphonate ester, a phosphite ester, a sulphate ester, a sulphonate ester, a sulphite ester, a sulphinate ester, a sulphenate ester, an amide, an imide, a carbamate, a urea or any combination thereof.

Suitably the hydrophobic component comprises a compound comprising at least two hydrophobic groups (e.g. optionally substituted hydrocarbyl groups comprising a hydrocarbyl moiety at least 6 carbon atoms) connected via a linker.

Suitably the hydrophobic component may comprise or consist of a compound defined by the Formula $HC_1$:

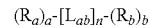

(Formula $HC_1$)

wherein:
the or each $R_a$ and $R_b$ group are each independently optionally substituted hydrocarbyl groups wherein each hydrocarbyl group comprises a hydrocarbyl moiety of at least 6 carbons (suitably at least 8, suitably at least 10, suitably at least 12, suitably at least 14);
the n $L_{ab}$ groups are linkers which collectively link a $R_a$ groups to b $R_b$ groups, wherein each $L_{ab}$ group is attached to either:
i) at least one $R_a$ group and at least one $R_b$ group; or
ii) at least one hydrogen and at least one of either an $R_a$ group or an $R_b$ group;
wherein each $L_{ab}$ group is independently selected from the group consisting of —O—, —S—, N, —$NR_L$—, —C(O)—, —OC(O)—, —C(O)O—, —OC(O)O—, —C(O)N($R_L$)—, —OC(O)N($R_L$)—, —$NR_L$C(O)O—, —N($R_L$)C(O)—, N($R_L$)CON($R_L$), —S(O)—, —OS(O)—, —S(O)O—, —S(O)$_2$—, —OS(O)$_2$—, —S(O)$_2$O—, —OS(O)O—, —N($R_L$)S(O)—, —S(O)N($R_L$)—, —S(O)$_2$—, —N($R_L$)S(O)$_2$—, —S(O)$_2$N($R_L$)—, —N($R_L$)S(O)N($R_L$)—, —N($R_L$)S(O)O—, —OS(O) N($R_L$)—, —OP(O$R_L$)O—, —OP(O)(O$R_L$)O—, —OP(O)(O—)$_2$, wherein each $R_L$ is independently hydrogen or (1-8C)alkyl (suitably 1-30 alkyl);
a and b are each an integer independently having a value of 1, 2, 3, 4, 5, or 6 (suitably 1, 2, or 3);
n is an integer having a value of 1, 2, 3, 4, 5, or 6 (suitably 1, 2, or 3).

$R_a$ and $R_b$ units may be connected via $L_{ab}$ in a variety of different ways. In a particular embodiment, a=b=n=1, and so each $R_a$ and $R_b$ group is linked via a single $L_{ab}$ linker positioned therebetween. This is typically the case for simple fatty acid esters. In some embodiments a=1, b=1, 2, or 3, and n=3 as per glyceryl monostearate, glyceryl distearate, and glyceryl tristearate. In such molecules, the single $R_a$ group is attached n linker groups, and one or more of the linker groups is attached to an $R_b$ group.

Suitably the maximum value that either a or b can take is n. Suitably at least one of a or b is 1. Suitably, where n>1, all linker groups are attached to either a $R_a$ or $R_b$ group. In a particular embodiment, a=b=n=1.

Suitably the or each $L_{ab}$ group is independently selected from the group consisting of —C(O)—, —OC(O)—, —C(O)O—, and —OC(O)O—. Most suitably the or each $L_{ab}$ group is independently selected from the group consisting of —OC(O)— and —C(O)O—. Suitably the hydrocarbon component comprises one or more fatty acid esters.

Suitably $R_a$ and $R_b$ are independently selected from optionally substituted (6-60C)hydrocarbyl, suitably optionally substituted (12-60C)hydrocarbyl, suitably optionally substituted (14-60C)hydrocarbyl. Suitably $R_a$ and $R_b$ are independently selected from optionally substituted (8-50C)hydrocarbyl, suitably optionally substituted (12-40C)hydrocarbyl, suitably optionally substituted (14-36C)hydrocarbyl. The hydrocarbyl groups are suitably independently selected from alkyl, alkenyl, alkynyl, cycloalkyl, cycloalkenyl, alkylcycloalkyl, and cycloalkylalkyl.

Suitably $R_a$ and $R_b$ are independently selected from optionally substituted (6-60C)alkyl, (6-60C)alkenyl, and (6-60C)alkynyl.

Optional substituents ($R_{opt}$) of the aforementioned hydrocarbyl groups may be selected from any of the groups defined hereinbefore as $R_{opt}$.

In a particular embodiment the hydrocarbon component comprises palmitoleate and/or oleate esters of (30-32C) alcohols. In a particular embodiment the hydrophobic component is or comprises n-hexadecyl palmitate.

Where a hydrophobic component or wax is present in a coating or coating composition, other excipients may also be present. For example, the coating or coating composition may additionally comprise an antitacking agent, for example, talc. Other suitable excipients may include pigments, colourants, preservatives, anti-oxidants, and opacifiers.

In some embodiments of the invention, multiple hydrophobic component-containing coatings may be layered one on top of the other.

According to a further aspect of the present invention, there is provided a solid dosage form comprising a core with a coating; wherein the coating comprises a plurality of coating layers, wherein the coating layers comprise:

A lipophilic (e.g. wax-containing) coating layer comprising (suitably consisting essentially of or consisting of) a lipophilic component (e.g. wax); and at least one protective coating layer which provides protection (e.g. during formation, storage, processing, administration, consumption, digestion) for either or both the lipophilic (e.g. wax-containing) layer and/or the core.

The lipophilic component within the lipophilic layer may be any lipophilic component or compound defined herein. In preferred embodiments, the lipophilic component of the lipophilic layer is a wax (suitably a wax as defined herein), and the lipophilic coating layer may be thus a wax-containing coating layer. Suitably the lipophlic or wax-containing coating layer consists essentially of the lipophilic component or a mixture of lipophilic components (suitably a wax or mixture of waxes as defined herein). Suitably the lipophlic or wax-containing coating layer consists of the lipophilic component or a mixture of lipophilic components (suitably a wax or mixture of waxes as defined herein).

Suitably the lipophilic coating layer underlies (and is suitably surrounded by) at least one protective coating—suitably an outer coating layer. Suitably such a protective coating may be any coating layer as defined herein (e.g. polysaccharide-based coating layer). Suitably such a protective layer may itself comprise a lipophilic component, suitably a lipophilic component that is the same as a lipophilic component of the lipophilic coating layer, suitably a wax.

Suitably the lipophilic coating layer overlies (and thus surrounds) at least one protective coating. Suitably such a protective layer is in addition to the aforementioned out protective layer that overlies the lipophilic layer. Suitably such a protective coating layer may be any coating layer as defined herein (e.g. polysaccharide-based coating layer). Suitably such a protective layer may itself comprise a lipophilic component, suitably a lipophilic component which is the same as a lipophilic component of the lipophilic coating layer, suitably a wax.

In a particular embodiment, the lipophilic coating layer comprises or consists of wax; and at least one protective coating layer comprises wax in combination with another component, suitably a surfactant and/or polysaccharide, suitably a surfactant and/or polysaccharide as defined herein. Suitably the lipophilic coating layer consists of wax and is sandwiched between (whether or not in direct contact with) an inner protective layer and an outer protective layer. Suitably both inner and outer protective layers comprise a wax, a surfactant, and a polysaccharide (most suitably a polyuronic acid such as alginic acid or a suitable salt thereof). As such, the solid dosage form comprises a triple-layered coating.

Any embodiments of this aspect may utilised the components and compositions used in any other aspect of the present invention.

Suitably any or all inner and outer polysaccharide-based layers (e.g. which may sandwich a lipophilic coating layer) are as defined herein and suitably may be applied via spray coating techniques. A wax layer may be applied through different means, for example a hot-melt procedure.

Stabilising Layer and Associated Coating Layer Composition

As per the aforementioned polysaccharide-based layer, the stabilising layer and corresponding coating layer composition (i.e. stabilising coating layer composition) from which said coating layer may be formed suitably comprise (substantially) the same ingredients, suitably in (substantially) the same relative weight quantities (or weight ratios), except for any ingredients (e.g. solvents) removed (whether partially or completely) during formation of the relevant coating layer and solid dosage form. As such, unless stated otherwise, any description herein regarding ingredients of a coating layer (e.g. enteric coating, or specific stabilising layer) may equally apply to the corresponding coating layer composition (e.g. enteric coating composition, or specific stabilising coating layer composition), and vice versa.

The stabilising coating layer/composition suitably comprises at least one stabilising component. Suitably the at least one stabilising component comprises a compound or species (e.g. cation) that is capable of affecting (especially when mixed therewith, particularly in the presence of a solvent system) the physical properties of any esterified or non-esterified polyuronic acids present within the coating. Most suitably, the stabilising component is capable of affecting the solubility and/or gelling properties of any such esterified and/or non-esterified polyuronic acids. In a particular embodiment, the stabilising component induces precipitation and/or gelling when added to a solution of the non-esterified polyuronic acid, and may optionally induce precipitation and/or gelling when added to a solution of the esterified polyuronic acid.

The stabilising component is suitably selected from an acid, a multivalent metal salt, or a combination thereof. Herein, a "multivalent metal salt" is a salt comprising a multivalent metal cation (i.e. a metal cation exhibiting an oxidation state of +2 or higher, most suitably +2—i.e. divalent).

Where the stabilising component is or comprises an acid, the pure acid (i.e. when unmixed and undissolved) is suitably a solid acid at SATP. Where the stabilising component is or comprises a multivalent metal salt, the pure acid (i.e. when unmixed and undissolved) is suitably a solid multivalent metal salt at SATP.

Suitably, the stabilising coating layer/composition comprises an esterified polyuronic acid, suitably an esterified polyuronic acid as defined herein with respect to the polysaccharide-based layer. As such, in a particular embodiment the polyuronic acid is suitably a pectin compound as defined herein. Suitably, the stabilising coating layer/composition is substantially free of any non-esterified polyuronic acid (suitably as defined herein in relation to the polysaccharide-based layer—e.g. aliginate compound). The stabilising coating layer/composition is suitably substantially free of the non-esterified polyuronic acid(s) or comprises the/a non-esterified polyuronic acid(s) in a wt % concentration (relative to the weight of the stabilising coating layer or the non-solvent ingredients of a corresponding stabilising coating layer composition) less than or equal to 5 wt %, suitably less than or equal to 4 wt %, suitably less than or equal to 2 wt %, suitably less than or equal to 1 wt %, suitably less than or equal to 0.1 wt %.

Most suitably the stabilising coating layer/composition comprises both the stabilising component and an esterified polyuronic acid.

The stabilising coating layer/composition suitably comprises a lipophilic component (e.g. surfactant). In a particular embodiment, the stabilising coating layer/composition comprises the stabilising component, the esterified polyuronic acid, and optionally a surfactant.

A stabilising coating layer composition is suitably a solution, dispersion, or emulsion, comprising a suitable solvent system, most suitably an aqueous and/or alcoholic solution, dispersion, or emulsion, most suitably an aqueous and/or alcoholic solution. The corresponding stabilising coating layer suitably comprises a lower proportion of solvent(s) (e.g. water) than the coating composition from which it has been derived. The stabilising coating layer suitably is or comprises a dried stabilising coating layer composition. The stabilising coating is suitably a (dried) film of stabilising coating layer composition.

The stabilising coating layer/composition suitably comprises a stabilising component and an esterified polyuronic acid in a respective weight ratio of 100-10:5-100 (i.e. between 100:5 and 10:100), suitably 70-30:10-30, more suitably 60-40:15-25, most suitably about 50:20.

The stabilising coating layer/composition suitably comprises a stabilising component, an esterified polyuronic acid, and a lipophilic component (e.g. surfactant) in a respective weight ratio of 100-10:5-100:0.01-10 (i.e. 100-10 pbw stabilising component, 5-100 pbw esterified polyuronic acid, and 0.01-10 pbw lipophilic component (e.g. surfactant)), suitably 70-30:10-30: 0.1-5, more suitably 60-40:15-25, 1-4, most suitably about 50:20:2.5.

In a particular embodiment, the stabilising coating layer/composition comprises:
  70-30 parts by weight (pbw) stabilising component;
  10-30 pbw esterified polyuronic acid; and
  0.1-5 pbw lipophilic component (e.g. surfactant).

Suitably the stabilising coating coating composition comprises any of the aforesaid combinations of ingredients, suitably in the relative ratios stipulated. Suitably the stabilising coating layer consists essentially of any of the aforesaid combinations of ingredients, suitably in the relative ratios stipulated—i.e. suitably the coating layer itself is a (substantially) dried form of corresponding coating composition.

Suitably the stabilising coating composition comprises 0.1-5 wt % (or % w/v) esterified polyuronic acid(s), more suitably 0.5-4 wt % (or % w/v), most suitably 1-3 wt % (or % w/v).

Suitably the stabilising coating composition comprises 0.1-15 wt % (or % w/v) stabilising component(s), more suitably 1-10 wt % (or % w/v), most suitably 3-7 wt % (or % w/v).

Suitably the polysaccharide-based coating composition comprises 0.005-2 wt % (or % w/v) lipophilic component(s) (e.g. surfactant(s)), more suitably 0.01-1 wt % (or % w/v), most suitably 0.2-0.3 wt % (or % w/v).

The stabilising coating layer/composition of the invention is most suitably used as part of a coating, most suitably as a distinct layer thereof where the coating has a plurality of coating layers. Most suitably, the stabilising coating layer is adjacent to any further coating layer to be stabilised.

Alternatively, the coating may comprise a single layer composed of a mixture of the stabilising coating layer/composition with a further coating layer/composition. Under such circumstances, the relevant mixture may be formed in the solid phase or liquid phase (e.g. in solution). The stabilising coating layer/composition is particularly beneficial when included as part of a coating along with a further coating layer that comprises a non-esterified polyuronic acid (such as any of those defined herein).

As such, the present invention provides a solid dosage form comprising a core and a coating, wherein the coating comprises a stabilising coating layer and a further coating layer (optionally as a single co-mixed layer, or preferably as two distinct layers, preferably adjacent to one another, most preferably with the stabilising coating layer sandwiched between the further coating layer and core), wherein the stabilising coating layer comprises a stabilising component and an esterified polyuronic acid, and the further coating layer comprises a non-esterified polyuronic acid.

In a particular embodiment, the further coating layer is a polysaccharide-based coating layer as defined herein, suitably comprising the non-esterified polyuronic acid.

The stabilising coating layer suitably improves the enteric properties of any further coating layer, whether co-mixed or as distinct and separate layers. This is suitably the result of the stabilising component's effect upon the solubility and/or gelling properties of a non-esterified polyuronic acid residing in the further coating layer (e.g. the polysaccharide-based coating layer as defined herein). Most suitably, the stabilising component stabilises, prevents or inhibits solubilisation of, inhibits degradation of, and/or otherwise inhibits disintegration of the non-esterified polyuronic acid at a pH less than 2, suitably a pH less than 3, and suitably a pH less than or equal to 4, more suitably at a pH between 1 and 4 or 2 and 4. In this manner, the stabilising coating layer may suitably improve the enteric properties of the coating as a whole, even at higher pHs between 3 and 4. Since gastric fluid can, depending on the circumstances, sometimes reach higher pHs it is desirable to impart extra stability to enteric coatings.

In a particular example, the presence of an acid stabilising component can serve to inhibit dissolution and/or distintegration (e.g. in gastric juice, or an aqueous solution at a pH between 1 and 4) of an alginate compound in an adjacent coating layer (e.g. polysaccharide-based coating layer). As such, the coating may better survive transit towards the small intestine (where dissolution and/or disintegration may desirably take place).

A particular advantage of using the combination of a stabilising component and an esterified polyuronic acid is suitably the facilitated formation of stable coating layer compositions (especially stable solutions) which in turn allows higher quality film coatings to be formed. Furthermore, the combination of stabilising component and esterified polyuronic acids within coatings improves the robustness and overall performance of said coatings, afford more optimal delayed release properties, especially in comparison to most existing enteric coatings formed from natural products. The presence of the esterified polyuronic acid within the stabilising coating layer may suitably facilitate the stabilisation process, and improves compatibility between two adjacent layers. As such, both the stabilising coating layer and further coating layer suitably comprise the same esterified polyuronic acid.

The stabilising coating layer may be included as an inner coating (i.e. close to the core) and/or outer layer (i.e. to enclose the tablet within an acidic shell).

The stabilising coating layer may be included as a middle coating layer that is surrounded by an internal layer and an external layer.

Stabilising Component

The stabilising coating layer/composition comprises a stabilising component. Suitably, when in situ within a coating alongside an associated further coating layer (e.g. polysaccharide-based layer), the stabilising component acts (as discernible experimentally, for instance by comparing a coating with and without said stabilising component and/or stabilising coating layer as a whole):

i) to prevent, inhibit, and/or retard dissolution, disintegration, and/or degradation (e.g. decomposition through hydrolysis) of one or more components of the associated further coating layer (e.g. either or both a non-esterified polyuronic acid and/or an esterified polyuronic acid) in gastric juices or an aqueous solution (e.g. just water or a buffer solution) at a pH between pH 1 and pH 4; and/or ii) to promote, facilitate, or otherwise prevent, inhibit, and/or retard to a lesser extent compared to the conditions set forth in i) above, dissolution, disintegration, and/or degradation (e.g. decomposition through hydrolysis) of one or more components of the associated further coating layer (e.g. either or both a non-esterified polyuronic acid and/or an esterified polyuronic acid) in small-intestinal fluid or an aqueous solution (e.g. just water or a buffer solution) at a pH between pH 5 and pH 7.5, more suitably at a pH between pH 6 and pH 7.5.

The stabilising component is suitably a component (or combination of components) which promotes precipitation (or otherwise reduces the solubility) of a non-esterified polyuronic acid (suitably as defined herein in relation to the polysaccharide-based layer) when mixed therewith in a neutral (at pH7) aqueous solvent system.

The stabilising component is suitably a component (or combination of components) which promotes gelling (or otherwise increases overall viscosity, e.g. dynamic viscosity) of a non-esterified polyuronic acid (suitably as defined herein in relation to the polysaccharide-based layer) when mixed therewith in a neutral (at pH7) aqueous solvent system.

The stabilising component suitably is or comprises an acid component and/or a multivalent metal compound (i.e. comprising a metal species having an oxidation state of +2 or higher).

Acid Component

In a particular embodiment, the stabilising component is an acid component or acceptable salt thereof (e.g. sodium salt). The acid component suitably is or comprises one or more acidic compounds or acceptable salt(s) thereof (i.e. compounds with acidic protons which may optionally be replaced by another cation).

Suitably the acid component (or one or more compounds thereof) is water-soluble.

Suitably the acid component (or one or more compounds thereof) is a solid at SATP. Suitably the acid component (or one or more compounds thereof) has, at standard pressure (as per SATP), a melting point greater than or equal to 80° C., suitably greater than or equal to 100° C., suitably greater than equal to 130° C., suitably greater than or equal to 200° C., suitably less than or equal to 350° C., suitably less than or equal to 300° C.

Suitably the acid component has at least two distinct acid moieties (whether contained within a single acid compound or distributed over a plurality of acid compounds of the acid component). Suitably, the acid component has three or fewer distinct acid moieties, most suitably a maximum of two acid moieties.

Suitably each of the at least two distinct acid moieties exhibits a different $pK_a$ value. Suitably one of the acid moieties exhibits a $pK_a$ value between 2 and 5 and another of the acid moieties exhibits a $pK_a$ value between 3 and 6. More suitably one of the acid moieties exhibits a $pK_a$ value between 2.5 and 4.5 and another of the acid moieties exhibits a $pK_a$ value between 3.5 and 5.5. Most suitably one of the acid moieties exhibits a $pK_a$ value between 2.8 and 3.5 (more suitably 3.0-3.2) and another of the acid moieties exhibits a $pK_a$ value between 4.0 and 5.0 (more suitably 4.3-4.9).

Suitably the at least two distinct acid moieties are a part of the same molecule (e.g. diacids, triacids, etc.). Suitably one of the at least two distinct acid moieties exhibits a $pK_a$ value between 2.8 and 3.5 and another of the at least two distinct acid moieties in the same molecule exhibits a $pK_a$ value between 4.0 and 5.0. Such diacid compounds with multiple $pK_a$ values can buffer the pH of an aqueous mixture between a lower and upper threshold very effectively which can facilitate its ability to physically and/or chemically stabilise a neighbouring component.

In a particular embodiment, the acid component (or compound(s) thereof) is or comprises an organic acid, suitably an organic acid comprising 2 or more carbon atoms. Suitably the organic acid is a carboxylic acid (including any acceptable salt(s) thereof). Suitably the organic acid comprises two or more carboxylic acid moieties within the same molecule, and most suitably comprises exactly two carboxylic acid moieties.

In a particular embodiment, the organic acid is an unsaturated organic acid.

The acid component suitably is or comprises an organic acid (or acceptable salt thereof) selected from the group consisting of: fumaric acid, citric acid, tartaric acid, malic acid, maleic acid, malonic acid, glutaric acid, adipic acid, sorbic acid, pimelic acid, suberic acid, succinic acid, glutaconic acid, muconic acid, glutinic acid, citraconic acid, mesaconic acid, tartronic acid, arabinaric acid, saccharic acid, and/or a derivative and/or acceptable salt thereof. In a particular embodiment, the acid component is selected from the group consisting of: fumaric acid, citric acid, glutaric acid, adipic acid, sorbic acid and/or a derivative and/or acceptable salt thereof.

In a particular embodiment, the acid component is or comprises fumaric acid.

In an alternative embodiment, the acid component comprises two or more acidic compounds. Suitably the two or more acidic compounds are selected to comply with one of the aforementioned pair of pKa ranges, suitably so that one of the acidic compounds suitably has a pKa falling within one of the pKa ranges of the pair whereas the other of the two or more acidic compounds has a pKa falling within one of the other pKa range.

Multivalent Metal Compound

In a particular embodiment, the stabilising component is or comprises a multivalent metal compound. The multivalent metal compound comprises at least one multivalent metal cation. The multivalent metal compound may be a metal salt and/or metal complex comprising at least one multivalent metal cation having an oxidation state of +2 or higher. Most suitably, the multivalent metal cation has an oxidation state no higher than +2—i.e. in a particular embodiment, the multivalent metal cation has an oxidation state of +2 exactly.

Suitably the multivalent metal cation is capable of complexing with one or more components of any associated further coating layer. For instance, the multivalent metal cation may suitably be capable of complexing with a non-esterified polyuronic acid (e.g. alginate) present within a proximal further coating layer. Suitably the multivalent metal cation reduces the solubility, at a pH between pH 1 and pH 3, suitably at a pH between pH 1 and pH 4, of any such components with which it may complex, though suitably the solubility of the same is higher at a pH between pH 6 and 7.5.

Suitably the multivalent metal compound is water-soluble, particularly at a pH between pH 1 and 4.

Suitably the multivalent metal compound is a solid at SATP.

In a particular embodiment, the multivalent metal compound is or comprises an alkaline earth metal salt. In a particular embodiment, the multivalent metal compound is a calcium salt.

Esterified Polyuronic Acid

The stabilising layer/composition suitably comprises an esterified polyuronic acid. The esterified polyuronic acid is most suitably an esterified polyuronic as defined herein in relation to the polysaccharide-based layer, whether or not the stabilising layer/composition is used in combination with said polysaccharide-based layer. Most suitably, where both the stabilising layer /composition and the polysaccharide-based layer/composition are used and/or present within the final dosage form, both such layers incorporate the same esterified polyuronic acid. This facilitates interlayer compatibility and/or any stabilisation afforded to the polysaccharide-based layer. Most suitably the esterified polyuronic acid used with the stabilising layer and/or the polysaccharide-based layer is a pectin compound.

Surfactant (or Lipophilic Component)

The stabilising coating layer/composition suitably additionally comprises a lipophilic component (e.g. surfactant). The lipophilic component (e.g. surfactant) is most suitably a lipophilic component (e.g. surfactant) as defined herein in relation to the polysaccharide-based layer, whether or not the stabilising layer/composition is used in combination with said polysaccharide-based layer. Most suitably, where both the stabilising layer/composition and the polysaccharide-based layer/composition are used and/or present within the final dosage form, both such layers incorporate the same lipophilic component (e.g. surfactant). This facilitates the formation of the relevant coating layer composition, which in turn improves the quality of the film-coating resulting therefrom, facilitates interlayer compatibility and/or any stabilisation afforded to the polysaccharide-based layer, and may also facilitate disintegration at the desired pH. Most suitably the surfactant used with the stabilising layer and/or the polysaccharide-based layer is a non-ionic surfactant, for instance, glyceryl monostearate.

Physical Attributes of the Solid Dosage Form

In some cases, the stabilising layer and any further coating layer (e.g. polysaccharide-based layer) may be mixed together (e.g. a substantially homogeneous mixture) so as to form a single layer (e.g. single-layered enteric coating) which is both a further coating layer and a stabilising layer (i.e. a single-layered mixture serving a dual function). Such a single-layered mixture may be produced by coating the core with a single coating composition. Such a single coating composition may comprise a mixture of (or be obtainable by mixing together) a further coating layer composition (e.g. polysaccharide-based coating composition) and/or a stabilising coating composition, or by otherwise combining the respective ingredients thereof into a single coating composition. Alternatively, such a single-layered coating may be produced by coating the core with two distinct coating layer compositions, namely a further coating layer composition (e.g. polysaccharide-based coating composition) and a stabilising coating composition, such that the two distinct coating layer composition form a mixture in situ (e.g. if the two coating layer compositions are applied to the core simulataneously; and/or if after a second coating layer composition is applied after application of a first coating layer composition but before the first coating layer composition has dried).

However, where the coating comprises both a stabilising layer and a further coating layer such as a polysaccharide-based layer, the coating is preferably a multi-layered coating (e.g. bilayer) with discernible and distinct layers (albeit some degree of mixing may be evident at the interface between layer(s)). Suitably, all layers of any multilayered coating contribute in some way to the overall enteric properties of the coating, even if only by providing protection or stability to another layer of the coating.

Where the coating comprises both the further coating layer and the stabilising layer, the stabilising layer suitably constitutes an inner layer of the coating and the further coating layer constitutes an outer layer of the coating. Most suitably the inner layer and outer layer are in contact and/or interface with one another.

In some embodiments, there is an additional inner coating layer sandwiched between the coating and the core. Such a separation layer keeps potentially acidic coating layers away from a potentially acid-sensitive core.

However, in alternative embodiments, the aforementioned coating layer structure may be reversed.

The coating as a whole (be it single or multi-layered) suitably has an average thickness around the core of 10-80 mg/cm$^2$ (i.e. weight per surface area of core), suitably 20-50 mg/cm$^2$, and/or suitably 30-40 mg/cm$^2$.

A stabilising (e.g. inner) coating layer (especially a separate and distinct layer thereof) suitably has an average thickness around the core of 2-35 mg/cm$^2$, suitably 3-20 mg/cm$^2$, and/or suitably 5-15 mg/cm$^2$.

A further (e.g. outer) coating layer, such as a polysaccharide-based layer as defined herein (especially a separate and distinct layer thereof) suitably has an average thickness around the core of 5-50 mg/cm$^2$, suitably 10-40 mg/cm$^2$, and/or suitably 20-30 mg/cm$^2$.

Properties

Suitably the coating consists essentially of (greater than 50 wt % thereof, suitably greater than 70 wt % thereof, suitably greater than 90 wt % thereof, suitably greater than 99 wt % thereof, suitably greater than 99.9 wt % thereof) natural material(s). Likewise, any corresponding coating composition(s) from which the coating is formed suitably consist essentially of natural material(s).

Suitably the coating is transparent, or at least partially transparent (especially at a thickness corresponding to that in the solid dosage form), suitably such that the underlying core is visible through the coating. This may provide an aesthetically pleasing product.

Suitably the coating(s) of the invention are biodegradable.

Suitably the coating(s) of the invention optimise drug release within the duodenum, small-intestine, and/or large intestine, and suitably minimise drug release within the stomach.

Additional Ingredients

The coating(s) of the invention and indeed the solid dosage form(s) as a whole may comprise any number of additional components, both known and unknown in the art, without departing from the spirit of the invention. The benefits of the invention pertain to the coating technology described herein, and the skilled person will readily appreciate that, using the principles outlined in conjunction with the guidance provided within the Example section, a the invention can be broadly applied to a range of embodiments, especially in the field of solid dosage forms in the pharmaceutical, neutraceutical, and dietary supplement sectors.

Excluded Ingredients

Suitably the coating is (substantially) free of synthetic material(s) (e.g. synthetic polymer(s)) or comprises less than or equal to 5 wt % (relative to the total weight of the coating) synthetic material(s), suitably less than or equal to 1 wt % synthetic material(s), suitably less than or equal to 0.1 wt % synthetic material(s), suitably less than or equal to 0.0001 wt % synthetic material(s). Likewise, any coating compositions and/or coating layer composition(s) are suitably free of any synthetic material(s) or comprises less than or equal to 0.5 wt % (relative to the total weight of the relevant coating composition) synthetic material(s), suitably less than or equal to 0.1 wt % synthetic material(s), suitably less than or equal to 0.01 wt % synthetic material(s), suitably less than or equal to 0.00001 wt % synthetic material(s).

Suitably the coating is (substantially) free of any plasticizer(s) (especially synthetic plasticizer(s)) or comprises less than or equal to 5 wt % (relative to the total weight of the coating) plasticizer(s) (especially synthetic plasticizer(s)), suitably less than or equal to 1 wt % plasticizer(s), suitably less than or equal to 0.1 wt % plasticizer(s), suitably less than or equal to 0.0001 wt % plasticizer(s). Likewise, any coating compositions and/or coating layer composition(s) are suitably free of any plasticizer(s) or comprises less than or equal to 0.5 wt % (relative to the total weight of the relevant coating composition) plasticizer(s), suitably less than or equal to 0.1 wt % plasticizer(s), suitably less than or equal to 0.01 wt % plasticizer(s), suitably less than or equal to 0.00001 wt % plasticizer(s).

Specific Embodiments

In a particular embodiment, the solid dosage form comprises a core and a coating, wherein the coating comprises an inner stabilising coating layer adjacent to the core and an outer polysaccharide-based layer adjacent to the inner stabilising coating layer. In such embodiments, the thickness of the inner stabilising coating layer (defined in terms of weight per unit area) is suitably between 1 and 50 mg/cm$^2$, more suitably between 2 and 30 mg/cm$^2$, most suitably between 5 and 10 mg/cm$^2$. In such embodiments, the thickness of the outer polysaccharide-based layer is suitably between 1 and 50 mg/cm$^2$, more suitably between 5 and 40 mg/cm$^2$, most suitably between 10 and 30 mg/cm$^2$.

In a particular embodiment, a polysaccharide-based layer/composition comprises an alginate compound (as a non-esterified polyuronic acid) optionally in combination with a pectin compound (i.e. as an esterified polyuronic acid). Suitably, in such embodiments, the layer/composition additionally comprises a non-ionic surfactant, such as glyceryl monostearate. In such embodiments, the polysaccharide-based coating layer/composition suitably comprises the alginate compound and pectin compound in a respective weight ratio of 100-50:50-0, more suitably 80-90:20-10, most suitably about 85:15. In such embodiments, the polysaccharide-based coating layer/composition suitably comprises the pectin compound, alginate compound, and surfactant in a respective weight ratio of 70-95:30-5:15-2, more suitably 80-90:20-10:10-3, most suitably about 85:15:6.25. In such embodiments, suitably the polysaccharide-based coating composition comprises 0.5-3 wt % (or % w/v) pectin compound, 0.05-1 wt % (or % w/v) alginate compound, and optionally 0.01-1 wt % (or % w/v) non-ionic surfactant.

In a particular embodiment, a stabilising coating layer/composition comprises a pectin compound (i.e. as an esterified polyuronic acid) and an acid (as a stabilising component). Suitably, in such embodiments, the layer/composition additionally comprises a non-ionic surfactant, such as glyceryl monostearate. In such embodiments, the stabilising coating layer/composition suitably comprises the acid and the pectin compound in a respective weight ratio of 70-30:10-30, more suitably 60-40:15-25, most suitably about 50:20. In such embodiments, the stabilising coating layer/composition suitably comprises the acid, the pectin compound, and surfactant in a respective weight ratio of 70-30:10-30:0.1-5, more suitably 60-40:15-25:1-4, most suitably about 50:20:2.5. In such embodiments, suitably the stabilising coating composition comprises 1-10 wt % (or % w/v) acid, 0.5-4 wt % (or % w/v) pectin compound, and optionally 0.01-1 wt % (or % w/v) non-ionic surfactant. In a particular embodiment, the acid is a carboxylic acid, most suitably fumaric acid.

In a particular embodiment, a coating or a coating composition (especially an enteric coating/composition) comprises a polyuronic acid and a surfactant compound characterised by a fatty acid ester of a polyol (e.g. glycerol or a sugar) which surfactant compound exhibits one or more free hydroxyl moieties. Suitably the surfactant is glycerol monostearate.

In a particular embodiment, a coating or a coating composition (especially an enteric coating/composition) comprises alginic acid (or an alginate salt) and a surfactant compound. Suitably the surfactant compound is characterised by a fatty acid ester of a polyol (e.g. glycerol or a sugar) which surfactant compound exhibits one or more free hydroxyl moieties. Suitably the surfactant is glycerol monostearate.

According to an aspect of the invention there is provided a coating or a coating composition (especially an enteric coating/composition), or a solid dosage form comprising said coating (suitably formed from said coating composition), wherein the coating/composition comprises alginate and glycerol monostearate, suitably in a respective weight ratio between 100:1 and 1:1, more suitably between 50:1 and 2:1, more suitably between 20:1 and 4:1.

Most suitably, the solid dosage form is a nutraceutical or a dietary supplement.

Uses of Solid Dosage Form

The solid dosage forms of the invention are especially applicable in the field of pharmaceuticals, nutraceuticals, and dietary supplements. In particular, the solid dosage forms of the invention are applicable to the field of nutraceuticals and dietary supplements, where dosage and intake of solid dosage forms is less regulated and monitored. In these areas it is particularly important to ensure the safety of all excipients (including within coatings), since they may be consumed in high doses over a prolonged period. Thus coatings that are predominantly composed of safe, natural materials are highly desirable. The provision of the high performing coatings of the invention not only enriches the art through the provision of alternative coatings, but also potentially broadens the scope of available nutraceuticals and dietary supplements which may have otherwise been unviable due to the lack of availability of suitable enteric coatings.

EXAMPLES—SECTION 1

Materials and Equipment

The following materials were utilised in the examples which follows:

TABLE 1

Ingredients used to fabricate a core

| Generic name | Common name | Grade | Manufacturer |
| --- | --- | --- | --- |
| Theophylline | — | 99+%, anhydrous | Acres organics, New Jersey, USA |
| Lactose monohydrate | Directly compressible lactose | Ludipress | BASF SE, Germany |
| Polyvinylpyrrolidone | PVP | K 90 | Sigma-Aldrich Co. Ltd., Dorset, UK |
| Microcrystalline cellulose | MCC, Avicel | PH 101 | FMC Biopolymer, Belgium |
| Crosscarmellose sodium | Ac-Di-Sol | SD-711 | FMC Biopolymer, Belgium |
| Magnesium stearate | Magnesium octadecanoate | pure | Sigma-Aldrich Co. Ltd., Dorset, UK |

TABLE 2

Ingredients used to prepare coating layer(s) and solution(s).

| Generic name (main ingredient) | Brand name | Grade | Manufacturer |
| --- | --- | --- | --- |
| Hydroxypropyl Methylcellulose (HPMC) | Methocel | E5 LV | Colorcon Limited, Inc., UK |
| Polyethylene glycol (PEG) | — | 6000 | Sigma-Aldrich Co. Ltd., Dorset, UK |
| Citric Acid | — | Analytical reagent grade | Fisher Scientific UK, Leics, UK |
| Pectin, From Citrus Fruits | — | — | Sigma-Aldrich Co. Ltd., Dorset, UK |
| Fumaric Acid | — | 99+% | Acros Organics |
| Glutaric Acid | — | 99% | Sigma-Aldrich Co. Ltd., Dorset, UK |

TABLE 2-continued

Ingredients used to prepare coating layer(s) and solution(s).

| Generic name (main ingredient) | Brand name | Grade | Manufacturer |
| --- | --- | --- | --- |
| Adipic Acid | — | >=99.5% | Sigma-Aldrich Co. Ltd., Dorset, UK |
| Sorbic Acid | — | >=99% | Sigma-Aldrich Co. Ltd., Dorset, UK |
| Sodium Alginate | — | 15-20 cps | Sigma-Aldrich Co. Ltd., Dorset, UK |

Example 1—Preparation of Casted Films from Film-Casting Compositions

Various film-casting compositions were prepared, each containing a polysaccharide (e.g. sodium alginate or pectin) or a polysaccharide mixture (e.g. sodium alginate and pectin in various ratios). Firstly, the polysaccharide or polysaccharide mixture (2 g) was wetted with 3 mL of absolute ethanol and dissolved in 50 mL distilled water to prepare a 4% w/w solution of polysaccharide(s).

20 ml of the resulting solution was poured onto a Teflon-coated plate and subsequently dried at 40° C. The resulting film was peeled off the plate upon drying, cut in 1.5×10.5 cm squares and stored in plastic bags for further testing.

Example 2—Preparation of Theophylline Tablets ("Core")

For the purpose of the study 150 mg theophylline tablets were prepared according to formulation below:

TABLE 3

Theophylline cores formulation

| Ingredient | Percentage (%) | Per tablet (mg) |
| --- | --- | --- |
| Theophylline | 25 | 150 |
| Lactose monohydrate | 55 | 330 |
| PVP | 1 | 6 |
| MCC | 15 | 90 |
| Ac-Di-Sol | 3 | 18 |
| Magnesium stearate | 1 | 6 |
| Total | 100 | 600 |

Theophylline tablets were prepared by wet granulation. To formulate 1 kg of tablets 250 g of theophylline, 240 g of lactose monohydrate and 10 g of PVP grade K90 were mixed for 15 min. Then 130 mL of distilled water was added successively while stirring. The resultant wet mass was passed through 1 mm sieve using granulator (Erweka AR 402, Germany). Granules were dried in 40° C. until no weight loss. Afterwards, granules were mixed with remaining excipients for 25 min, 250 rpm, using conical mixer (Erweka AR 402, Germany). Tablets were compressed using Riva Minipress single punch tableting machine (Riva, Argentina). Final cores containing 150 mg of theophylline have an average weight of 600 mg and crushing strength of 150 N (tested using a tablet hardness tester, Erweka, Germany). An average disintegration time measured according to USP 30 method was 5 minutes (met the requirements of pharmacopeia: <30 min). Mechanical strength of tablets was checked with a friabilator (Erweka, Germany)—an average weight loss, after 100 rotations per 4 min, amounts to 0.25%, which met the requirements of USP 30: <1.0% (United States Pharmacopeial Convention, 2007).

Example 3—Preparation of Single-Coat Formulations

Various "single-coat" formulations were prepared ready for applying only a single coat to a tablet core. Each individual coating formulation was prepared by dissolving a particular ratio of sodium alginate and pectin (Alg:Pec) to afford a total polysacharride concentration of 2% w/w. The relevant Alg:Pec ratios employed were 0:100 (Fs1), 50:50 (Fs2), 70:30 (Fs3), 85:15 (Fs4) and 100:0 (Fs5).

Glycerol monostearate (GMS) 0.25% (w/w) was dissolved in hot ethanol and added to the pectin solution, and maintained between 50° C. and 60° C.

To study the impact of GMS (in varying proportions) on the film coatings, Alg-Pec 85:15 polymer solution (2% w/w) was used to prepare coating with increasing polymer [Alg-Pec:GMS 0:16 (Fs4.1), 1:16 (Fs4.2), 2:16 (Fs4.3), 4:16 (Fs4.4), 8:16 (Fs4.5) and 16:16 (Fs4.6)].

Example 4—Preparation of Various Coating Compositions to be Used in the Production of Multi-Layer-Coated Tablets

TABLE 4

Formulations F1-F6 of enteric coatings

| Layers | Components | Amount | F1 | F2 | F3 | F4 | F5 | F6 |
|---|---|---|---|---|---|---|---|---|
| Subcoat | Methocel | 10% (w/v) | + | + | + | + | + | + |
| Stabilising coating | Pectin | 2% (w/v) | + | + | + | + | + | − |
|  | GMS | 0.25% (w/w) |  |  |  |  |  |  |
|  | Acid | 5% (w/v) | − | Fumaric Acid | Citric Acid | Sorbic Acid | Adipic Acid | − |
| Prior art-based Coat | Sodium alginate | 30 g | − | − | − | − | − | + |
|  | PEG 6000 | 4.4 g |  |  |  |  |  |  |
|  | Distilled water | 270 g |  |  |  |  |  |  |
| Polysaccharide-based coating | Pectin | 1.7% (w/v) | + | + | + | + | + | − |
|  | Sodium alginate | 0.3% (w/v) |  |  |  |  |  |  |
|  | GMS | 0.125% (w/v) |  |  |  |  |  |  |

As illustrated in Table 4, three different types of coating composition were prepared with a view to forming multi-layer-coated tablets (the formation of which tablets are described below), namely a subcoating composition, a stabilising coating composition, and a polysaccharide-based coating composition. In the case of polysaccharide-based coating compositions, a prior art composition (F6) was prepared and tested as a control.

Example 4.1—Sub-Coating Composition

A sub-coating solution/composition was prepared by dispersing 10% (w/v) of HPMC in distilled water heated to 60° C. and left under stirring until cool and transparent. The tablets of Example 2 would ultimately be subcoated with hydroxypropyl methylcellulose grade E5 (HPMC) prior to the application of further coating layers (which further coating layers collectively form an enteric coating).

Example 4.1—Preparation of Stabilising Coating Compositions (F1-F5)

Various stabilising coating compositions were prepared, based on the formulations outlined in Table 4, by dispersing pectin in minimum amount of ethanol then dissolving it in water at 2% (w/v). GMS was initially dissolved in hot ethanol; adding the hot ethanolic GMS solution to at 0.25% (w/w) to aqueous pectin solution whilst maintaining a temperature between 50°—60° C.

The resulting solution represents that stabilising composition of F1 (see Table 4), without any additional acid.

To prepare formulations F2-F5, a different acid was added in each case to the resultant solution (F1); the concentration of acid being 5% (w/v) (F2—fumaric acid; F3—citric acid; F4=sorbic acid; F5—adipic acid). The resultant solution was heated and maintained between 50-60° C. during application.

Example 4.3—Preparation of Polysaccharide-Based Coating Composition

As per Table 4, a 1.7% (w/v) pectin solution was added to a 0.3% (w/v) solution of alginate; both were dispersed initially in ethanol prior to the addition of water. In order to increase the flexibility of the film coat and reduce aggregation of the tablets, a 0.125% (w/v) GMS solution wetted with hot ethanol and maintained between 50° C. and 60° C. was added. The resultant solution was equilibrated for at least 15 minutes and heated between 50° C. and 60° C. prior to coating. The total percentage of ethanol:water in the final mixture is 15:85.

Comparative Example 1—Preparation of Prior Art-Based Coating Solution (F6)

A coating solution based on those described in US 2008/0312345 A1 (Ideal Cures Pvt. Ltd., Mumbai, India) was prepared using sodium alginate and PEG 6000 (as detailed in Table 4). In a 500 mL beaker sodium alginate (30 g) was slowly added to 270 g water while maintaining vigorous vortex using propeller stirrer (380 rpm) (IKA, Germany) and stirred until complete hydration. 4.4 g PEG 6000 was then added to the dispersion and kept stirring for about 45 min (200 rpm). The 2-minute homogenisation of suspension (Ultra-Turrax T8, IKA-WERKE, Germany) was applied as an exemption of filtration process suggested by US 2008/0312345 A1.

Example 5—Preparing Coated Tablets

Each of the single-coat compositions of Example 3 (Fs1-5 and Fs4.1-4.6), each of the stabilising solutions prepared in Examples 4 (F1-F5) and also Comparative Example 1 (F6) were applied to theophylline cores (30 g) using a Strea-1 bottom spray fluidised bed coater (GEA Pharma Systems AG, Aeromatic-Fielder, Bubendorf, Switzerland). The inlet temperature, product temperature and outlet temperature were 58, 48 and 45° C. The fan speed was 3-4 and atomiser pressure is 0.35 Bar.

After applying each stabilising layer a polysaccharide-based coating solution (as per Example 4.3) was duly applied and thereafter dried to yield the final enterically-coated solid dosage form.

Coating levels of coated tablets were calculated according to the following equation:

$$x = \frac{wg \times m}{d}$$

Where:

$x$—coating thickness $\left(\frac{mg}{cm^2}\right)$ wg—weight gained m—tablet mass (g)

d—tablet surface ($d = 2, 32 \ cm^2$)

Corresponding thickness coating values are displayed in Table 5.

TABLE 5

Coating levels

| Layers | Components | Weight gained (%) | Coating thickness (mg/cm²) |
|---|---|---|---|
| Subcoat | Methocel | 2 | 5.17 |
| Stabilising coating | Pectin GMS (Acid) | 4 | 10.34 |
| Prior art-based coating | Sodium alginate PEG 6000 Distilled water | 10 | 18.10 |
| Polysaccharide-based coating | Pectin Sodium alginate GMS | 7 | 25.86 |

EXPERIMENTAL TESTS AND ANALYSES

Analysis Method 1—Photography Imaging

In order to assess coating appearance, digital images of the tablets were captured using Canon EOS Rebel SL1 model DS126441 18 MP Digital SLR camera. For a comparison uncoated and coated tablets were photographed side by side.

Analysis Method 2—SEM Imaging

The coating thickness and morphology was assessed using scanning electron microscopy (Jeol). Primarily, tablets where cut in half, undusted and placed on metal pots. A sputtering technique was employed to coat tablets with gold for 2 min. Then, the cross sections were imaged under the magnification of 450× and images were taken at 20.0 kV.

Experimental Test 1—Acid Uptake and Weight Loss Studies of Casted Films

Tubes containing 50 mL of 0.1M HCl were positioned in a water bath fitted with an orbital shaker set at an ambient temperature of 37° C. Film samples produced in Example 1 were accurately weighed (OW) and placed in fabric mesh holders ready for testing. Once the ambient temperature had been reached, samples were transferred to HCl medium agitated at 100 rpm.

Samples were removed at set intervals 0, 10, 60 and 120 minutes, visible moisture was removed and the Wet Weight (WW) of the samples was taken. Once weighed the samples were dried at 40° C. until no further weight variation (i.e. a consistent weight) was observed to ensure all moisture had evaporated. The subsequent Dry Weight (DW) was then noted. Percentage water uptake and weight loss were calculated using the following formulas pictured below:

$$\text{Water uptake (\%)} = \frac{WW - DW}{DW} \times 100$$

$$\text{Weight Loss(\%)} = \frac{OW - DW}{OW} \times 100$$

Analysis was Conducted in Triplicate

Experimental Test 2—In Vitro Drug Release—pH Change Dissolution Tests

In vitro drug release studies for all gastro-resistant coating formulations used in this study were conducted in dissolution USP II apparatus (AT 7 Smart, SOTAX, Switzerland). Each experiment was carried out in triplicate in dissolution medium maintained at 37±0.5° C. with paddle speed of 50 rpm. At first, the tablets were tested in 750 mL of a stimulated gastric fluid (0.1M HCl, pH 1.2) for 2 hours. Subsequently tablets were analysed for 4 hours in pH of 6.8 phosphate buffer. Phosphate buffers were prepared by mixing stimulated gastric fluid with 250 mL of stock solution I to achieve pH 6.8.

Stock solution I: 70.1 g of $Na_3PO_4$ dissolved in 2000 mL of distilled water (0.214M)

Within all the experiment the amount of released theophylline was determined at 5 min intervals by UV/VIS spectrophotometer (PG Instruments Limited, UK) at the wavelength of 272 nm and path length of 1 mm. Data was analysed using IDISis software (Icalis Data Systems, 2012) and a time-release relationship was plotted with Microsoft Excel software.

Experimental Test 3—Disintegration Tests

The disintegration test was performed to determine whether tablets disintegrate in a prescribed period of time. The examination was conducted in accordance with United Stated Pharmacopeia 30 standards. In a one litre capacity beaker a 800 mL of 0.1M HCl (pH 1.2) was placed and warmed to 37±2° C. One tablet was put in each of 6 cylinders of basket-rack assembly, covered with a disk and placed in the immersion fluid. The apparatus (Erweka, Germany) was operated at frequency of 30 cycles per minute for an hour. Following that 0.1M HCl was replaced with 800 mL of simulated intestinal fluid (SIF) at 37±2° C. and experiment was continued until complete disintegration of all tablets.

Simulated intestinal fluid: 68.05 g of $KH_2PO_4$ and 8.96 g of NaOH dissolved in 10.0 L distilled water, pH 6.8 adjusted with 1M NaOH

Experimental Test 4—Acid Uptake Tests

The acid uptake test was performed to asses acid resistance and uptake of all gastric-resistant coating formulation used in this study. Three coated tablets were weighed individually prior to 2-hours exposure to 0.1M HCl at 37° C. Then tablets were drained off the acid, dried with filer paper and reweight. The acid uptake was calculated as follows:

$$\text{weight gained}(\%) = \frac{\text{wet mass} - \text{dry mass}}{\text{dry mass}} \times 100$$

Experimental Test 5—Gastric Resistance Properties at Elevated pH—Dissolution Tests Considering the fact that pH in stomach is increasing by consumed food and drinks the drug release in higher pH was established. The dissolution test was carried out for all enteric coating formulations under the same conditions as in vitro release studies described in Experimental Test 2 above. The experiment was conducted in triplicate for two hours in following dissolution media:
pH 2:0.01M HCl solution
pH 3:0.001M HCl solution
The amount of drug released was quantified at 5 min intervals using UV spectrophotometer at the wavelength of 272 nm and path length of 1 mm. Data was analysed using IDISis software.

Experimental Test 6—Bicarbonate Buffer In Vitro Dissolution Tests

Natural enteric buffer in human is a bicarbonate buffer, which has lower buffer capacity than the phosphate one used widely in pharmacopeial dissolution test. Thus, the additional evaluation of drug release was performed in Krebs-Henseleit buffer which resembles the real human small intestine fluids more appropriately.

Bicarbonate buffer release test was performed under the same conditions as in vitro release study, described in Experimental Test 2 above. Firstly, tablets were exposed to stimulated gastric fluid for 2 hours. Afterwards dissolution media was replaced with Krebs-Henseleit buffer and the experiment was carried on for further 4 hours. Data was collected in triplicate in the same manner as during in vitro release study.

Krebs buffer (Krebs-Henseleit bicarbonate buffer, pH 7.4): 1.18 mM $KH_2PO_4$, 24 mM $NaHCO_3$, 118.07 mM NaCl, 4.69 mM KCl, 2.52 mM $CaCl_2$, and 1.18 mM $MgSO_4\text{-}7H_2O$, pH 7.4 adjusted with 3M HCl).

Results and Discussion

Impact of GMS on Enteric Casted Films' Acid Uptake and Weight Loss

FIG. 1 shows the results of an initial screen to assess the impact of a glycerol monostearate surfactant upon the enteric properties of the casted films of Example 1. Initial screening indicated that pectin films dissolve within 10 minutes in the acidic media whereas alginate or a mixture of pectin and alginate lose only 20-35% of its weight to the dissolution media (see FIG. 1c). When glycerol monostearate (GMS) was added at 1:16 ratio, the weight loss was significantly reduced over all alginate/pectin ratios (see FIG. 1d). It is suspected that such behaviour is a consequence of the hydrophobic (stearate) portions of GMS and that similar hydrophobic moieties (e.g. as part of other surfactant molecules) would have similar effects. The addition of GMS also had a significant impact on the acid uptake of these formulations. In fact GMS reduced acid uptake of the film from 289 to 110% at pH 1.2 after 2 hours (see FIG. 1a vs 1b).

Impact of GMS Concentration of Gastric Resistance of Alg-Pec Films

In order to study the effect of GMS, gastric resistance tests (in accordance with Experimental Tests 5 and 6 shown above) were performed upon the coated tablets of Example 5 that were coated using the single-coat compositions of Example 3, using various different concentrations of the glyceride. The addition of more acid led to the formation to further reduction in acid uptake and weight loss.

Figure 2:
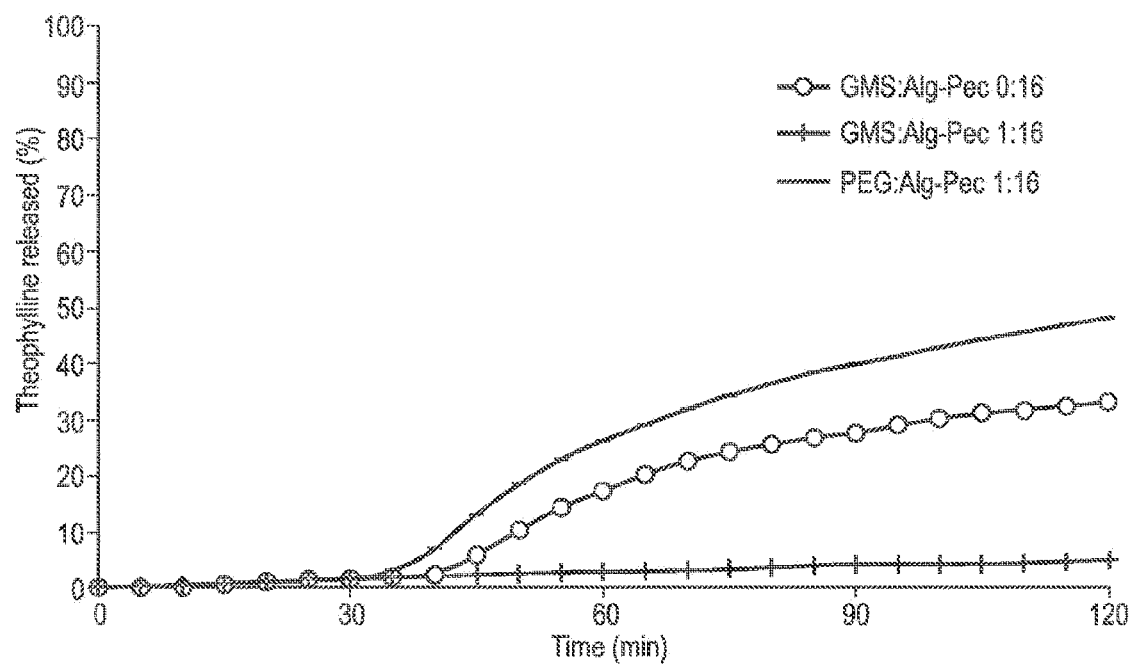
FIG. 2 shows theophylline release profiles ascertained through time-course dissolution testing in acid of coated theophylline tablets whose coatings contain a polysaccharides Alg-Pec in a 85:15 ratio along with either glycerol monostearate (GMS) or polyethylene glycol (PEG 6000) surfactant in the stipulated surfactant:polysaccharides ratio (e.g. 0:16, or 1:16).

The results as shown in FIG. 2 illustrate the superior gastric resistance of tablets coated with 85:15 Alg-Pec when doped with a GMS surfactant.

Disintegration times in the aforementioned gastric resistance tests (at pH 1.2 and also at pH7.4) are shown in Table 6. These results illustrate excellent gastric resistance properties over a range of GMS:Polysaccharides ratios, and good disintegration profiles in simulated intestinal fluid.

TABLE 6 pH change disintegration test of Alg-Pec coated tablets with increasing concentrations of GMS

| GMS:Alg-Pec ratio | HCl (pH 1.2) | Simulated intestinal fluid (pH 7.4) |
|---|---|---|
| GMS:Alg-Pec 0:16 | broke | — |
| GMS:Alg-Pec 1:16 | stable | 13 min |
| GMS:Alg-Pec 2:16 | stable | 10 min |
| GMS:Alg-Pec 4:16 | stable | 10 min |
| GMS:Alg-Pec 8:16 | stable | 10 min |
| GMS:Alg-Pec 16:16 | broke | — |

Figure 3:
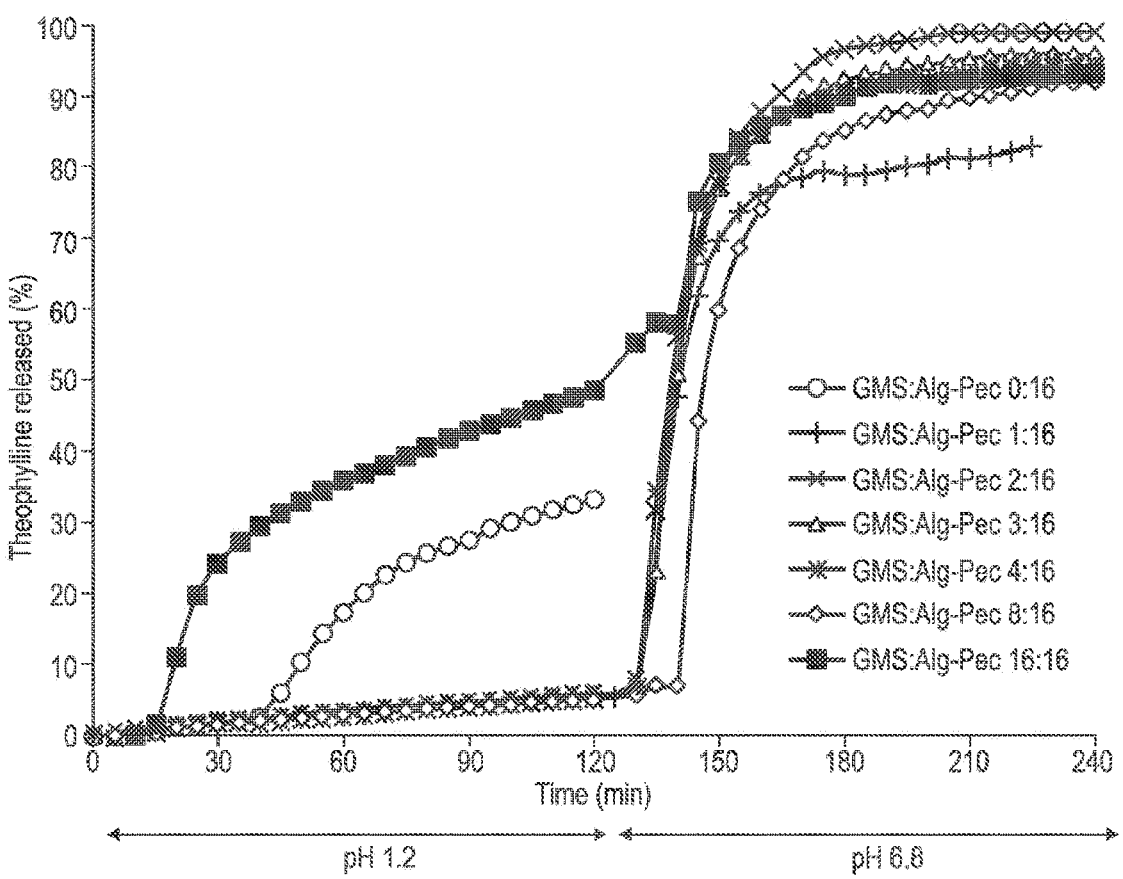
FIG. 3 shows theophylline release profiles ascertained through time-course dissolution testing in acid of coated theophylline tablets whose coatings contain a polysaccharides Alg-Pec in a 85:15 ratio along with varying ratios of GMS surfactant:polysaccharides ratio (e.g. 0:16, 1:16, 2:16, 3:16, 4:16, 8:16, 16:16).

The dissolution patterns (obtained from Experimental Test 2) for tablets coated with varying ratios of GMS:Polysaccharides (85:15 Alg-Pec) is shown in FIG. 3, and supports the findings in the gastric resistance tests.

Impact of Alg:Pec Concentration on Gastric Resistant of Coated Tablets

Figure 4:
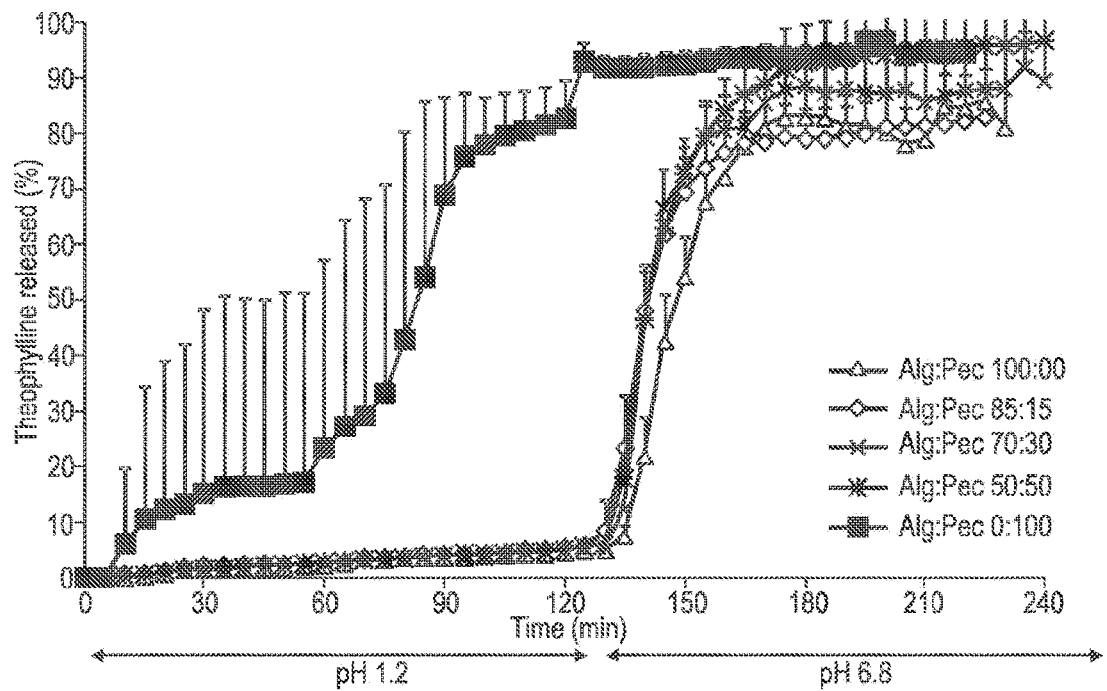
FIG. 4 shows theophylline release profiles ascertained through time-course dissolution testing in acid of coated theophylline tablets whose coatings contain various ratios of Alginate Pectin (1:16 GMS), where all coatings are cured.
Figure 5:
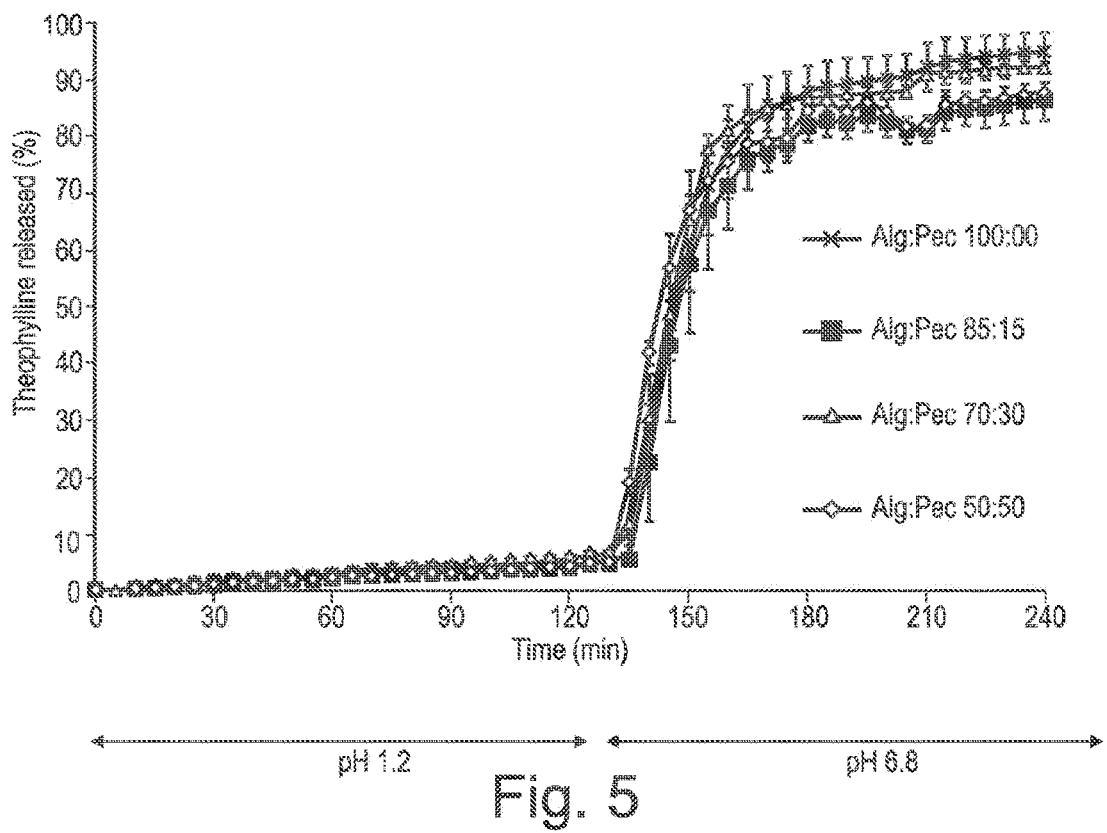
FIG. 5 shows theophylline release profiles ascertained through time-course dissolution testing in acid of coated theophylline tablets whose coatings contain various ratios of Alginate:Pectin, where all coatings are uncured.
Figure 6:
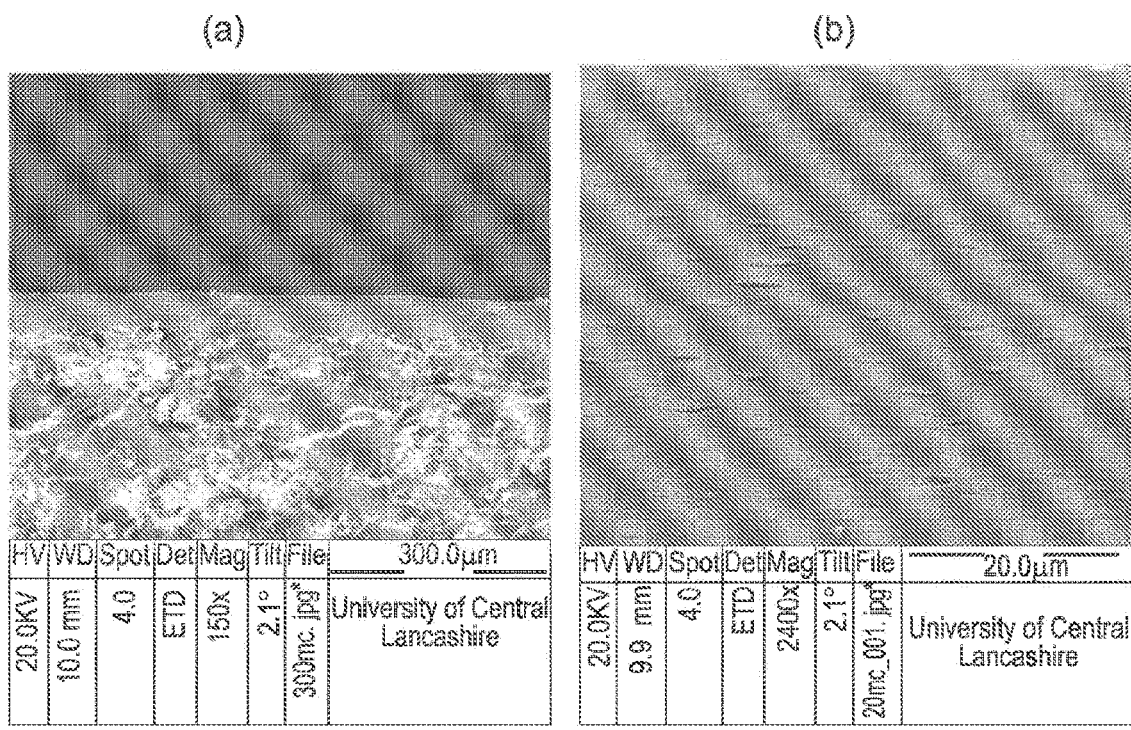
FIG. 6 shows SEM images of a single uncured coating layer Fs5 of Example 3 (i.e. 100:0 alginate/pectin) at a) 300 micron resolution; and b) 20 micron resolution.
Figure 7:
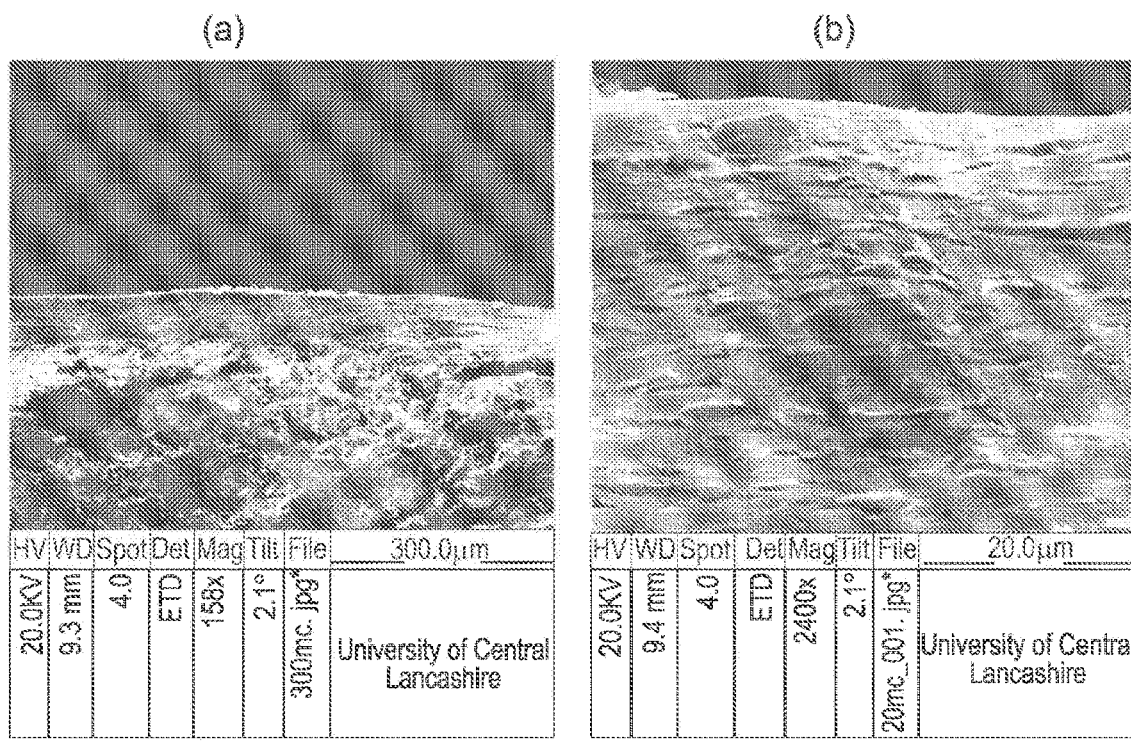
FIG. 7 shows SEM images of a single uncured coating layer Fs1 of Example 3 (i.e. 0:100 alginate/pectin) at a) 300 micron resolution; and b) 20 micron resolution.
Figure 8:
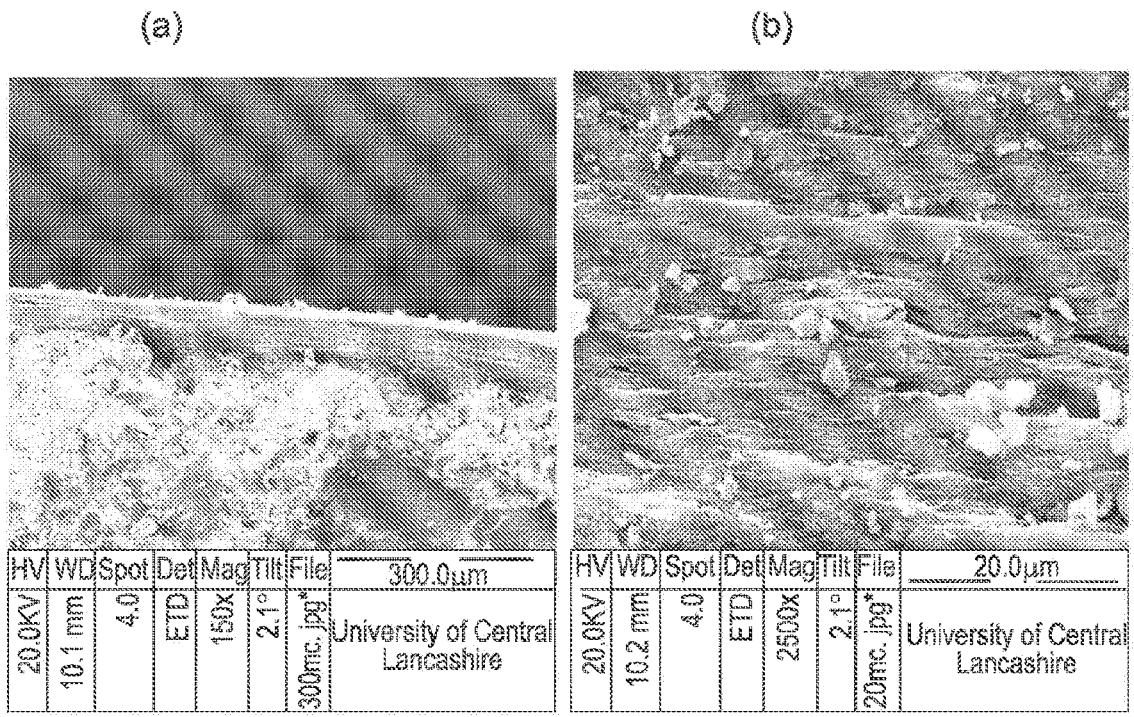
FIG. 8 shows SEM images of a single cured coating layer Fs1 of Example 3 (i.e. 0:100 alginate/pectin) at a) 300 micron resolution; and b) 20 micron resolution.
Figure 9:
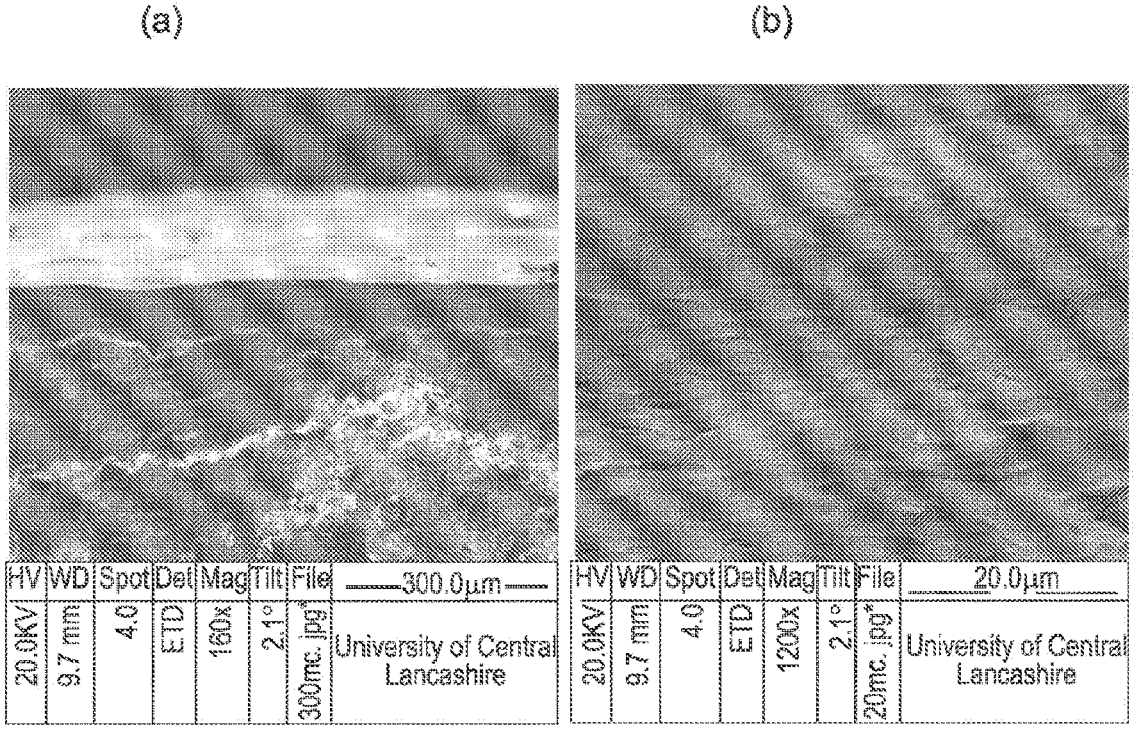
FIG. 9 shows SEM images of a single uncured coating layer Fs2 of Example 3 (i.e. 50:50 alginate/pectin) at a) 300 micron resolution; and b) 20 micron resolution.
Figure 10:
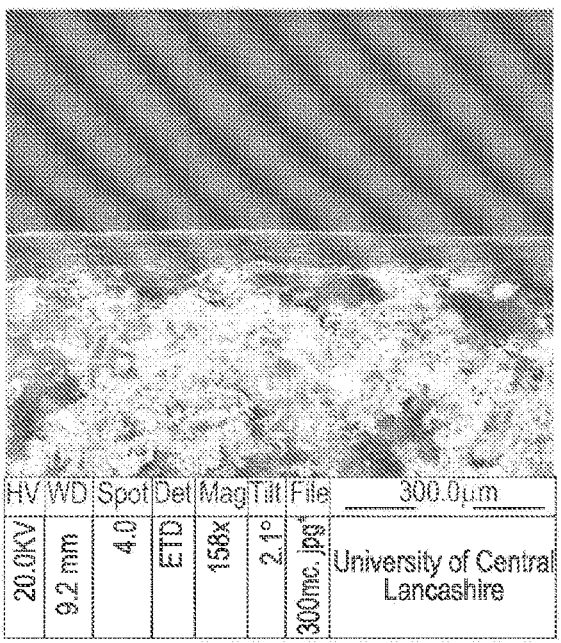
FIG. 10 shows SEM images of a single cured coating layer Fs2 of Example 3 (i.e. 50:50 alginate/pectin) at a) 300 micron resolution; and b) 20 micron resolution.
Figure 10:
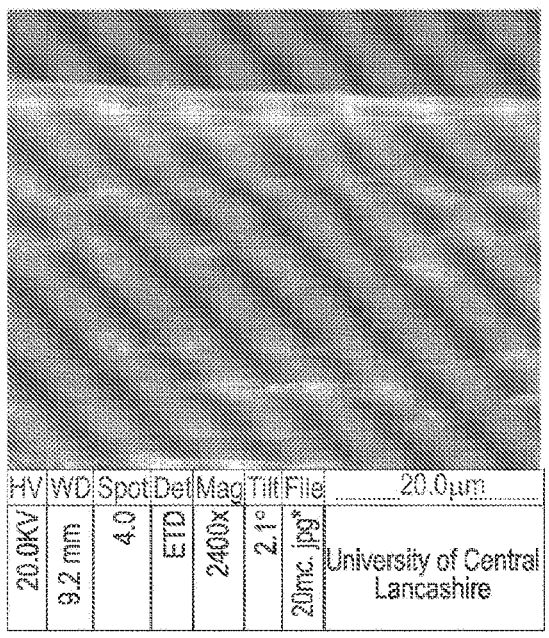
Figure 11:
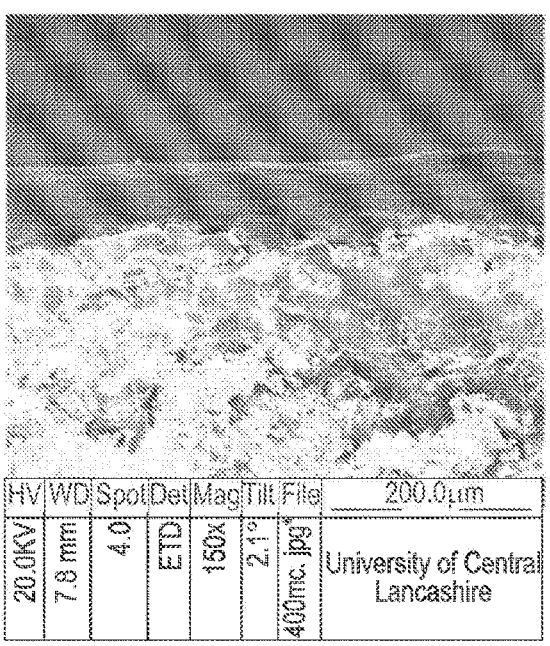
FIG. 11 shows SEM images of a single uncured coating layer Fs3 of Example 3 (i.e. 70:30 alginate/pectin) at a) 300 micron resolution; and b) 20 micron resolution.
Figure 11:
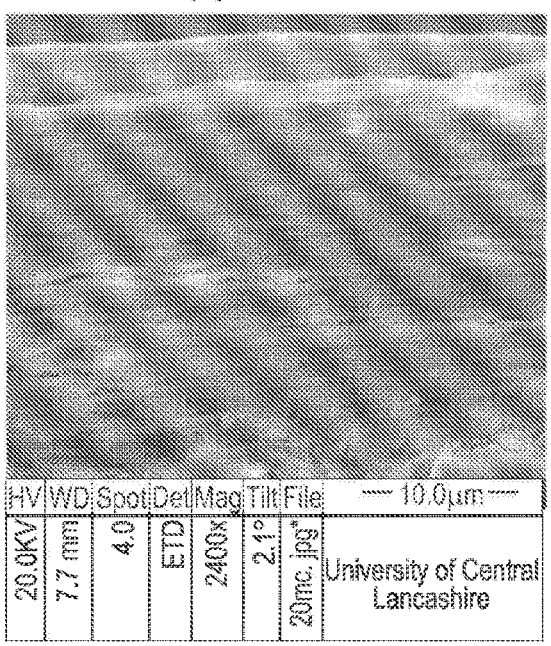
Figure 12:
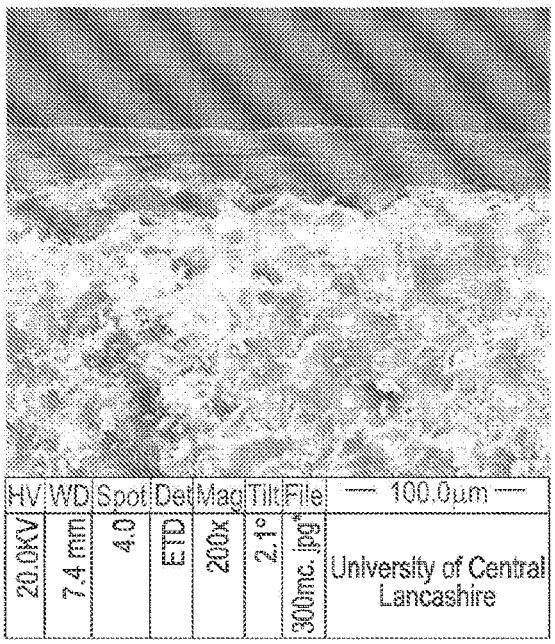
FIG. 12 shows SEM images of a single cured coating layer Fs3 of Example 3 (i.e. 70:30 alginate/pectin) at a) 300 micron resolution; and b) 20 micron resolution.
Figure 12:
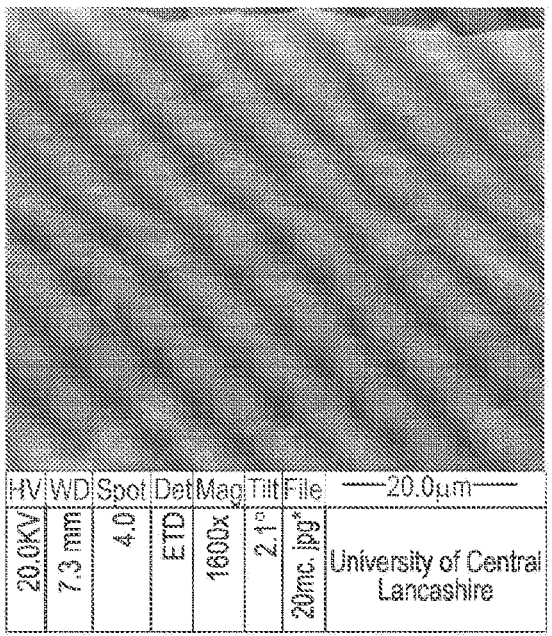
Figure 13:
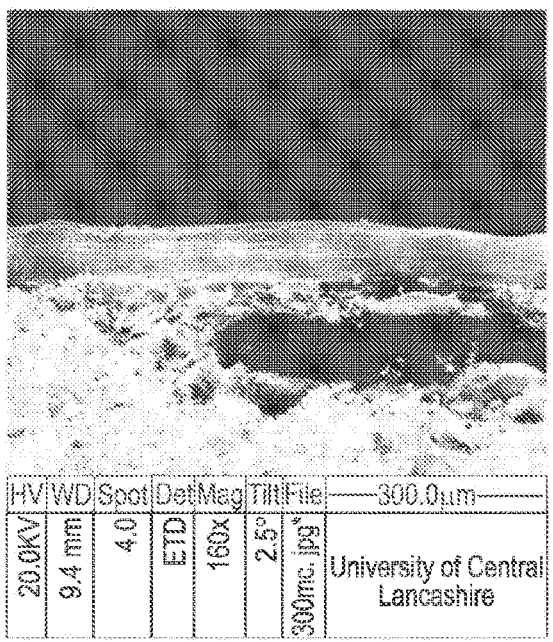
FIG. 13 shows SEM images of a single uncured coating layer Fs4 of Example 3 (i.e. 85:15 alginate/pectin) at a) 300 micron resolution; and b) 20 micron resolution.
Figure 13:
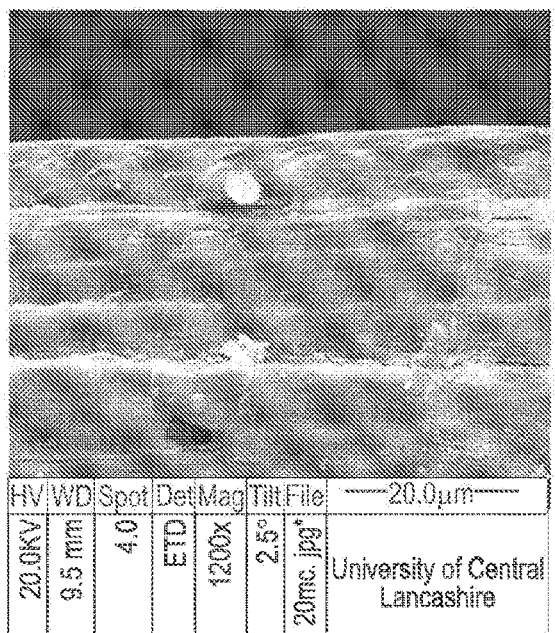
Figure 14:
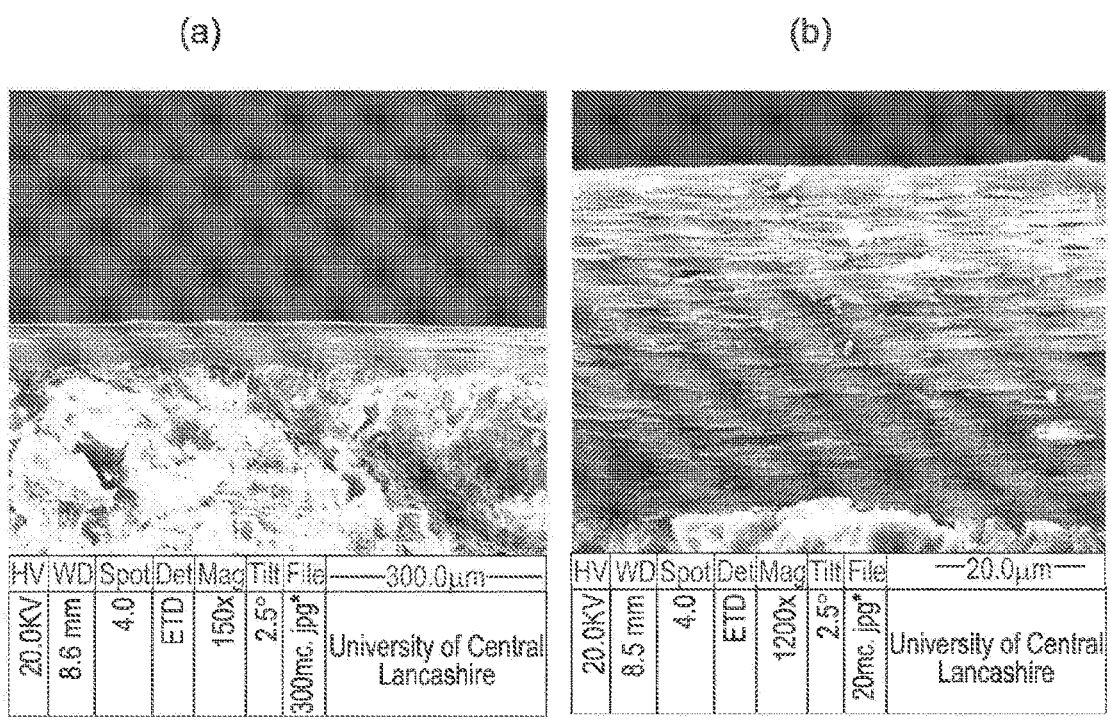
FIG. 14 shows SEM images of a single cured coating layer Fs4 of Example 3 (i.e. 85:15 alginate/pectin) at a) 300 micron resolution; and b) 20 micron resolution.

FIG. 4 shows dissolution patterns (obtained from Experimental Test 2) for tablets coated (without surfactants) with single-coat compositions of Example 3 at various Alg-Pec ratios (i.e. Fs1-Fs5). The coatings for the tests who results are depicted in FIG. 4 were cured at 65° C. prior to testing. FIG. 5 performs similar tests on a narrower selection of the same coatings, though in these experiments the coating had not undergone any curing prior to testing.

Meanwhile, the results of similar such tests are tabulated in Table 7.

TABLE 7 pH change disintegration test of Alg-Pec coated tables.

| Alg:Pec ratio | HCl (pH 1.2) | Simulated intestinal fluid (pH 7.4) |
|---|---|---|
| Alg:Pec 100:00 | broke | — |
| Alg:Pec 00:100 | stable | 9 min |
| Alg:Pec 85:15 cured | stable | 9 min |
| Alg:Pec 70:30 cured | stable | 7 min |
| Alg:Pec 50:50 cured | stable | 6 min |

FIGS. 6 to 14 show several SEM images of single coatings Fs1-Fs5, both in cured and uncured states.
Conclusions Regarding GMS
GMS Appeared to Improve the Enteric Properties of Alginate and/or Pectin-Based Tablet Coatings.
Basis for Further Model Studies For this study, 150 mg Theophylline tablets were used to explore the performance of applied coating systems. The bulky 600 mg core was chosen because it reflects the size of an ordinary dietary supplement product, especially those containing plant extracts or mineral salts. For a number of reasons, theophylline was chosen as a model active for determining active ingredient release profiles in these studies. For instance, theophylline is a class I drug under the Biopharmaceutical Classification System (high solubility and high permeability), hence, the investigation of dissolution profile can be used to provide a predictive and successful in vivo-in vitro correlation of a drug product (Nainar et al., 2012). Moreover, due to its high solubility theophylline shows no dissolution resistance as a substance itself. As a consequence, the release control is determined only by the coating system. At the same time, high solubility of an active is a key factor which contributes to difficulties of controlling a release, and thus provides a representative sample of the challenges facing any enteric coating system.

Analysis

Figure 15:
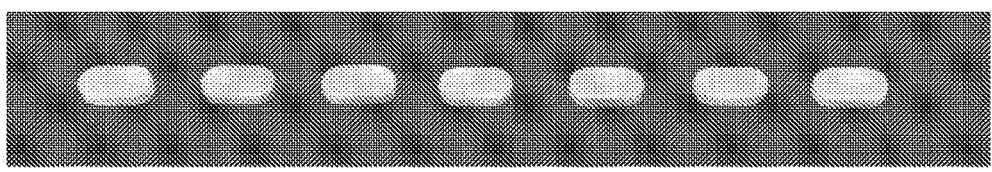
FIG. 15 shows photographic images of both coated and uncoated tablets (cores), placed in the following order (left to right): uncoated, F1, F2, F3, F4, F5, F6 (labelled as per Table 4)
Figure 16:
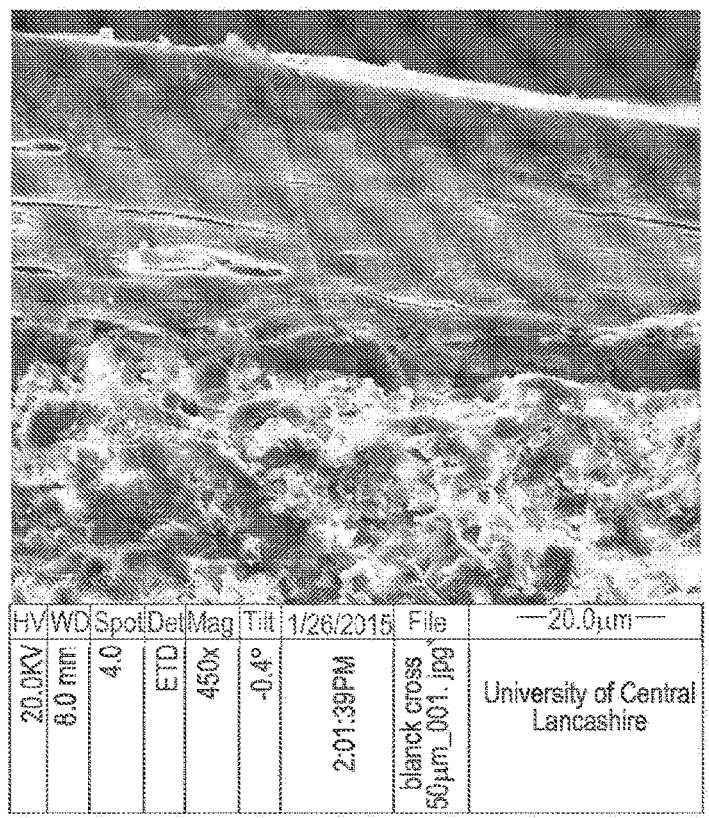
FIGS. 16 to 19 shows SEM images of the coated cores F1-F5.
Figure 17:
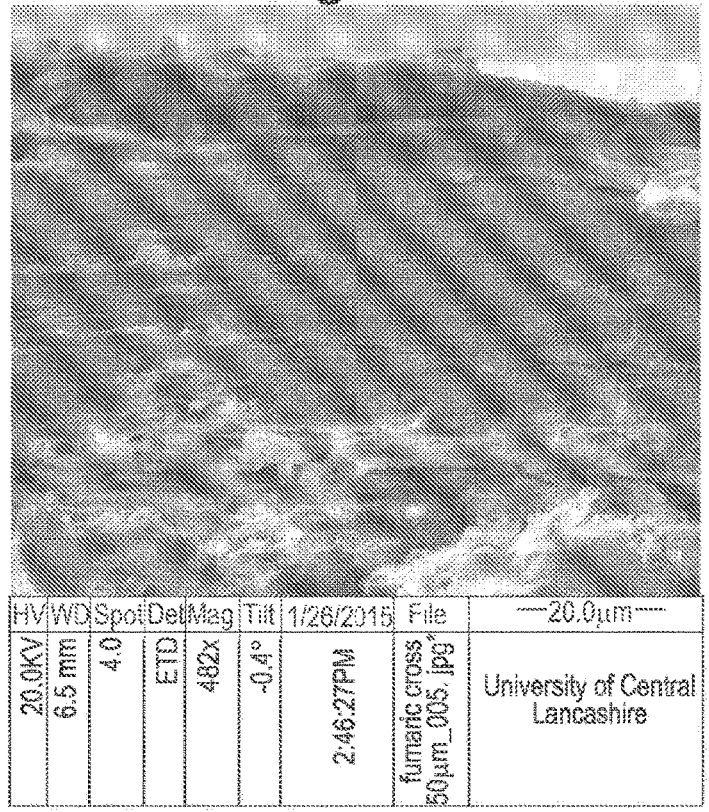
Figure 18:
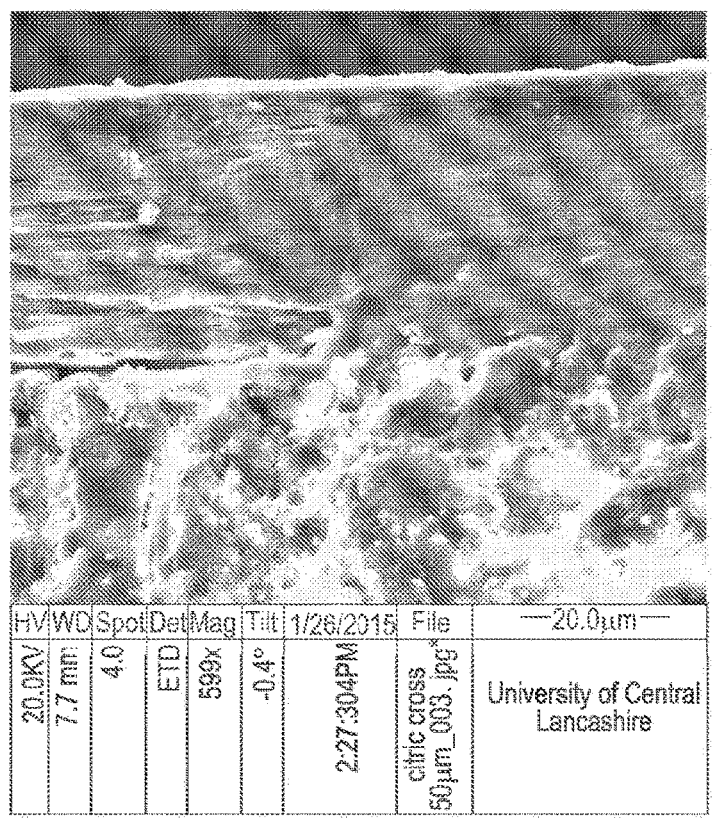
Figure 19:
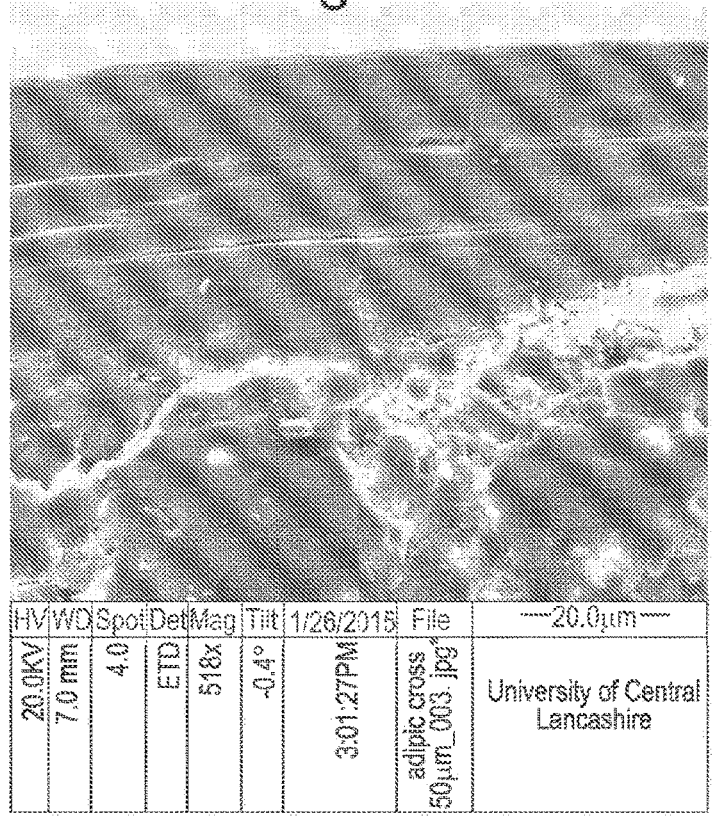
Figure 21:
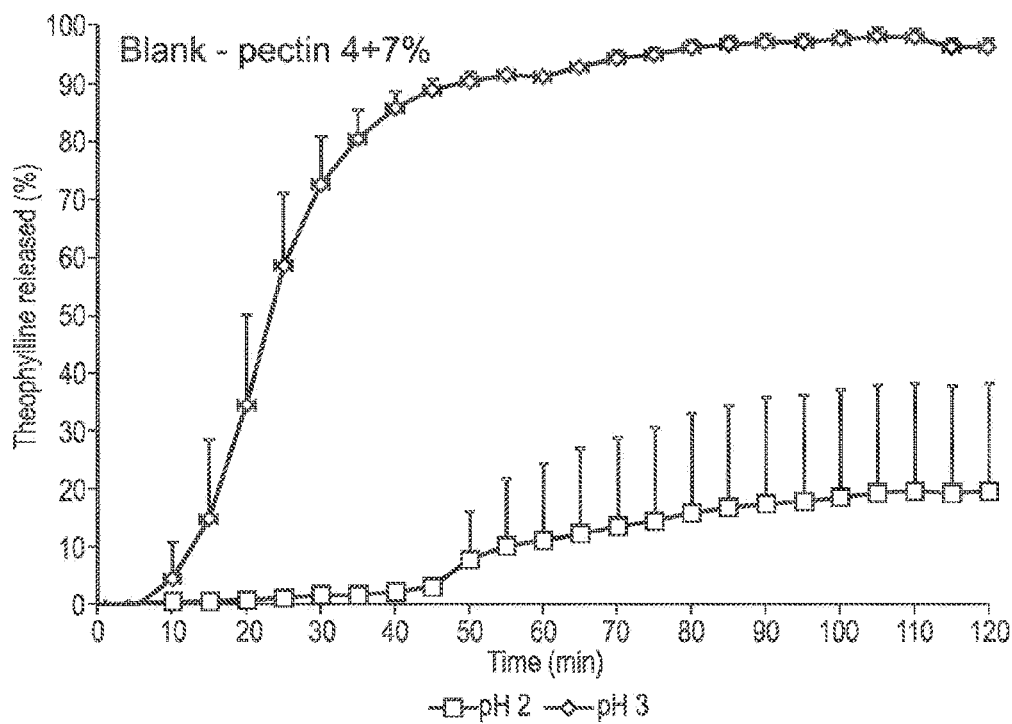
FIG. 21 shows drug release profiles (% of total theophylline released) for solid dosage form F1/blank, as determined by Experimental Test 2, over a 2 hour time period in simulated gastric fluid at pH2 (blue squares), and pH3 (cyan diamonds).
Figure 22:
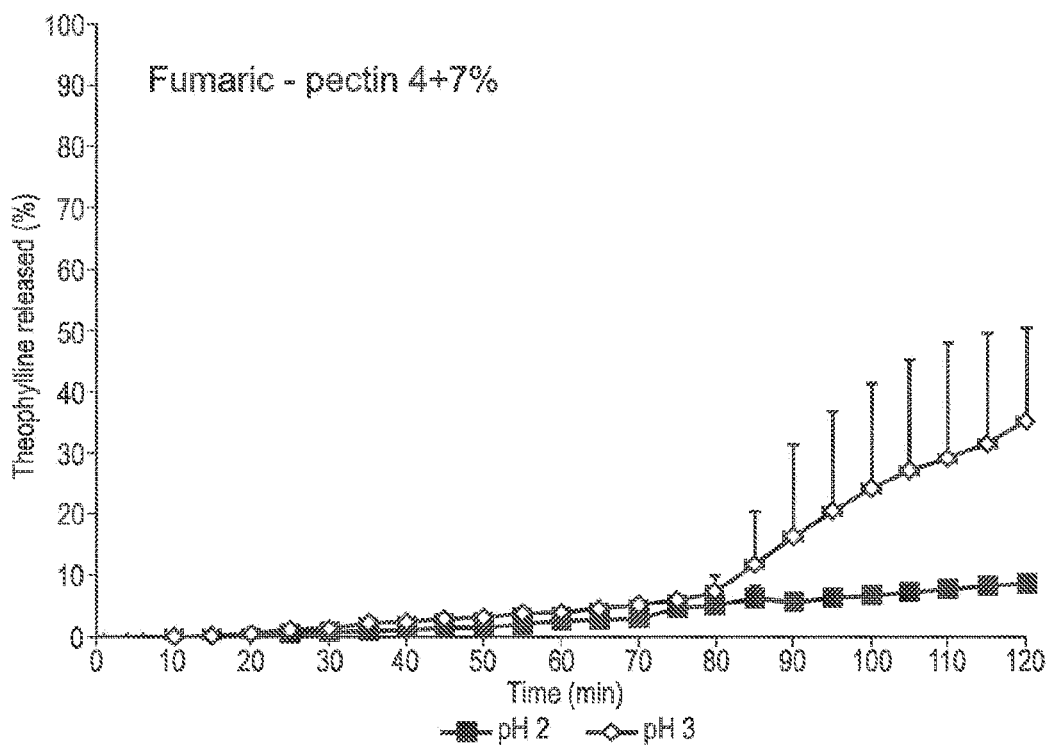
FIG. 22 shows drug release profiles (% of total theophylline released) for solid dosage form F2/fumaric, as determined by Experimental Test 2, over a 2 hour time period in simulated gastric fluid at pH2 (green squares), and pH3 (green diamonds).

Photography Imaging
FIG. 15 shows photographic images of both coated and uncoated tablets (cores), placed in the following order (left to right): uncoated, F1, F2, F3, F4, F5, F6 (labelled as per Table 4).
SEM Imaging
FIGS. 16 to 19 shows SEM images of the coated cores F1-F5.
In Vitro Drug Release—pH Change Dissolution Tests Dissolution or, more correctly, drug release tests are vital in the development, manufacture and quality control of oral dosage forms today. The scrutinized key parameters of pH change in vitro dissolution were: a lag time and an 80% release time in buffer stage. The former specifies the period of time, during which a drug release do not exceed 10% and expresses the absorbance speed of active substance, while the latter indicates the dissolution pace. According to pharmacopeial criteria (UPS 30), within 45 min in a buffer stage a minimum of 80% of drug should be released. The key parameters for evaluated coating formulations are summarised in Table:

tablets F1/blank (blue diamonds), F2/fumaric (green squares), F3/citric (green triangles), F4/sorbic (cyan asterix), F5/adipic (purple cross), F6/alginate only (orange circles).
Disintegration Tests Disintegration tests performed according to the protocol of Experimental Test 3 were conducted for solid dosage forms F1-F4, and F6, with the results presented in Tables 9 and 10.
Acid Uptake Tests Acid uptake tests performed according to the protocol of Experimental Test 4 were conducted for solid dosage forms F1-F4, and F6, with the results presented in Table 10.
Gastric Resistance Properties at Elevated pH—Dissolution Tests Gastric resistance tests were performed according to the protocol of Experimental Test 5 at various pHs for F1-F4, and F6, with a summary of the results presented in Table 10. Further results from Experimental Test 5 are as follows:

FIG. 21 shows drug release profiles (% of total theophylline released) for solid dosage form F1/blank, as determined by Experimental Test 2, over a 2 hour time period in simulated gastric fluid at pH2 (blue squares) and pH3 (cyan diamonds), FIG. 22 shows drug release profiles (% of total theophylline released) for solid dosage form F2/fumaric, as determined by Experimental Test 2, over a 2 hour time period in simulated gastric fluid at pH2 (green squares) and pH3 (green diamonds)

Figure 23:
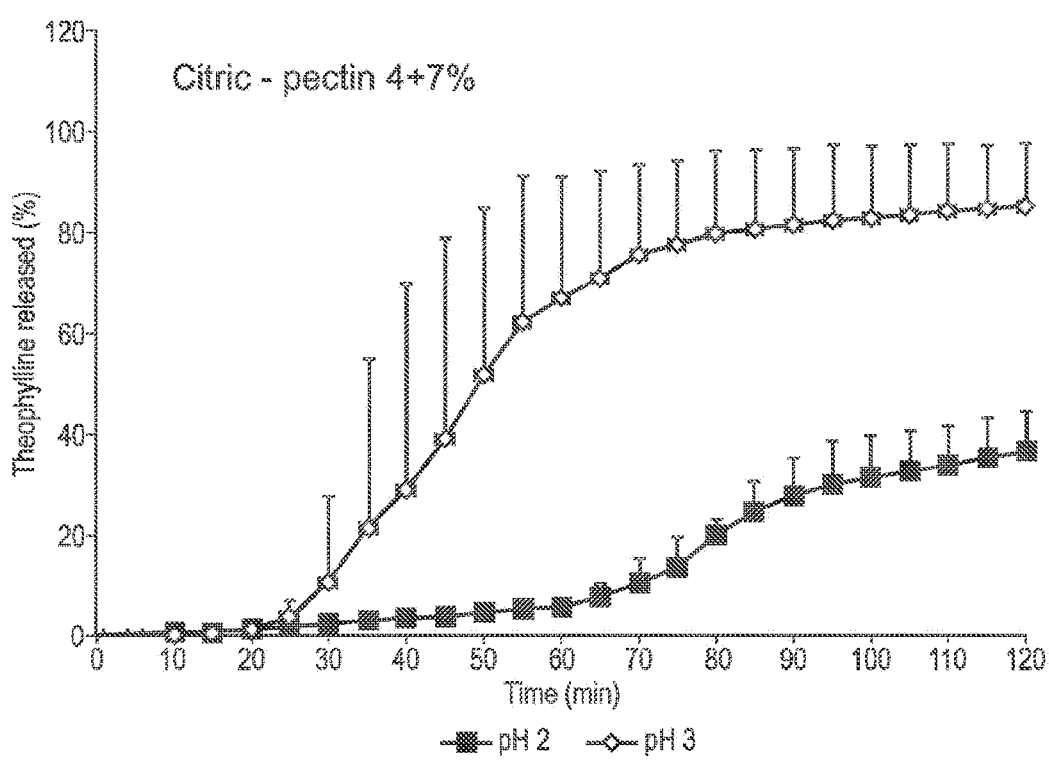
FIG. 23 shows drug release profiles (% of total theophylline released) for solid dosage form F3/citric, as determined by Experimental Test 2, over a 2 hour time period in simulated gastric fluid at pH2 (brown squares), and pH3 (brown diamonds).
Figure 24:
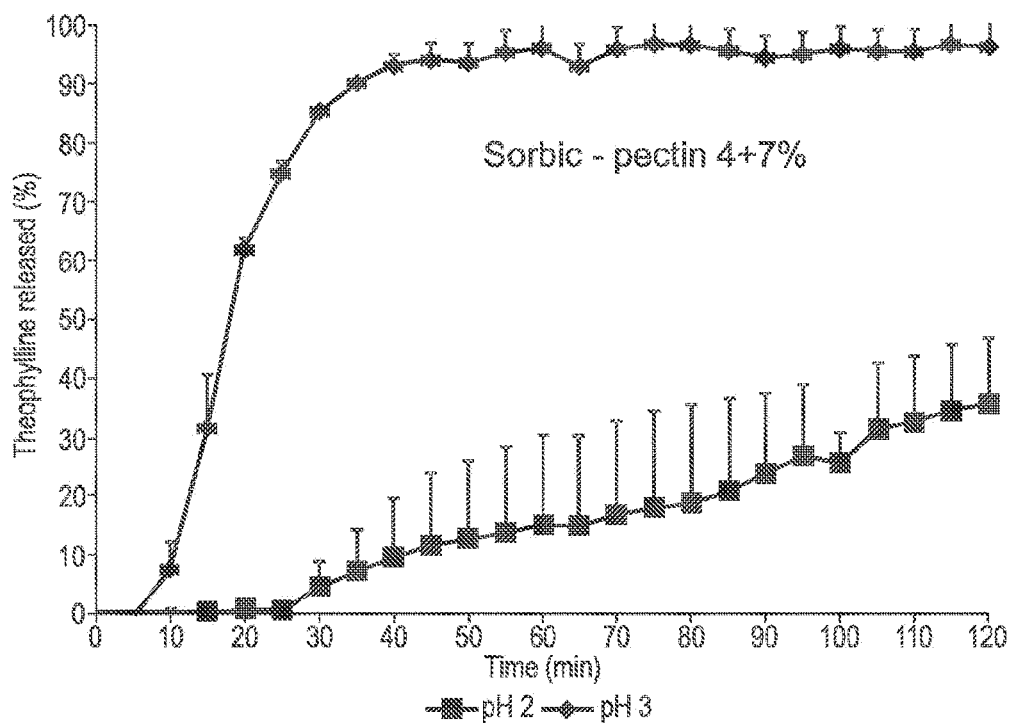
FIG. 24 shows drug release profiles (% of total theophylline released) for solid dosage form F4/sorbic, as determined by Experimental Test 2, over a 2 hour time period in simulated gastric fluid at pH2 (grey squares), and pH3 (grey diamonds).
Figure 25:
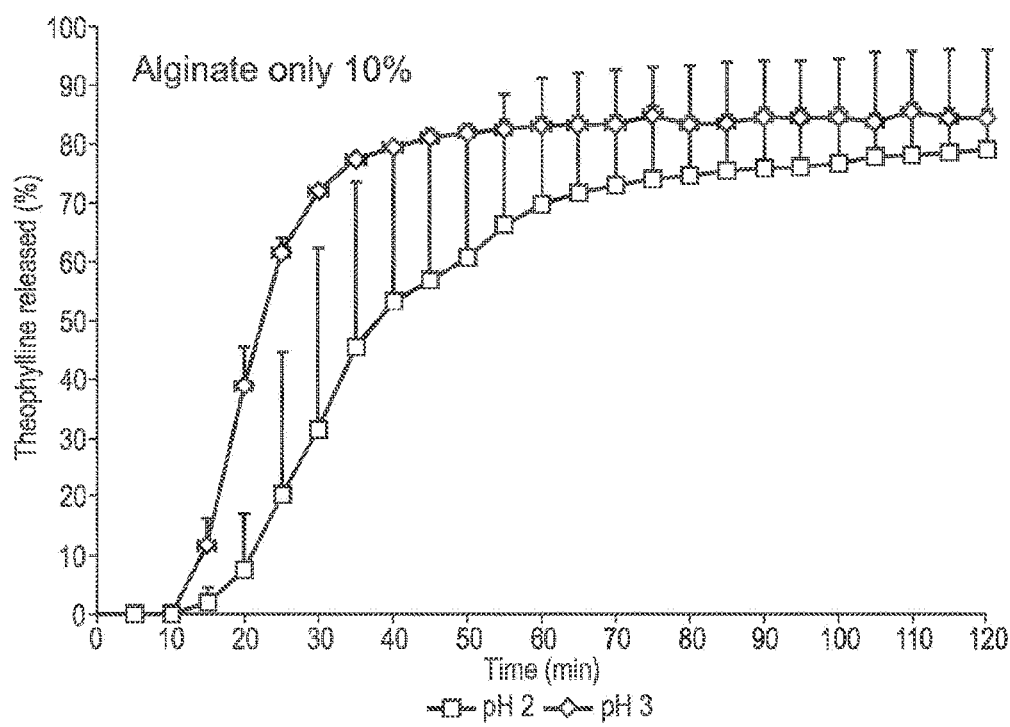
FIG. 25 shows drug release profiles (% of total theophylline released) for solid dosage form F6/alginate only, as determined by Experimental Test 2, over a 2 hour time period in simulated gastric fluid at pH2 (grey squares), and pH3 (grey diamonds).
Figure 26:
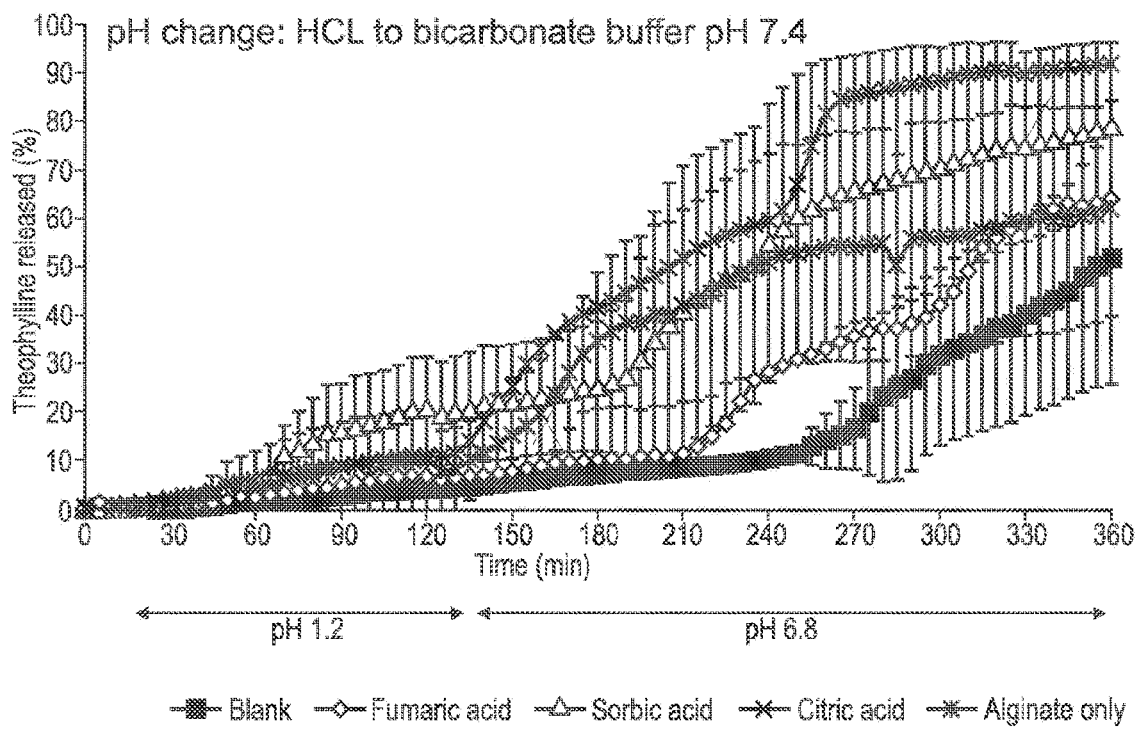
FIG. 26 shows a drug release profile (% of total theophylline released), as determined by Experimental Test 5, over a 2 hour time period in simulated gastric fluid at pH1.2 and then over a further 4 hour time period in simulated small-intestinal fluid at pH 7.4 (this time with Krebs buffer instead of phosphate buffer), for each uncoated and coated tablets F1/blank (blue diamonds), F2/fumaric (green squares), F3/citric (green triangles), F4/sorbic (cyan asterix), and F6/alginate only (orange circles).

FIG. 23 shows drug release profiles (% of total theophylline released) for solid dosage form F3/citric, as determined by Experimental Test 2, over a 2 hour time period in simulated gastric fluid at pH2 (brown squares) and pH3 (brown diamonds), FIG. 24 shows drug release profiles (% of total theophylline released) for solid dosage form F4/sorbic, as determined by Experimental Test 2, over a 2 hour time period in simulated gastric fluid at pH2 (grey squares) and pH3 (grey diamonds), FIG. 25 shows drug release profiles (% of total theophylline released) for solid dosage form F6/alginate only, as determined by Experimental Test 2, over a 2 hour time period in simulated gastric fluid at pH2 (grey squares), pH3 (grey diamonds) Bicarbonate buffer in vitro dissolution tests FIG. 26 shows a drug release profile (% of total theophylline released), as determined by Experimental Test 6, over a 2 hour time period in simulated gastric fluid at pH1.2 and then over a further 4 hour time period in simulated small-

TABLE 8

Key parameters of pH change in vitro dissolution test

| | F1 blank | F2 fumaric | F3 citric | F4 sorbic | F5 adipic | F6 Alg only |
|---|---|---|---|---|---|---|
| Lag time in buffer stage (min) | 10 | 5 | 5 | 10% release exceeded in acid stage (90 min) | 10% release exceeded in acid stage (95 min) | 10% release exceeded in acid stage (55 min) |
| 80% release time in buffer stage (min) | 50 | 85 | 50 | 55 | 135 | 105 |

Figure 20:
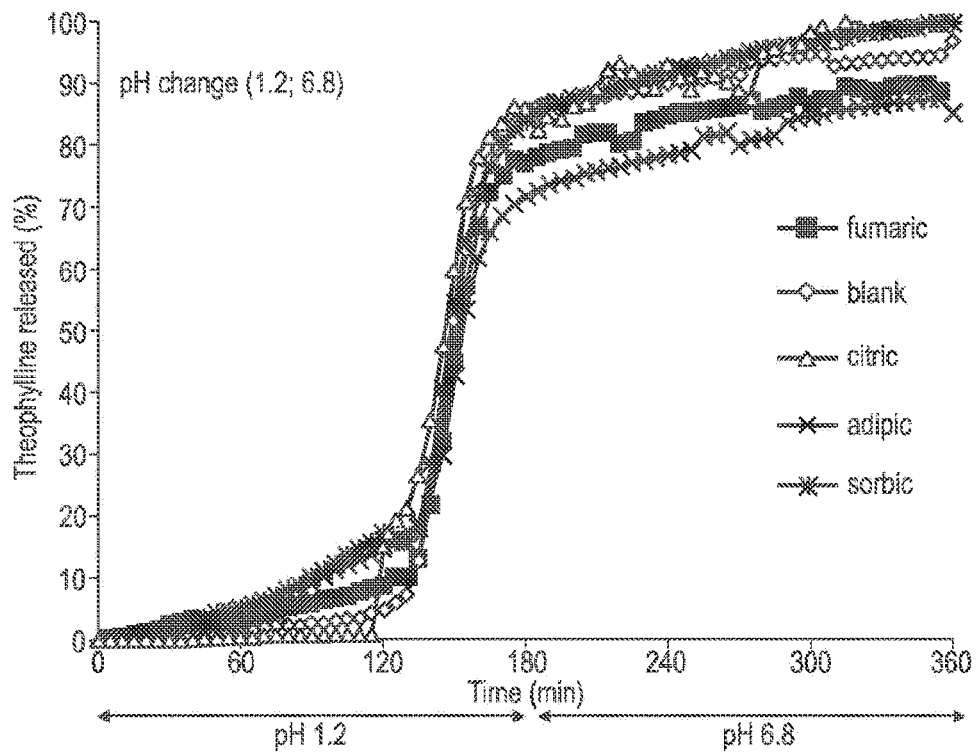
FIG. 20 shows a drug release profile (% of total theophylline released), as determined by Experimental Test 1, over a 2 hour time period in simulated gastric fluid at pH1.2 and then over a further 4 hour time period in simulated small-intestinal fluid at pH 6.8, for each uncoated and coated tablets F1/blank (blue diamonds), F2/fumaric (green squares), F3/citric (green triangles), F4/sorbic (cyan asterix), F5/adipic (purple cross), F6/alginate only (orange circles).

FIG. 20 shows a drug release profile (% of total theophylline released), as determined by Experimental Test 2, over a 2 hour time period in simulated gastric fluid at pH1.2 and then over a further 4 hour time period in simulated small-intestinal fluid at pH 6.8, for each uncoated and coated intestinal fluid at pH 6.8 (this time with Krebs buffer instead of phosphate buffer), for each uncoated and coated tablets F1/blank (blue diamonds), F2/fumaric (green squares), F3/citric (green triangles), F4/sorbic (cyan asterix), and F6/alginate only (orange circles).

Table 9 shows the lag time and 80% release times for each experiment.

TABLE 9

Key parameters of pH change in vitro dissolution test conducted in bicarbonate buffer

| | F1 blank | F2 fumaric | F3 citric | F4 sorbic | F5 adipic | F6 Alg only |
|---|---|---|---|---|---|---|
| Lag time in buffer stage (min) | 100 | 35 | 10% release exceeded in acid stage (115 min) | 10% release exceeded in acid stage (70 min) | — | 10% release exceeded in acid stage (50 min) |
| 80% release time in buffer stage (min) | Not reached | Not reached | 140 | 295 | — | Not reached |

Table 10 shows a summary of all tests conducted to date.

TABLE 10

Summary of conducted tests

| | F1 blank | F2 Fumaric | F3 Citric | F4 Sorbic | F5 Adipic | F6 Alg only |
|---|---|---|---|---|---|---|
| In vitro drug release In phosphate buffer* | | | | | | |
| Lag time in buffer stage (min) | 10 | 5 | 5 | 10% release exceeded in acid stage (90 min) | 10% release exceeded in acid stage (95 min) | 10% release exceeded in acid stage (55 min) |
| 80% release time in buffer stage (min) | 50 | 85 | 50 | 55 | 135 | 105 |
| Disintegration test* | ✓ | ✓ | ✓ | ✓ | — | ✓ |
| Acid resistance | Resisted | Resisted | Resisted | Resisted | — | Resisted |
| Disintegration time of all tablets in SIF (min) | 16 | 17 | 12 | 16 | — | 13 |
| Dissolution test at elevated pH* | | | | | | |
| Drug release time in pH 2 (min) | 60 | Release restrained | 70 | 45 | — | 25 |
| Drug release time in pH 3 (min) | 15 | 85 | 30 | 15 | — | 15 |
| Drug release time in pH 4 (min) | 40 | 35 | 20 | 35 | — | 35 |
| In vitro drug release In bicarbonate buffer* | | | | | | |
| Lag time in buffer stage (min) | 100 | 35 | 10% release exceeded in acid stage (115 min) | 10% release exceeded in acid stage (70 min) | — | 10% release exceeded in acid stage (50 min) |
| 80% release time in buffer stage (min) | Not reached | Not reached | 140 | 295 | — | Not reached |

CONCLUSIONS

The results demonstrate that the coatings of the invention perform well in terms of both gastric resistance and small-intestinal release. The data presented herein supports the principles underlying the invention, and in light of the present disclosure the skilled person is well equipped to reap the benefits of the invention across a wide range of solid dosage forms with various cores, actives, polyuronic acids, stabilising components, and surfactants.

EXAMPLES—SECTION 2

Unless otherwise stated or otherwise inappropriate for a given context, all materials described hereinafter may be the same and/or sourced/formed in the same manner as described in Examples Section 1. The skilled artisan can, without undue burden, access all of the materials described in this section.

Example A—Use of Alginate Salts Beyond Sodium Salts

A mixture of 14 g alginic acid and 8 mL ammonium hydroxide (5N) in 340 mL $H_2O$ was heated at 70° C. To this heated mixture was added a 6 g Pectin. To this heated mixture 8 g glycerylmonostearate (GMS), and 2 g stearic acid, all dissolved in 60 ml ethanol at 60° C. To test the film-forming properties of the resulting coating (film-forming) composition, the composition was used as coating liquid at a rate of 1.2 g/min and applied to theophylline cores (30 g) using a Strea-1 bottom spray fluidised bed coater (GEA Pharma Systems AG, Aeromatic-Fielder, Bubendorf, Switzerland). The inlet temperature 60° C. The fan speed was 3-4 and atomiser pressure is 0.35 Bar.

A decent film was formed without broken edges. This demonstrates the film-forming potential of coating compositions of the invention based on alternative salts of alginic acid (in this case ammonium salts).

Example B—Use of Alginic Acid/Alginate Mixtures

Coated theophylline tablets were prepared by applying a polysaccharide-based coating, as per Example 3 Examples Section 1A, to a theophylline tablet, as per Example 2 of Example Section 1, using the spray-coating methodology described in Example 3 but sodium alginate/pectin mixtures were instead replaced by sodium alginate/alginic acid mixtures of varying ratios.

Figure 27:
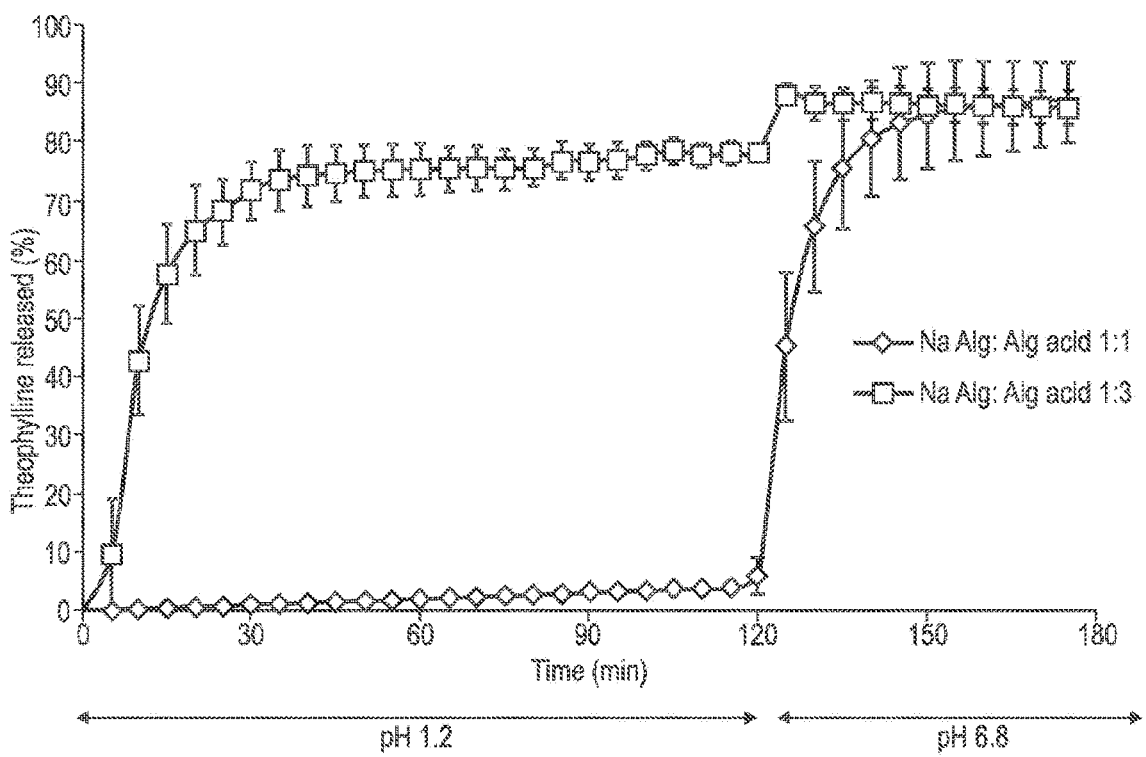
FIG. 27 shows the theophylline release profile (as determined via Experimental Test 2 discussed in Examples Section 1) of two coated tablets, with the diamonds trace corresponding with a 1:1 sodium alginate/alginic acid mixture, and the squares trace with a 1:3 sodium alginate/alginic acid mixture.

FIG. 27 shows the theophylline release profile (as determined via Experimental Test 2 discussed in Examples Section 1) of two such coated tablets, with the diamonds trace corresponding with a 1:1 sodium alginate/alginic acid mixture, and the squares trace with a 1:3 sodium alginate/alginic acid mixture. In this example the 1:1 mixture performed the role of an enteric coating better than the 1:3 example.

These tests underscored the viability of using alginate/alginic acid mixtures as well as alginate or alginic acid individually.

Example C—Use of Sodium Alginate of Differing Viscosities

The Examples presented in Examples Section 1 involve alginate salts which exhibit viscosities of 15-25 cps as a 1 wt % solution in water.

In the following Examples, coated theophylline tablets were prepared by applying a polysaccharide-based coating, as per Example 3 of Examples Section 1, to a theophylline tablet, as per Example 2 of Example Section 1, using the spray-coating methodology described in Example 3 but using higher viscosity grades of sodium alginate.

65 cps Sodium Alginate

A sodium alginate solution was prepared by dissolving 6 g alginic acid sodium salt (65 cps grade) in 250 mL of hot water (at 70° C.) before adding 50 mL ethanol. To this solution was added a solution of 3 g ceresin wax/1 g glycerylmonostearate (GMS) granules dissolved in 100 mL ethanol at 65° C. The resulting coating composition was then used to coat the theophylline tablets of Example 2 of Examples Section 1, by spray coating tablets at a rate of 3 mL/min at an inlet temperature of 55° C. The tablets were cooled to 5° C. for 30 minutes before performing dissolution tests.

Figure 28:
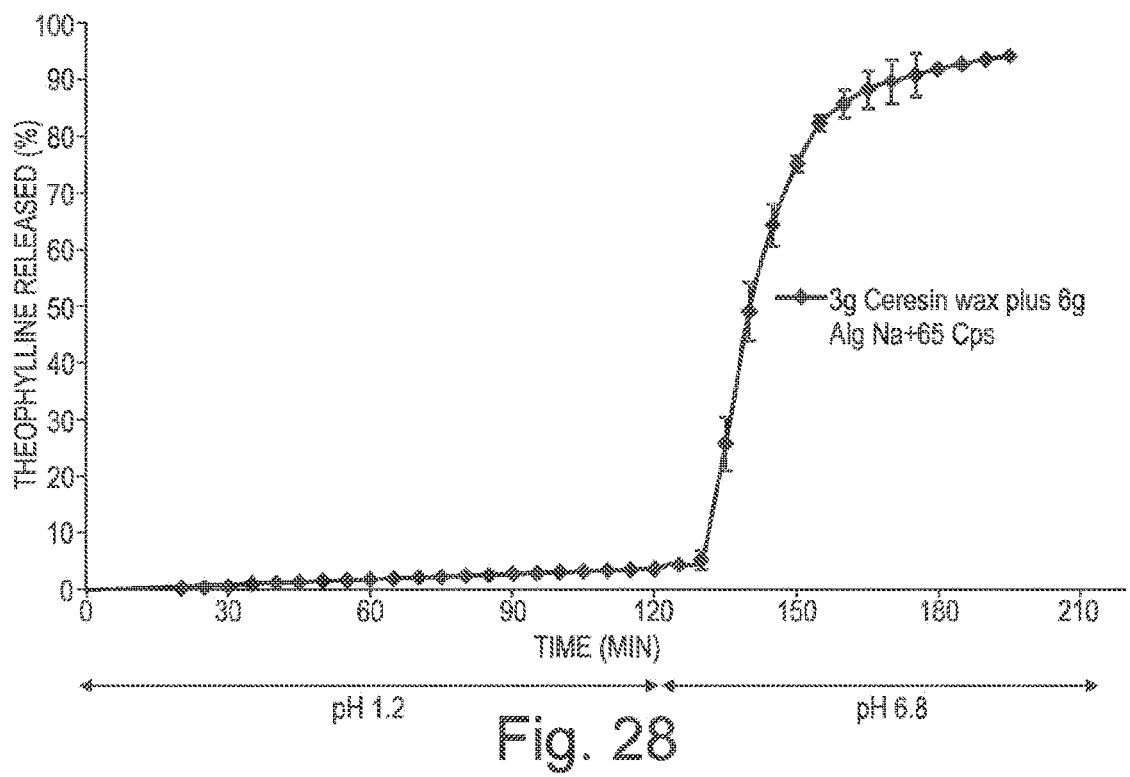
FIG. 28 shows the results of dissolution tests, the theophylline release profile (as determined by Experimental Test 2 of Examples Section 1) for higher viscosity grades of sodium alginate.

FIG. 28 shows the results of dissolution tests, the theophylline release profile (as determined by Experimental Test 2 of Examples Section 1), and clearly higher viscosity grades of sodium alginate serve to delay release of the active within the coated tablet core.

Medium Viscosity Alginic Acid Sodium Salt Trial:

A sodium alginate solution was prepared by dissolving 5 g alginic acid sodium salt (>2000 Cps as 2% aqueous solution) in 250 mL of hot water (at 75° C.) before adding 50 mL ethanol and further homogenising. To this solution was added a solution of 3 g ceresin wax/1 g glycerylmonostearate (GMS) granules dissolved in 100 mL ethanol at 65° C. The total volume of the combination was 400 mL. The resulting coating composition was then used to coat the theophylline tablets of Example 2 of Examples Section 1, by spray coating tablets used as coating liquid at a rate of 3 mL/min and applied to theophylline cores (30 g) using a Strea-1 bottom spray fluidised bed coater (GEA Pharma Systems AG, Aeromatic-Fielder, Bubendorf, Switzerland). The inlet temperature 55° C. The fan speed was 3-4 and atomiser pressure is 0.35 Bar.

The tablets were cooled to 5° C. for 30 minutes before performing dissolution tests.

Example D—Use of Alternative Poly-Saccharides

Further coated tablets were formed (using methods described in Example C) using coating compositions containing alternative polysaccharides, for example:

- Lignin-based: A solution containing 4 g Lignin alkali, 2 ml ammonia solution (5N), and 340 mL water mixed with a solution containing 4 g alginate sodium salt, 0.5 g GMS, and 60 ml ethanol.
- Alpha-cellulose ($\alpha$-cellulose)1: A solution containing 4 g alpha cellulose in 340 mL water mixed with a solution containing 4 g alginate sodium salt and 0.5 g GMS in 60 ml ethanol.
- Alpha-cellulose ($\alpha$-cellulose)$_2$: A solution containing 1.5 g alpha cellulose in 250 mL water mixed with a solution containing 4.5 g alginate sodium salt in 50 ml ethanol, further mixed with a solution containing 1 g GMS and 2 g white bees wax in 100 mL ethanol.
- Alpha-cellulose ($\alpha$-cellulose)3: A solution containing 2.0 alpha cellulose in 340 mL water mixed with a solution containing 6.0 g alginate sodium salt and 1 g GMS in 60 mL ethanol. The formulation was coated following the parameters in Example 3, Examples Section 1.

All tablets remain intact after 2 hours in acid medium as per disintergration test (Experimental Test 3, Example section 1).

Example E—Use of Alternative Lipophilic Components

A variety of alternative coatings and coating compositions were produced using various surfactants (or hydrophobic plasticizers), including glyceryl monostearate (different grades with varying amounts of distearate, tristearate, and caprylate salts), glyceryl caprylate, stearic acid, palmitic acid, and glyceryl tristearate.

Theophylline tablets were prepared as per Example 2 of Examples Section 1 before then being coated (using similar spray-coating methods as per Example 3 (Fs4)) with a polysaccharide-based coating based on a modification of those of Example 3 (Fs4), containing a 1:16 ratio of [hydrophobic material—e.g. GMS, stearic acid, palmitic acid] to polysaccharides (85:15 alginate/pectin).

For example, a range of coated tablets were prepared using modified versions of the coating composition of Experiment Section 1, Example 3 (Fs4) by replacing the GMS with various other grades of GMS, stearic acid or palmitic acid whilst maintaining a ratio of 1:16 hydrophobic material to polysaccharides.

Figure 29:
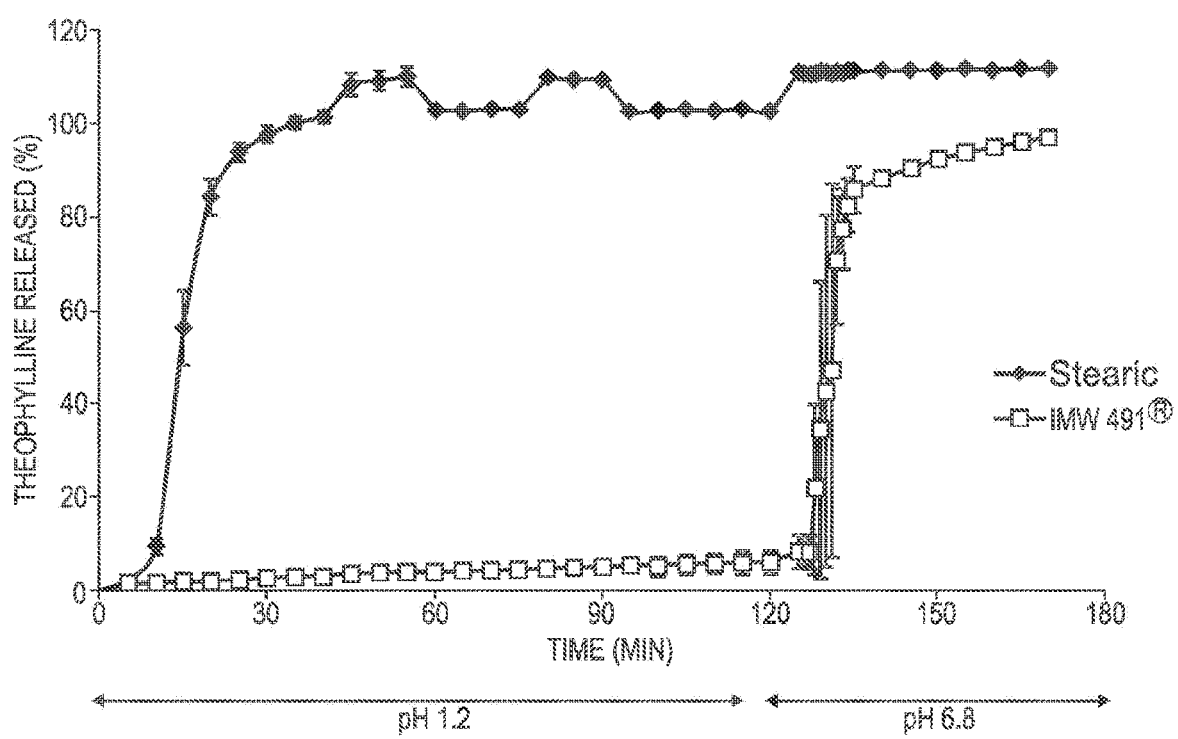
FIG. 29 shows the theophylline release profile (ascertained via Experimental Test 2 of Examples Section 1) for two different hydrophobic coatings: stearic acid (diamonds) and Imwitor IMW 491 grade of GMS (squares).

FIG. 29 shows the theophylline release profile) for two different hydrophobic coatings: stearic acid (diamonds) and Imwitor IMW 491 grade of GMS (squares) using Experimental Test 2.

Figure 30:
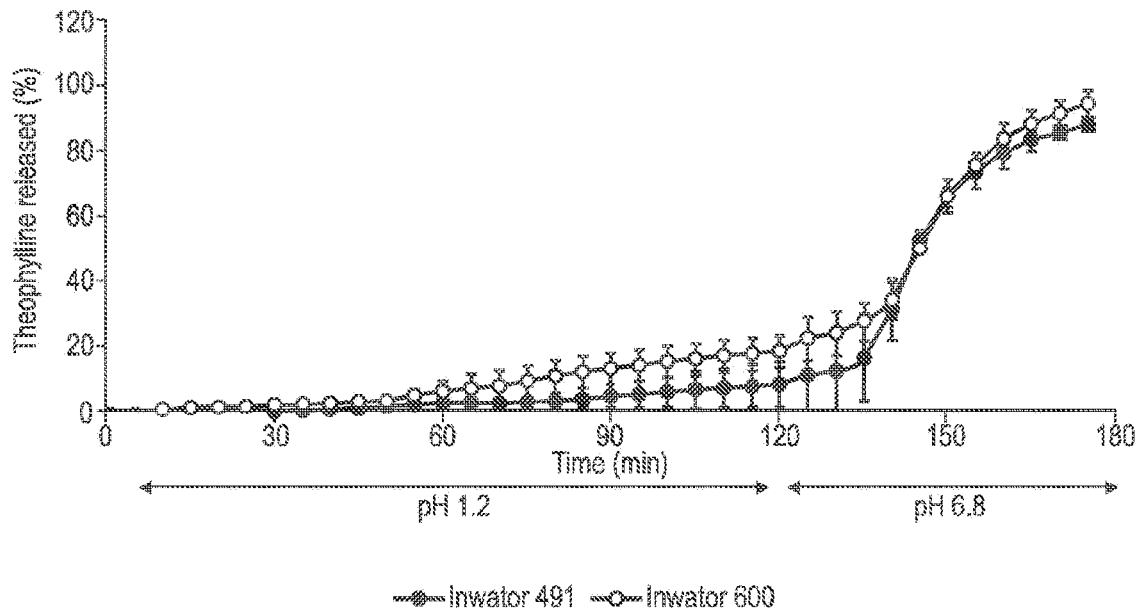
FIG. 30 shows the theophylline release profile (ascertained via Experimental Test 2 of Examples Section 1) for coatings incorporating two different grades of GMS: IMW 491 (squares) and IMW 600 (circles).

FIG. 30 shows the theophylline release profile (ascertained via Experimental Test 2 of Examples Section 1) for coatings incorporating two different grades of GMS: Imwitor 491 (squares) and Imwitor 600 (circles) Experimental Test 2.

Clearly different grades of GMS still perform their role well.

Figure 31:
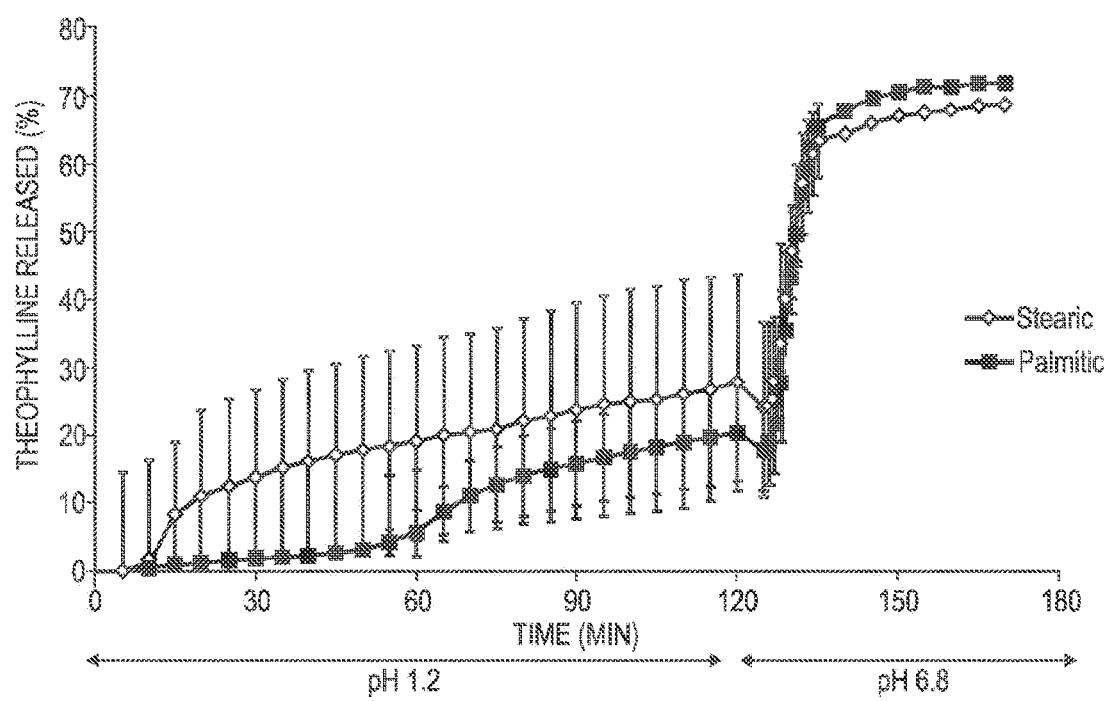
FIG. 31 shows the theophylline release profile (ascertained via Experimental Test 2 of Examples Section 1) for two different hydrophobic coatings: stearic acid (diamonds) and palmitic acid (squares).

FIG. 31 shows the theophylline release profile (ascertained via Experimental Test 2 of Examples Section 1) for two different hydrophobic coatings prepared via Experimental test 2 stearic acid (diamonds) and palmitic acid (squares).

Clearly other hydrophobic materials are also viable whether in place of or in combination with GMS3 by replacing pectin with a variety of gums (gum rosin, locust bean gum) and waxes (ceresin wax) in place of the pectin present in Example 3 in a single coating layer.

The following example coating compositions were used to form the coated-tablets to be tested:

Gum rosin composition 1: a composition formed by mixing a solution of 1.2 g gum rosin, 0.5 g GMS in 100 mL absolute ethanol with a solution of 6.8 g sodium alginate in 300 mL water was spray-coated upon theophylline tablets (e.g. those of Example 2) with homogenization at flow rate 1.1 g/min to achieve 7% weight gain in the tablets.

Locust bean gum composition 1: a composition formed by mixing a solution of 2 g locust bean gum and 6 g sodium alginate in 340 ml water with a solution of 0.5 g GMS in 60 mL absolute ethanol was spray-coated upon theophylline tablets (e.g. those of Example 2) with homogenization at flow rate 1.1 g/min to achieve 7% weight gain in the tablets.

Gum rosin composition 2: a composition formed by mixing a solution of 2 g rosin gum and 0.5 g GMS in 100 mL absolute ethanol with a solution of 6.0 g sodium alginate in 300 ml water was spray-coated upon theophylline tablets (e.g. those of Example 2) with homogenization at flow rate 1.1 g/min to achieve 7% weight gain in the tablets.

Ceresin wax composition: a composition formed by mixing a solution of 2 g ceresin wax and 0.5 g GMS in 100 mL absolute ethanol with a solution of 6.0 g sodium alginate in 300 mL water was spray-coated upon theophylline tablets (e.g. those of Example 2) with homogenization at flow rate 1.1 g/min to achieve 7% weight gain in the tablets.

Figure 32:
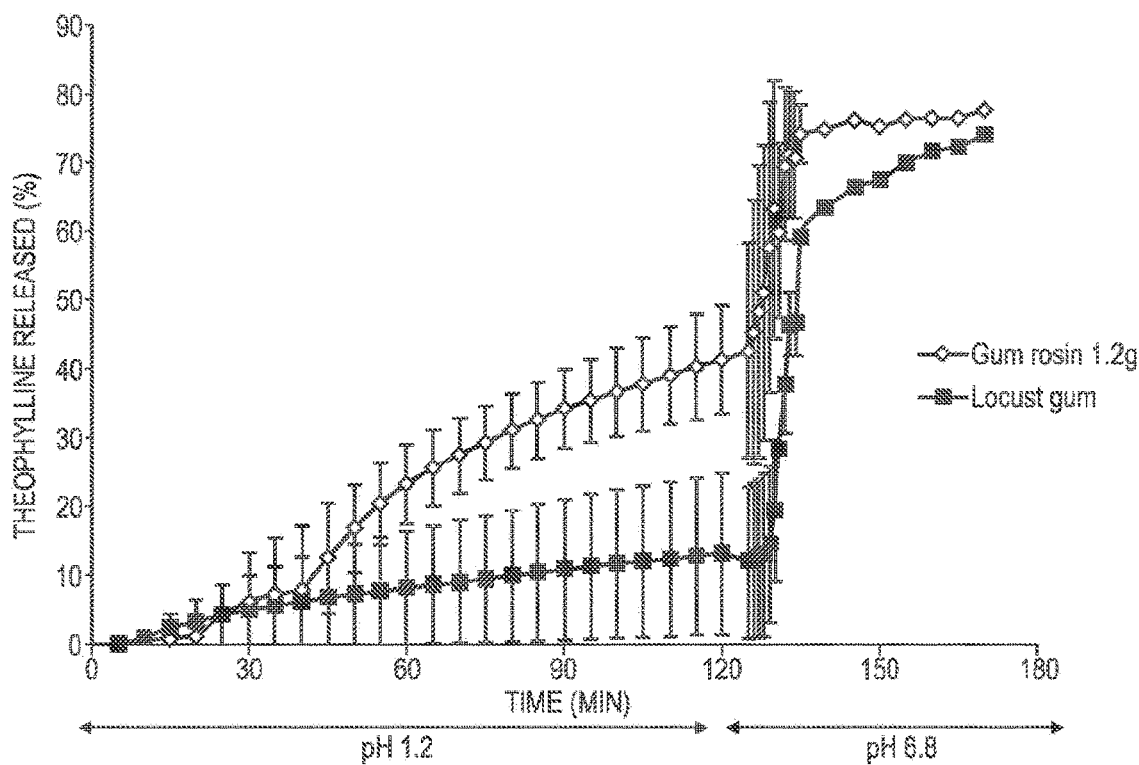
FIG. 32 shows a theophylline release profile for tablets coated with compositions containing 1.2 g gum rosin (diamonds) and locust bean gum (squares).
Figure 33:
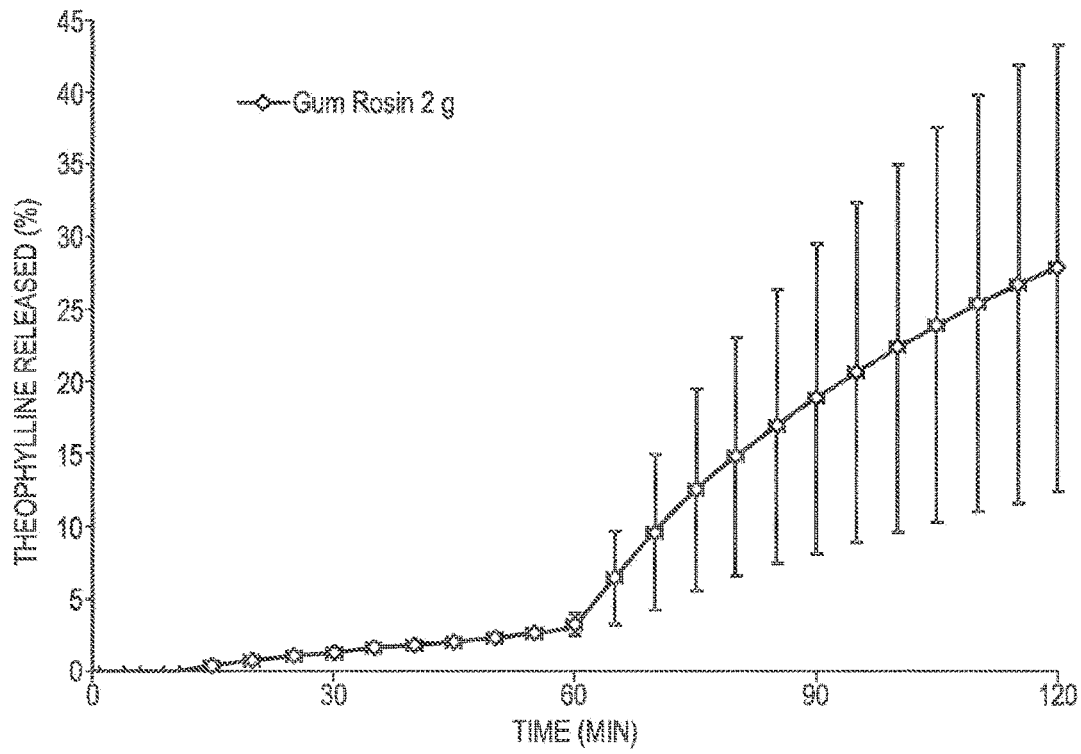
FIG. 33 shows a theophylline release profile for tablets coated with compositions containing 2 g gum rosin (diamonds).
Figure 34:
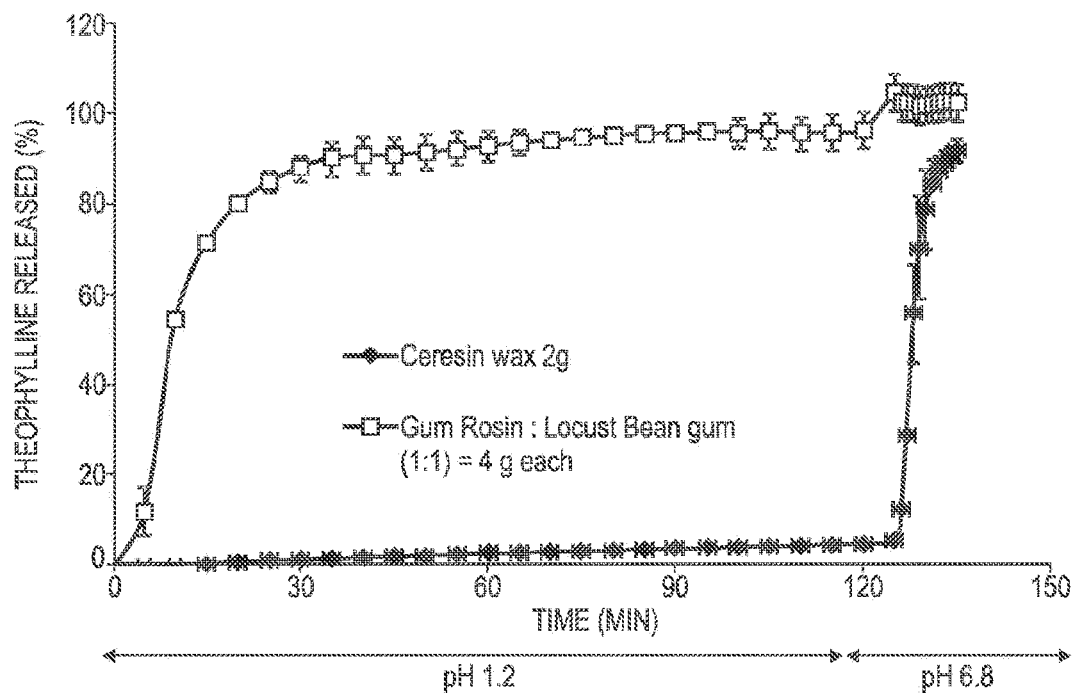
FIG. 34 shows a theophylline release profile for tablets coated with compositions containing 2 g ceresin wax (diamonds) and 1:1 gum rosin:locust bean gum (4 g each) (squares).

Locust bean gum composition 2: a composition formed by mixing a solution of 2 g locust bean gum and 6 g sodium alginate in 340 ml water with a solution of 0.5 g GMS in 60 mL absolute ethanol was spray-coated upon theophylline tablets (e.g. those of Example 2) with homogenization at flow rate 1.1 g/min to achieve 7% weight gain in the tablets Tablets prepared using the aforementioned coating compositions were subject to dissolution tests according to Experimental Test 2 of Examples Section 1 to give theophylline release profiles shown in FIGS. 32, 33, and 34.

FIG. 32 shows a theophylline release profile for tablets coated with compositions containing 1.2 g gum rosin (diamonds) and locust gum (squares).

FIG. 33 shows a theophylline release profile for tablets coated with compositions containing 2 g gum rosin (diamonds).

FIG. 34 shows a theophylline release profile for tablets coated with compositions containing 2 g ceresin wax (diamonds) and 1:1 gum rosin:locust bean gum (4 g each) (squares).

The tablet coated with ceresin wax composition performed extremely well, remaining unopened throughout 2 hours in 0.1N HCL, whilst opening within only 5 minutes after PH6.8 change (i.e. simulating the pH of the small intestine).

Example G—Use of Further Lipophilic Components

Various alternative polysaccharide-based coating compositions were prepared, containing sodium alginate, a first lipophilic component (in this case the surfactant, GMS), and a further lipophilic component (generally a wax or other hydrophobic material). A number of different ratios of sodium alginate:wax:GMS (4:4:1), (5:3:1), (5.5:2.5:1), (6:2:1) were tested.

and results are shown here for compositions based on the following general formula:

5 g sodium alginate 1 g GMS 3 g further lipophilic component (e.g. a wax)

Water-ethanol mixture.

Coating Contains Ceresin Wax

A coating composition was prepared by mixing a solution containing 3 g Ceresin wax and 1 g GMS in 100 mL ethanol at 65° C. with a solution formed by dissolving 5 g alginic acid sodium salt in 250 mL of hot water at 70° C. and adding 50 ml of ethanol.

Theophylline tablets of Example 2 were then spray coated with the coating composition at a rate of 1.5 ml/min at an inlet temperature of 55° C.

Figure 35:
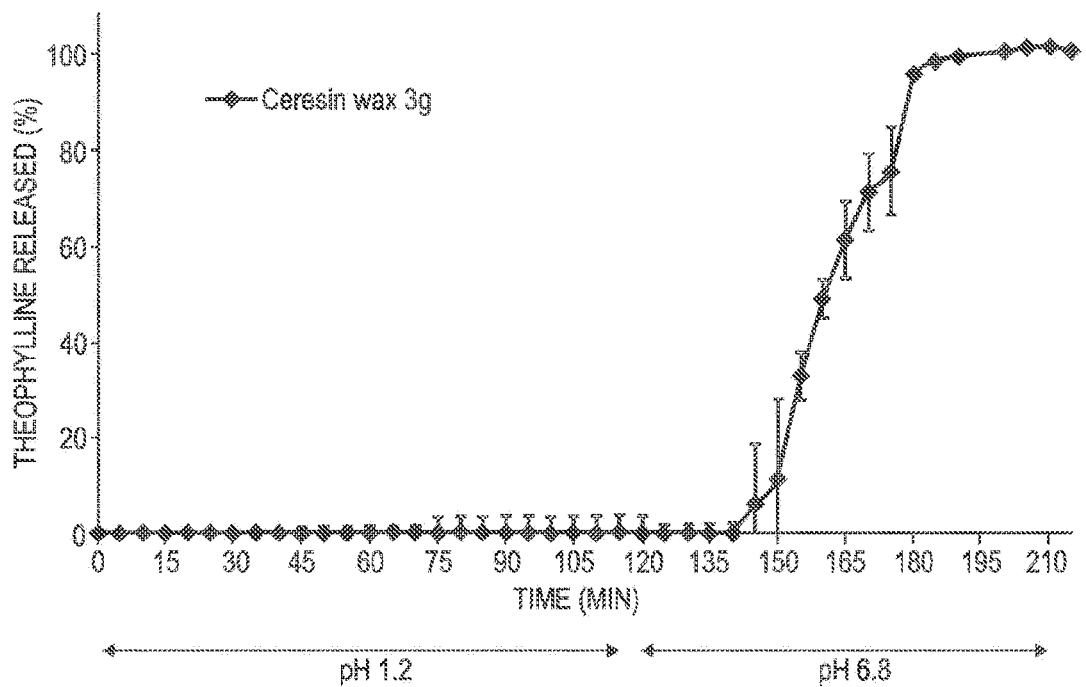
FIG. 35 shows a theophylline release profile (acquired using the protocols of Experimental Test 2) of a coated tablet.

FIG. 35 shows a theophylline release profile (acquired using the protocols of Experimental Test 2) of the resulting coated tablets.

It was noted that:

Release % for 2 hours in 0.1 M HCl is 0%

Release in 6.8 phosphate buffer was 61.2% after 45 minutes, 78% after 2 hours 55 minutes, and 88% was achieved after 3 hours Coating Contains White Beeswax and/or Over-Coated with 3.5 g White Beeswax A coating composition was prepared by mixing a solution containing 3 g white beeswax and 1 g GMS in 100 mL ethanol at 65° C. with a solution formed by dissolving 5 g alginic acid sodium salt in 250 mL hot water at 70° C. and adding 50 ml of ethanol. The total volume of the combination was 400 mL.

Figure 36:
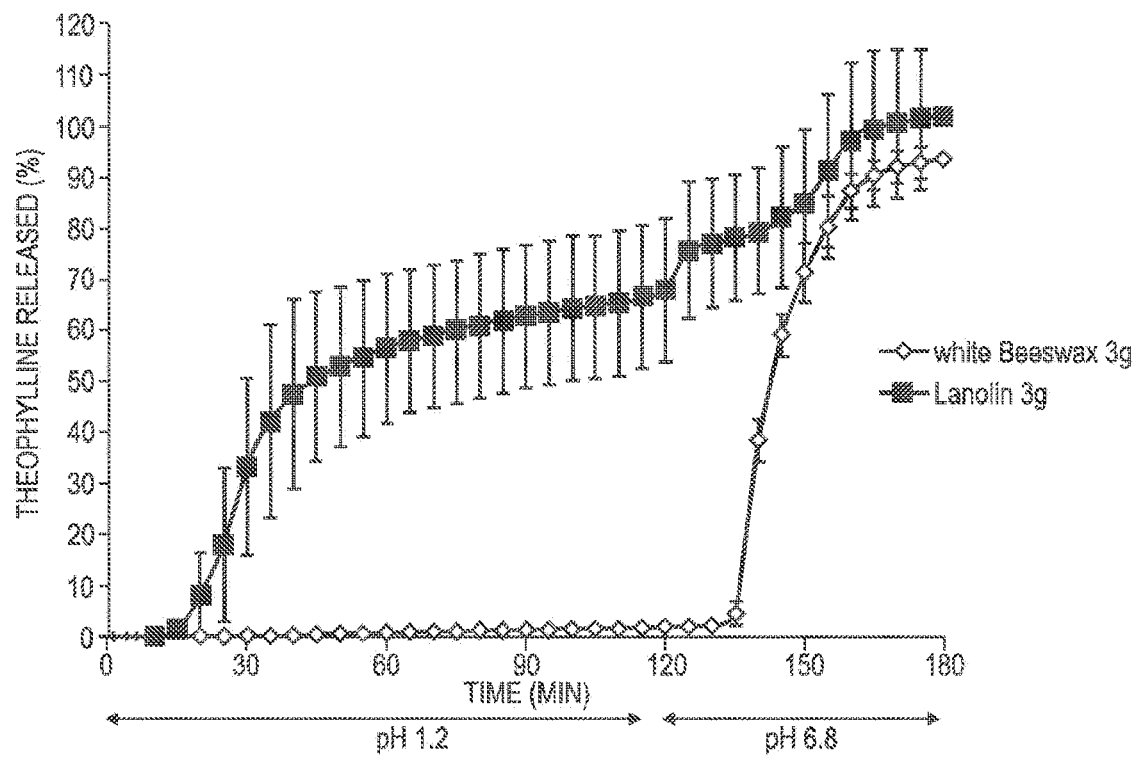
FIG. 36 shows a theophylline release profile (acquired using the protocols of Experimental Test 2) of coated tablets: white bees wax 3 g (diamonds), lanolin 3 g (squares).

Theophylline tablets of Example 2 were then spray coated with the coating composition at a rate of 3 mL/min at an inlet temperature of 55° C. FIG. 36 FIG. 36 shows a theophylline release profile (acquired using the protocols of Experimental Test 2) of the resulting coated tablets: white bees wax 3 g (diamonds), After being cooled at 5° C. for 30 minutes the tablet was over-coated with 3.5 g white beeswax using a composition prepared as above, but without any alginic acid sodium salt.

Coating Contains Lanolin (Wool Fat)

A coating prepared by mixing a solution containing Lanolin and 1 g GMS in 100 mL ethanol at 65° C. with a solution formed by dissolving 5 g alginic acid sodium salt in 250 mL hot water at 70° C. and adding 50 mL of ethanol.

Theophylline tablets of Example 2 were then spray coated with one or other of the coating compositions at a rate of 3 mL/min at an inlet temperature of 55° C. Tablets were cooled at 5° C. for 30 minutes before dissolution testing.

FIG. 36 shows a theophylline release profile (acquired using the protocols of Experimental Test 2) of the resulting coated tablets lanolin 3 g (squares).

Acid uptake tests n=3 showed about 10.5% uptake for 3 g Beeswax. For bees wax, theophylline release was approximately 1.88% after 2 hours in 0.1 M HCl, whilst release of 90.6% was noted after 45 minutes in 6.8 phosphate buffer.

Coating Contains Yellow Beeswax 3 g Cured at 40° C. Versus Chilled at 4° C.

A coating composition was prepared by mixing a solution containing 3 g yellow beeswax and 1 g GMS in 100 ml ethanol at 65° C. with a solution formed by dissolving 5 g alginic acid sodium salt in 250 mL of hot water at 70° C. and adding 50 ml of ethanol.

Theophylline tablets of Example 2 were then spray coated with the coating composition at a rate of 3 ml/min at an inlet temperature of 55° C. Tablets were either cooled at 4° C. for overnight or cured overnight (18 hours) at 40° C. before dissolution test.

Figure 37:
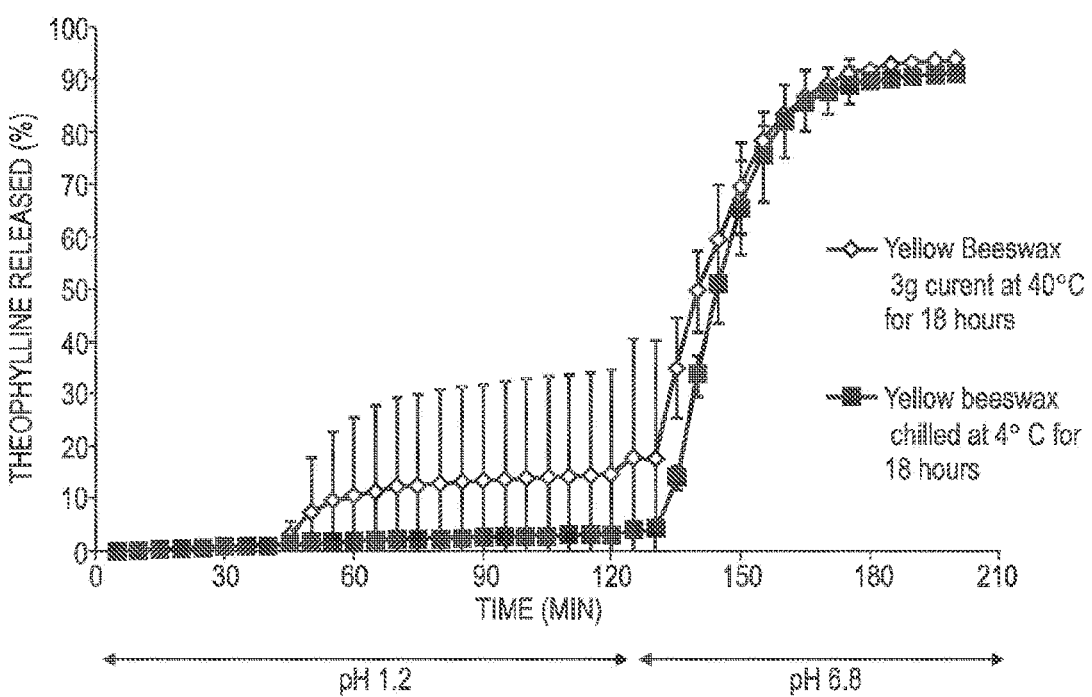
FIG. 37 shows a theophylline release profile (acquired using the protocols of Experimental Test 2) of coated tablets: yellow beeswax 3 g cured (diamonds), yellow beeswax 3 g cooled (squares).

FIG. 37 shows a theophylline release profile (acquired using the protocols of Experimental Test 2) of the resulting coated tablets: yellow beeswax 3 g cured (diamonds), yellow beeswax 3 g cooled (squares).

For the chilled tablets, theophylline release was approximately 3.25% after 2 hours in 0.1 M HCl, and release was about 85% after 45 minutes in 6.8 phosphate buffer.

Chilling appears to improve acid protection.

Coating Contains n-Hexadecyl Palmitate 3 g Cured at 40° C. & Chilled at 4° C.

A coating composition was prepared by mixing a solution containing 3 g n-hexadecyl palmitate and 1 g GMS in 100 ml ethanol at 65° C. with a solution formed by dissolving 5 g alginic acid sodium salt in 250 mL of hot water at 70° C. and adding 50 ml of ethanol.

Theophylline tablets of Example 2 were then spray coated with the coating composition at a rate of 3 mL/min at an inlet temperature of 55° C. Tablets were cured 2 hours at 40° C. then cooled at 4° C. for overnight before dissolution testing.

Figure 38:
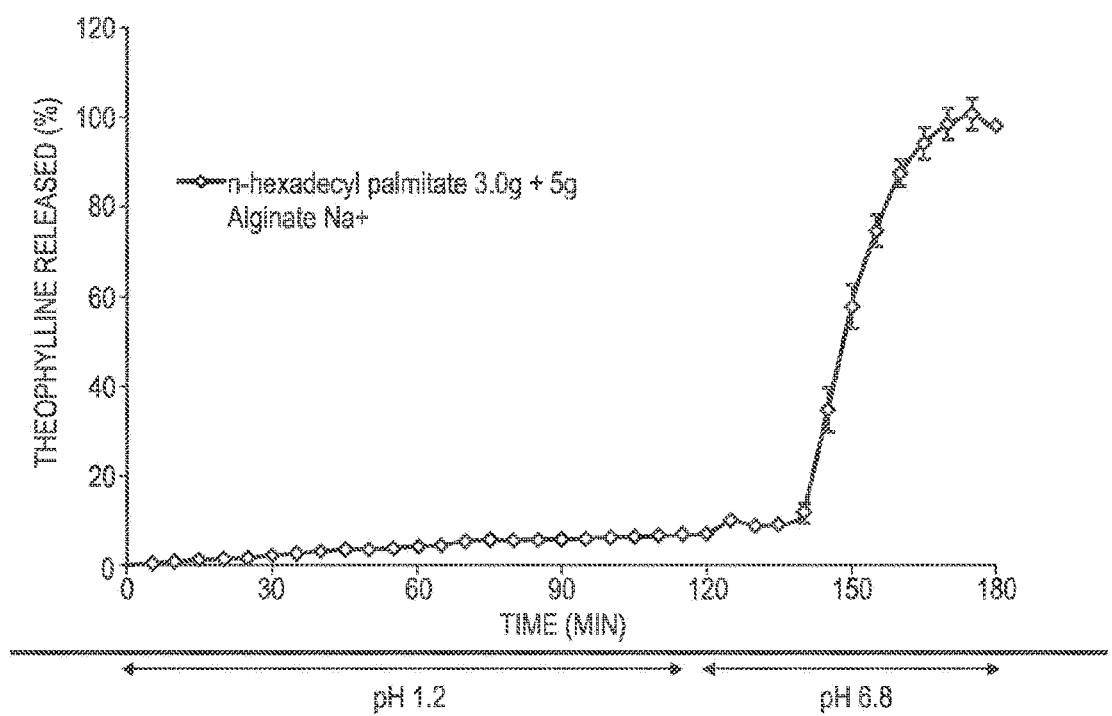
FIG. 38 shows a theophylline release profile (acquired using the protocols of Experimental Test 2) of coated tablets.

FIG. 38 shows a theophylline release profile (acquired using the protocols of Experimental Test 2) of the resulting coated tablets.

It was noted that the theophylline release percentage after 2 hours in 0.1 M HCL was 7.5%, whilst release after 45 minutes in buffer pH6.8 was 94.2%.

Coating Contains Ceresin Wax Trials 3 g with Bulking Agent (Talc 4 g)

A coating composition was prepared by mixing a solution containing 3 g Ceresin wax and 1 g GMS in 100 mL ethanol at 65° C. with a solution formed by dissolving 5 g alginic acid sodium salt in 250 mL of hot water at 70° C. and adding 50 ml of ethanol. 4 g Talc was added to final solution and homogenized for 10 minutes.

Theophylline tablets of Example 2 were then spray coated with the coating composition at a rate of 2 mL/min at an inlet temperature of 55° C. It was noted that the theophylline release percentage after 2 hours in 0.1 M HCL was 3.2%, whilst release after 45 minutes in buffer PH6.8 was 85.9%.

It was noted that adding talc improved the appearance and building up of coating.

Example H—pH-Regulating Outer/Inner Layer

In Examples Section 1, some examples were provided of the use of an organic-acid-containing subcoat (inner coating). An example is now provided with an organic-acid-containing layer as an over-coat or sub-coat for the polysaccharide-based coating (alginate+ wax+ GMS).

Theophylline tablets were prepared as per Example 2 of Examples Section 1 before then being coated (using similar spray-coating methods as per Example G) with a basic polysaccharide-based coating (that of Example G) containing a Sodium alginate:cerisin wax:GMS at ratio 5:3:1. Tablets formed in this manner were either coated before (sub-coat) or after (over-coat) with the following aqueous coating composition (at 4% wt gain):

Fumaric acid 2.5% w/v

Pectin 2% w/v

Figure 40:
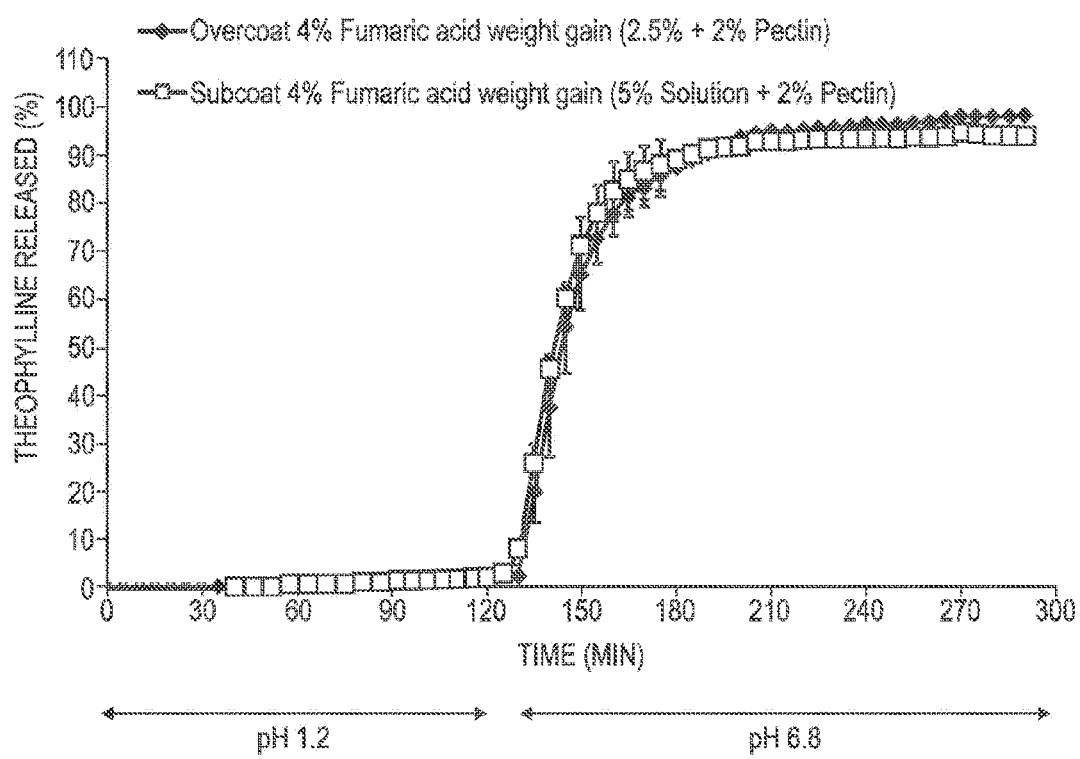
FIG. 40 shows theophylline release profile (acquired using the protocols of Experimental Test 2) of an example with an acid-regulating overcoat (diamonds) and an acid-regulating undercoat (squares).

Acid uptake of 1 hour in 0.1 M HCl was 6.08% and =6.6% for over-coat Sub-coat respectively, FIG. 40 shows that the pH responsive behaviour of this coating system was not affected by adding over- or under coat.

Figure 39:
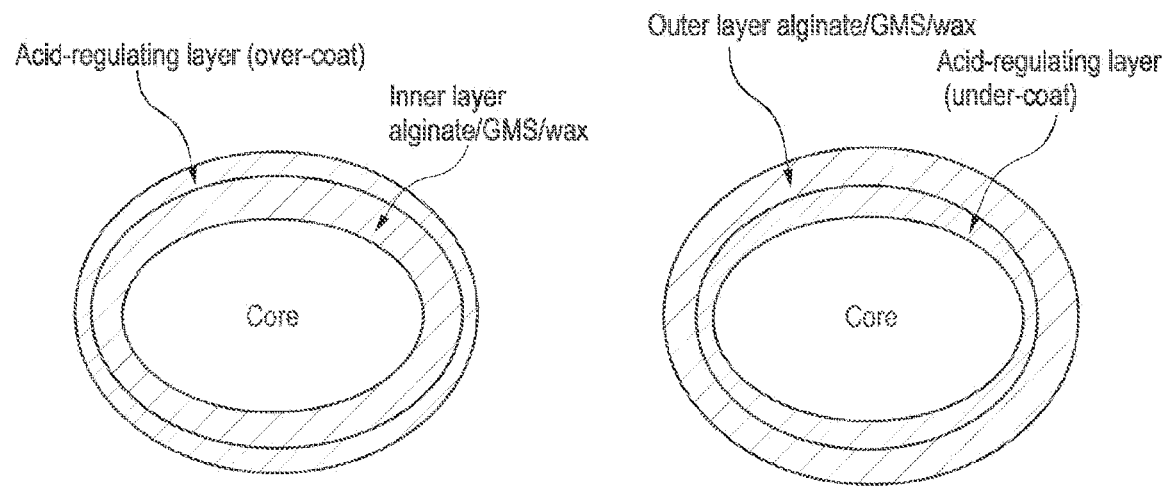
FIG. 39 shows 2 different multi-layered configurations, one (left-hand side) where the acid-regulating layer is an overcoat overlying an alginate/GMS/wax inner layer, and another (right-hand side) where the acid-regulating layer is an undercoat underlying the same alginate/GMS/wax inner layer.

FIG. 39 shows 2 different multi-layered configurations, one (left-hand side) where the acid-regulating layer is an overcoat overlying an alginate/GMS/wax inner layer, and another (right-hand side) where the acid-regulating layer is an undercoat underlying the same alginate/GMS/wax inner layer.

FIG. 40 shows theophylline release profile (acquired using the protocols of Experimental Test 2) of an example with an acid-regulating overcoat (diamonds) and an acid-regulating undercoat (squares).

Figure 41:
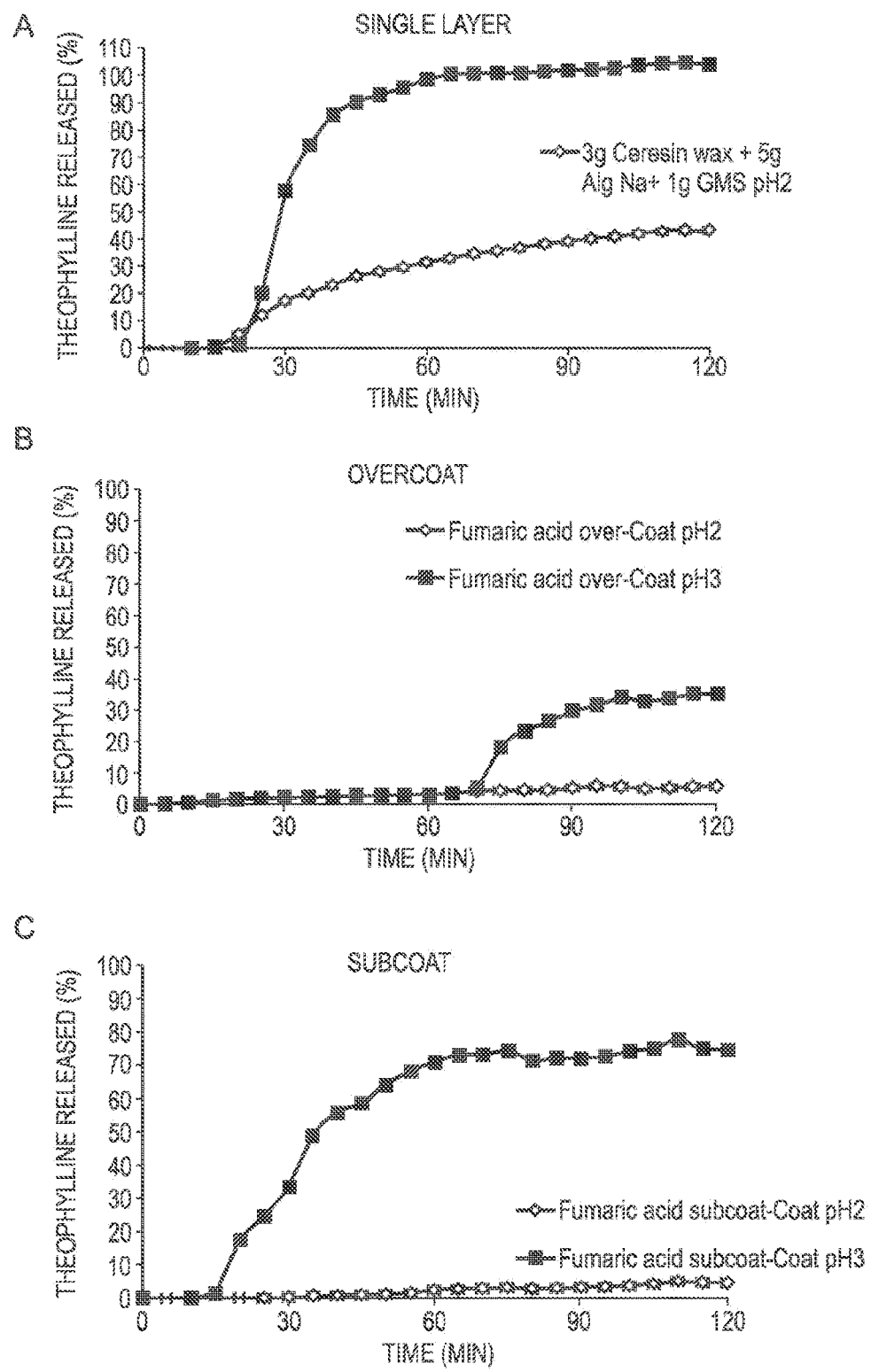
FIG. 41 shows theophylline release profiles at pH2 (diamonds) and pH3 (squares) for example dosage forms A: single-coated control (without any acid-regulating layers); B: with acid-regulating layer overcoat; and C: with acid-regulating layer as an undercoat.

FIG. 41 shows theophylline release profiles at pH2 (diamonds) and pH3 (squares) for example dosage forms A: single-coated control (without any acid-regulating layers); B: with acid-regulating layer overcoat; and C: with acid-regulating layer as an undercoat.

The impact of adding an acid regulating layer was investigated in FIG. 41 shows drug release profiles (% of total theophylline released) for this example, as determined by Experimental Test 2, over a 2 hour time period in simulated gastric fluid at pH2 and pH3. The addition of pH-regulating layer contributed to a better control of drug release at pH2 and pH3 in comparison to single layer coating.

Example I—Triple Layer System

A further multi-layered dosage form was prepared involving three layers:
Inner coating layer: sodium alginate:wax:GMS 5:3:1 (at weight gain 7%)
Middle cerasin wax layer (at weight gain 3%)
Outer coating layer: sodium alginate:wax:GMS 5:3:1 (at weight gain 7%)

The inner and outer layer were achieved via spray coating as specified in Example Section 1, Example 3. The middle coating layer was achieved by hotmelt coating using Erweka AR 403 pan coater. The hot air (temperature 80° C.) was applied for 30 see until complete wax melting (5 g) was achieved. This was followed by air cooling for 1 min. The rotation rate of the coating pan was set at 400 rpm.

The inner layer provide excellent film-forming property and protect the core, it also accelerates the dissolution of the system upon pH change. The middle layer provide a strong lipophilic layer, however it is mechanically weak and likely to raise stability challenges upon storage, so the third layer provides an outer protective layer and helps improve the finishing of the final product.

Figure 42:
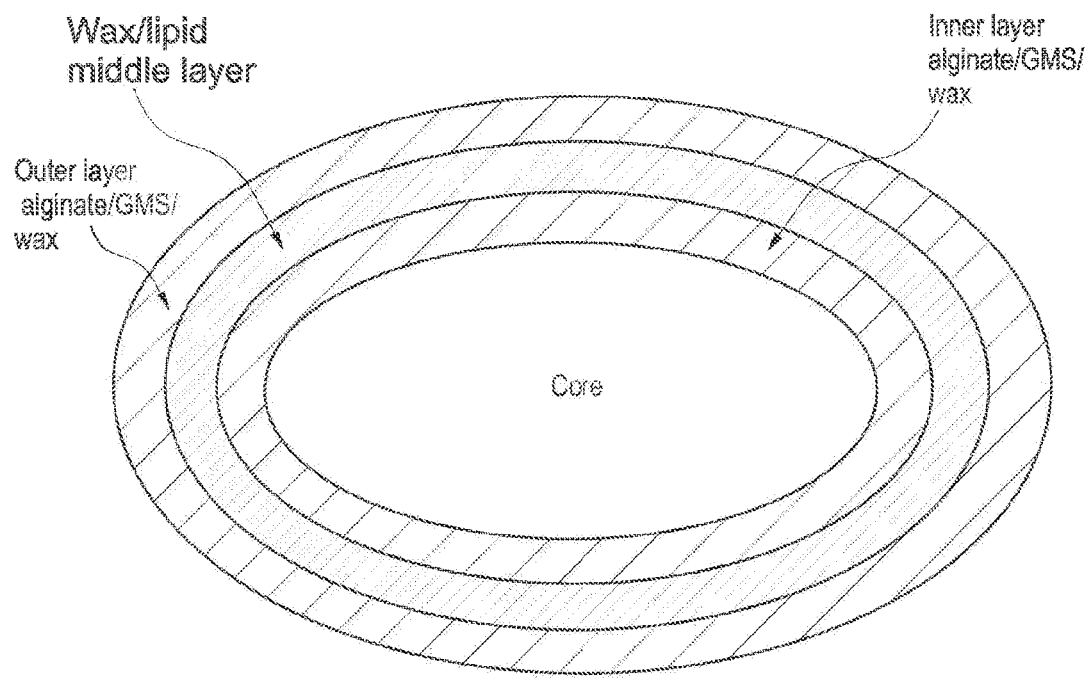
FIG. 42 provides a schematic diagram of a triple layered coated tablet design.

FIG. 42 provides a schematic diagram of a triple layered coated tablet design.

Figure 43:
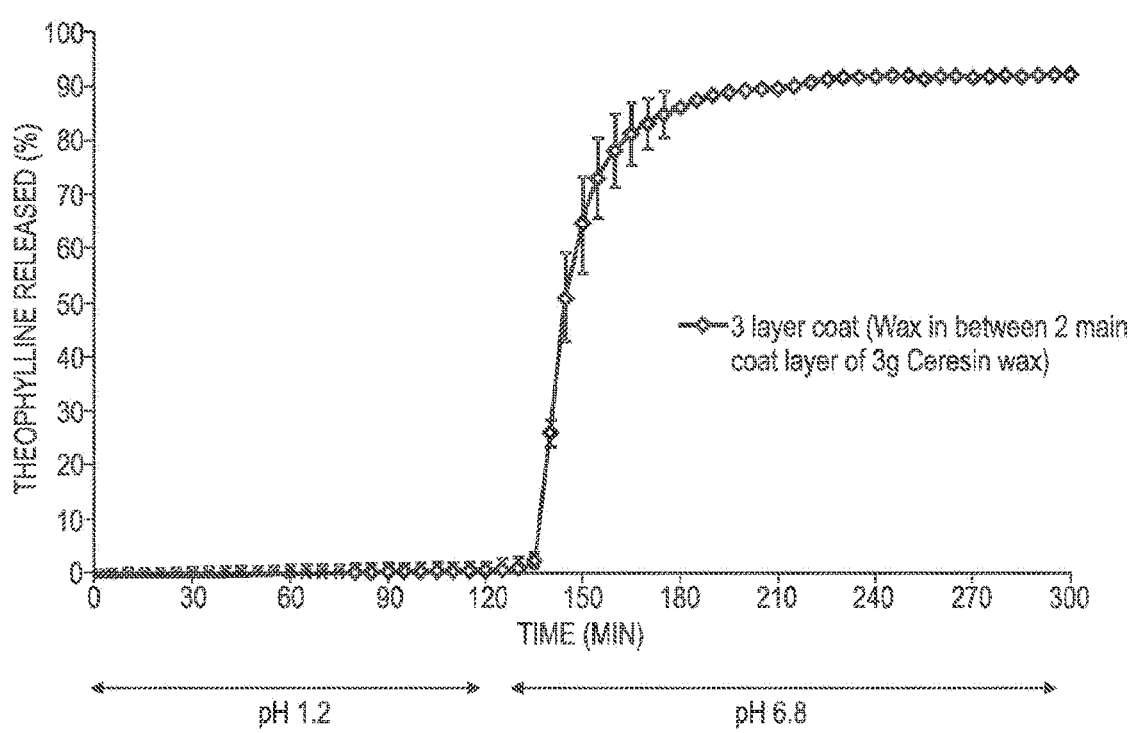
FIG. 43 shows a theophylline release profile (acquired using the protocols of Experimental Test 2) of the resulting coated tablets.

FIG. 43 shows a theophylline release profile (acquired using the protocols of Experimental Test 2) of the resulting coated tablets.

Figure 44:
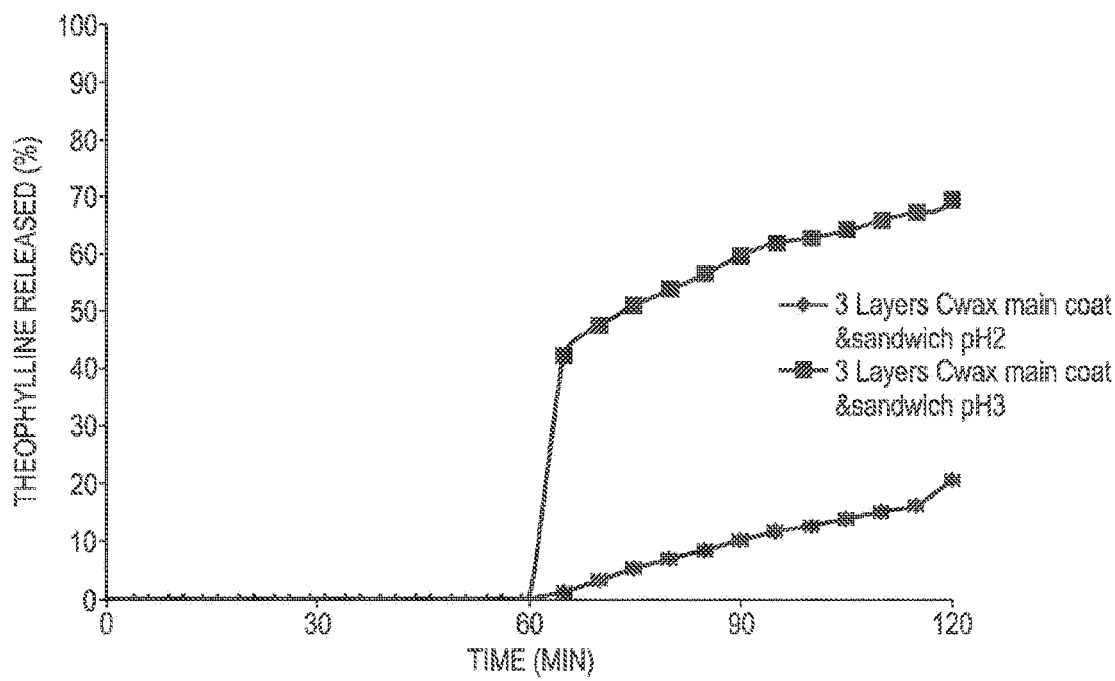
FIG. 44 shows drug release profiles (% of total theophylline released) for this example, as determined by Experimental Test 2, over a 2 hour time period in simulated gastric fluid at pH2 and pH3.

FIG. 44 shows drug release profiles (% of total theophylline released) for this example, as determined by Experimental Test 2, over a 2 hour time period in simulated gastric fluid at pH2 and pH3.

As a control, the middle coating layer was applied to the core (at 3% Wt gain) to assess the enteric property of the pure wax (without the addition of polyscharide and lipophilic surfactants). The coating was carried out using hotmelt coating as described above.

Figure 45:
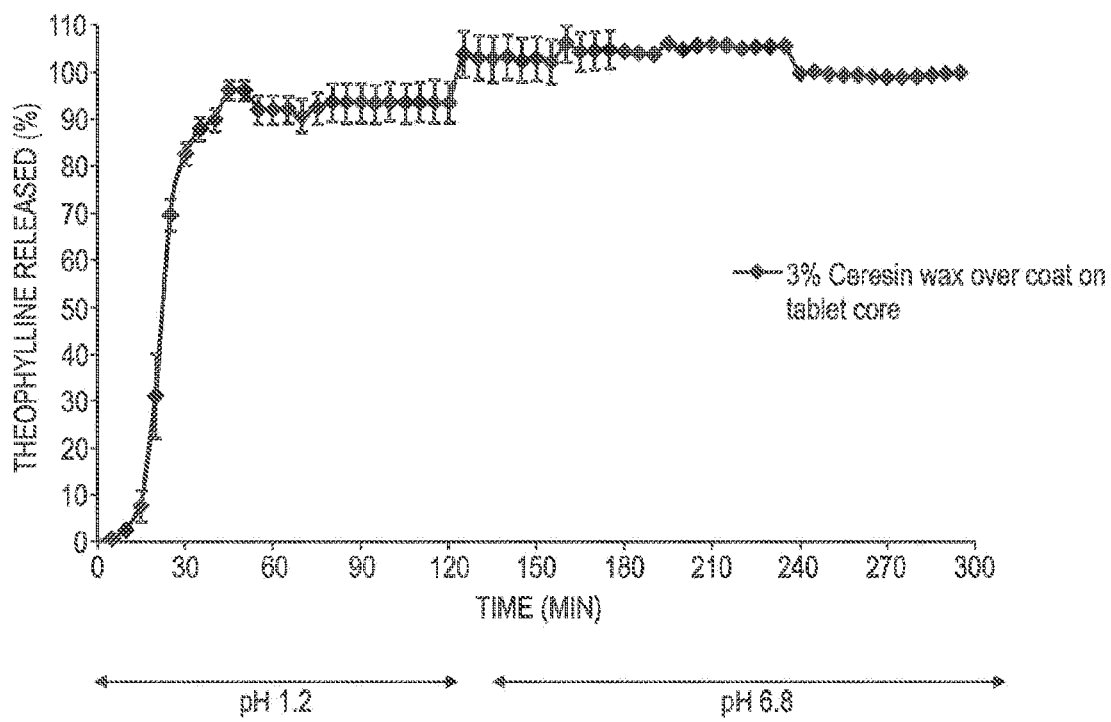
FIG. 45 shows a theophylline release profile (acquired using the protocols of Experimental Test 2) of the resulting wax coated tablets.

FIG. 45 shows a theophylline release profile (acquired using the protocols of Experimental Test 2) of the resulting wax coated tablets.

FIG. 45 clearly shows a poor control of drug release in the acidic medium when a pure wax layer was applied.

Example J—Hard Gelatin Capsule as a Model Core

All previous example were assessed using a model core of theophylline tablet. In the following example a hard gelatin capsule (size 00) was used as a model core. The capsule was automatically filled with water soluble model powder of commercially available lactose for direct compression (Ludipress) using in-cap HS (Dott. Bonapace & C. Italy). The final average capsule weight was approximately 730 mg. The capsules were coated following Example G by mixing a solution containing 3 g Ceresin wax and 1 g GMS in 100 mL ethanol at 65° C. with a solution formed by dissolving 5 g alginic acid sodium salt in 250 mL of hot water at 70° C. and adding 50 mL of ethanol. The capsules were then spray coated with the coating composition at a rate of 1.5 ml/min at an inlet temperature of 55° C. All capsules remained intact after 1 hour in acid under agitation as in Experimental Test 3.

The invention claimed is:

1. A solid dosage form comprising a core coated with a coating;
   wherein the core is a tablet comprising a pharmaceutical active, a nutraceutical active, and/or an active dietary supplement, said tablet being itself an immediate-release dosage form;
   wherein at least 90 wt % of the coating comprises:
      30-70 parts by weight polysaccharide selected from alginic acid, an alginate salt, or any combination thereof;
      5-15 parts by weight non-ionic surfactant that is a fatty acid ester of a polyol, which is a glycerol fatty acid ester having an HLB value between 2 and 5; and
      20-40 parts by weight wax selected from the group consisting of beeswax, ceresin wax, carnauba wax, and any combination thereof,
      wherein the polysaccharide, the non-ionic surfactant, and the wax are mixed together, and
      wherein greater than 99 wt % of the coating consists of natural materials wherein the polysaccharide has an average molecular weight between 10,000 and 600,000 g/mol and yields a viscosity of 5-50 centipoise (cps) or 50-100 centipoise (cps), as measured using the ASTM standard for measuring dynamic viscosity, when in a concentration of 1 wt % in water.

2. The solid dosage form as claimed in claim 1, wherein the non-ionic surfactant is a fatty acid ester of a polyol that exhibits at least one hydrogen-bonding group wherein the non-ionic surfactant comprises one or more fatty acid moieties selected from the group consisting of stearoyl, Caryloyl, Caproyl, Lauroyl, Myristoyl, Palmitoyl, Arachidoyl, Behenoyl, Lignoceroyl, Cerotoyl, Myristoleoyl, Palmitoleoyl, Sapienoyl, Oleoyl, Elaidoyl, Vaccenoyl, Linoleoyl, Linoelaidoyl, α-Linolenoyl, Arachidonoyl, Eicosapentaenoyl, Erucoyl, and Docosahexaenoyl.

3. The solid dosage form as claimed in claim 2, wherein the non-ionic surfactant is glycerol monostearate, glycerol distearate, glycerol tristearate (tristearin) or any combination thereof.

4. The solid dosage form as claimed in claim 1, wherein the coating is free of any plasticizer(s) or comprises less than or equal to 5 wt % relative to the total weight of the coating plasticizer(s).

5. The solid dosage form as claimed in claim 1, wherein the coating is spray-coated around the tablet.

6. The solid dosage form as claimed in claim 1, wherein the non-ionic surfactant seals in otherwise more readily dissolvable or disintegratable components.

7. The solid dosage form as claimed in claim 1, wherein the coating as a whole has an average thickness around the core, measured as weight per surface area of the core, of 10-80 mg/cm$^2$.

8. The solid dosage form as claimed in claim 1, wherein the solid dosage form comprises a core coated with a coating;
   wherein the core is a tablet comprising a pharmaceutical active, a nutraceutical active, and/or an active dietary supplement, said tablet being itself an immediate-release dosage form;
   wherein at least 90 wt % of the coating comprises:
      30-70 parts by weight polysaccharide selected from alginic acid, an alginate salt, or any combination thereof;
      5-15 parts by weight non-ionic surfactant that is a fatty acid ester of a polyol, which is a glycerol fatty acid ester having an HLB value between 2 and 5; and 20-40 parts by weight wax selected from the group consisting of beeswax, ceresin wax, carnauba wax, and any combination thereof, wherein the polysaccharide, the non-ionic surfactant, and the wax are mixed together, and wherein greater than 99 wt % of the coating consists of natural materials; and a stabilising component, that is a solid at (Standard ambient temperature and pressure, selected from the group consisting of an acid component or a salt thereof, a multivalent metal salt, or any combination thereof;

wherein, the coating is a multi-layered coating comprising:

a polysaccharide-based layer comprising the polysaccharide, the non-ionic surfactant, and the wax mixed together; and a stabilising coating layer comprising the stabilising component.

9. The solid dosage form as claimed in claim 8, wherein either:

a) the stabilising layer constitutes an outer layer of the coating and the polysaccharide-based layer constitutes an inner layer of the coating, such that the inner polysaccharide-based layer is located between the core and outer stabilising layer; or b) the stabilising layer constitutes an inner layer of the coating and the polysaccharide-based layer constitutes an outer layer of the coating, such that the inner stabilising layer is located between the core and outer polysaccharide-based layer;

wherein optionally the inner layer of the coating is in contact with or otherwise interfaces with the core, and optionally the inner layer of the coating and the outer layer of the coating are in contact and/or interface with one another.

10. The solid dosage form as claimed in claim 9, wherein the coating comprises a middle layer of the coating between the inner layer of the coating and outer layer of the coating, the middle layer being a lipophilic coating layer comprising or consisting of a wax.

11. The solid dosage form as claimed in claim 8, wherein the stabilising coating layer has an average thickness around the core, measured as weight per surface area of the core, of 2-35 mg/cm$^2$; and the polysaccharide-based layer has an average thickness around the core of 5-50 mg/cm$^2$.

12. The solid dosage form as claimed in claim 8, wherein the stabilising coating layer comprises the stabilising component and pectin and/or a salt thereof; and optionally further comprises a non-ionic surfactant.

13. The solid dosage form as claimed in claim 12, wherein the stabilising coating layer comprises the stabilising component and the pectin and/or salt thereof in a respective weight ratio of 100-10:5-100.

14. The solid dosage form as claimed in claim 8, wherein the stabilising component is an acid component selected from the group consisting of: fumaric acid, citric acid, tartaric acid, malic acid, maleic acid, malonic acid, glutaric acid, adipic acid, sorbic acid, pimelic acid, suberic acid, succinic acid, glutaconic acid, muconic acid, glutinic acid, citraconic acid, mesaconic acid, tartronic acid, arabinaric acid, saccharic acid, and/or a derivative and/or an acceptable salt thereof.

15. The solid dosage form as claimed in claim 8, wherein the stabilising component is an acid component, the acid component comprising at least two distinct acid moieties, wherein one of the acid moieties exhibits a pK$_a$ value between 2 and 5 and another of the acid moieties exhibits a pK$_a$ value between 3 and 6.

16. The solid dosage form as claimed in claim 1, wherein the core is itself an immediate-release dosage form at a pH between pH 5 and pH 7.4.

17. The solid dosage form as claimed in claim 1, wherein the solid dosage form comprises a core coated with a coating;

wherein the core is a tablet comprising a pharmaceutical active, a nutraceutical active, and/or an active dietary supplement, said tablet being itself an immediate-release dosage form;

wherein at least 90 wt % of the coating comprises:

30-70 parts by weight polysaccharide selected from alginic acid, an alginate salt, or any combination thereof;

5-15 parts by weight non-ionic surfactant that is a fatty acid ester of a polyol, which is a glycerol fatty acid ester having an HLB value between 2 and 5; and 20-40 parts by weight wax selected from the group consisting of beeswax, ceresin wax, carnauba wax, and any combination thereof, wherein the polysaccharide, the non-ionic surfactant, and the wax are mixed together, and wherein greater than 99 wt % of the coating consists of natural materials;

wherein, the coating is a multi-layered coating comprising:

an inner polysaccharide-based layer comprising the polysaccharide, the non-ionic surfactant, and the wax mixed together; and a middle lipophilic coating layer comprising the wax; and an outer polysaccharide-based layer comprising the polysaccharide, the non-ionic surfactant, and the wax mixed together.

18. The solid dosage form as claimed in claim 1, wherein the solid dosage form comprises a core coated with a coating;

wherein the core is a tablet comprising a pharmaceutical active, a nutraceutical active, and/or an active dietary supplement, said tablet being itself an immediate-release dosage form;

wherein at least 90 wt % of the coating comprises:

30-70 parts by weight polysaccharide selected from alginic acid, an alginate salt, or any combination thereof;

5-15 parts by weight non-ionic surfactant that is a fatty acid ester of a polyol, which is a glycerol fatty acid ester having an HLB value between 2 and 5; and 20-40 parts by weight wax selected from the group consisting of beeswax, ceresin wax, carnauba wax, and any combination thereof, wherein the polysaccharide, the non-ionic surfactant, and the wax are mixed together, and wherein greater than 99 wt % of the coating consists of natural materials;

wherein, the coating is a multi-layered coating comprising:

an inner polysaccharide-based layer comprising the polysaccharide, the non-ionic surfactant, and the wax mixed together; and a middle stabilising coating layer comprising a stabilising component, that is a solid at (Standard ambient temperature and pressure, selected from the group consisting of an acid component or a salt thereof, a multivalent metal salt, or any combination thereof; and an outer polysaccharide-based layer comprising the polysaccharide, the non-ionic surfactant, and the wax mixed together.

19. The solid dosage form as claimed in claim 18, wherein the stabilising component is an acid component.

20. The solid dosage form as claimed in claim 19, wherein the acid component:
   a) is selected from the group consisting of: fumaric acid, citric acid, tartaric acid, malic acid, maleic acid, malonic acid, glutaric acid, adipic acid, sorbic acid, pimelic acid, suberic acid, succinic acid, glutaconic acid, muconic acid, glutinic acid, citraconic acid, mesaconic acid, tartronic acid, arabinaric acid, saccharic acid, and/or a derivative and/or an acceptable salt thereof, or
   b) comprises at least two distinct acid moieties, wherein one of the acid moieties exhibits a $pK_a$ value between 2 and 5 and another of the acid moieties exhibits a $pK_a$ value between 3 and 6.

\* \* \* \* \*